United States Patent [19]

Bose et al.

[11] Patent Number: 5,644,648

[45] Date of Patent: Jul. 1, 1997

[54] METHOD AND APPARATUS FOR CONNECTED AND DEGRADED TEXT RECOGNITION

[75] Inventors: Chinmoy Bhusan Bose, Green Brook; Shyh-Shiaw Kuo, East Brunswick, both of N.J.

[73] Assignee: Lucent Technologies Inc., Murray Hill, N.J.

[21] Appl. No.: 437,332

[22] Filed: May 9, 1995

Related U.S. Application Data

[62] Division of Ser. No. 251,676, May 31, 1994, Pat. No. 5,559,902, which is a continuation of Ser. No. 813,225, Dec. 23, 1991, abandoned.

[51] Int. Cl.$^6$ ........................................................ G06K 9/00
[52] U.S. Cl. ............................................. 382/177; 382/228
[58] Field of Search ................................. 382/202, 190, 382/203, 204, 173, 228, 229, 230, 259, 225, 177

[56] References Cited

U.S. PATENT DOCUMENTS

| | | | |
|---|---|---|---|
| 3,737,855 | 6/1973 | Cutaia | 340/146.3 |
| 4,783,753 | 11/1988 | Crimmins | 364/574 |
| 4,783,840 | 11/1988 | Song | 382/54 |
| 4,791,679 | 12/1988 | Barski et al. | 382/55 |
| 5,067,165 | 11/1991 | Nishida | 382/229 |
| 5,142,589 | 8/1992 | Lougheed et al. | 382/9 |
| 5,148,500 | 9/1992 | Belanger | 382/55 |
| 5,170,442 | 12/1992 | Murai et al. | 382/47 |
| 5,263,097 | 11/1993 | Katz | 382/225 |

FOREIGN PATENT DOCUMENTS 2550700  9/1976  Germany.

OTHER PUBLICATIONS

T. Hoshino, et al., "Notch Elimination Method for Binary Figures Using Run–Length Coding," *Systems, Computers, Controls*, vol. 13, No. 1.

T. Pavlidis, "A Vectorizer and Feature Extractor for Document Recognition," *Computer Vision Graphics and Image Processing*, vol. 35, No. 1, 111–127 (Jul. 1986).

R. M. Bozinovoc, "Off–Line Cursive Script Word Recognition," *IEEE Trans. on Pattern Analysis and Machine Intelligence*, vol. 11, No. 1, 68–83 (Jan. 1989).

J. A. Vlontzos, et al., "A Hierarchical System for Character Recognition," *IEEE Int'l Symp. on Circuits and Systems*, 1989, 1–4 (May 1989).

(List continued on next page.)

*Primary Examiner*—Yon J. Couso
*Attorney, Agent, or Firm*—Thomas A. Restaino; Kenneth M. Brown

[57] ABSTRACT

A method and apparatus for recognizing connected and degraded text is presented. A text enhancement process which may be used in combination with text recognition comprises filtering a scanned image to determine whether a binary image value of an image pixel should be complemented, determining whether complementing the value of the pixel reduces the sharpness of wedge-like figures in the image, and complementing the binary value of the pixel when doing so does not reduce sharpness. Image preprocessing may also provide a line adjacency graph (LAG) based on a set of image pixels and the removal of a path from a LAG when the path is located either at the top or bottom of the set of image pixels and is of degree (1,0) or (0,1), respectively, and connected to a junction of the LAG. The recognition process may comprise determining primitive strokes in a scanned image, segmenting the scanned image into sub-character segments based on the primitive strokes, identifying features which characterize the sub-character segments, and comparing identified features to stochastic models of known characters and determining an optimum sequence of known characters based on the comparisons through the use of Viterbi scoring and level building procedures.

50 Claims, 11 Drawing Sheets

OTHER PUBLICATIONS

"Two–Step System for Character Recognition Without Pre–Stored Fonts," *IBM Technical Disclosure Bulletin*, vol. 34, No. 7B, (Dec. 1991).

European Search Report dated Sep. 1, 1994, Appln. No. 92311264.3.

European Search Report dated Jun. 4, 1994, Appln. No. 92311265.0.

H. S. Baird, "Feature Identification for Hybrid Structural/Statistical Pattern Classification," *Computer Vision, Graphics, and Image Processing*, 42, 318–333 (1988).

J. J. Hull, "Hypothesis Generation in the Computational Model for Visual Word Recognition," *IEEE Expert*, 63–70 (Fall 1986).

J. Mariani, "Recent Advances in Speech Processing," *ICASSP* '89, 429–440 (1989 Scottish Exhibition).

L. R. Rabiner, "A Tutorial on Hidden Markov Models and Selected Applications in Speech Recognition," *Proceedings of the IEEE*, vol. 77, No. 2, 257–286 (Feb. 1989).

S. N. Srihari et al., "Document Image Analysis," *Proc. 8th Intl. Conf. Pattern Recognition*, 434–436 (Oct. 1986).

A. Kundu et al., "Recognition of Handwritten Word: First and Second Order Hidden Markov Model Based Approach," vol. 22, No. 3, 283–297 (1989).

L. R. Rabiner et al., "A Speaker–Independent, Syntax–Directed, Connected Word Recognition System Based on Hidden Markov Models and Level Building," *IEEE Transactions on Acoustics, Speech, and Signal Processing*, vol. ASSP–33, No. 3, 561–573 (Jun. 1985).

A. K. Jain et al., "Algorithms for Clustering Data," Chapter 3, 55–142 (Prentice Hall 1988).

R. O. Duda et al., "Pattern Classification and Scene Analysis," 10–43 (Wiley 1973).

A. G. Konheim, "Cryptography—A Primer," 14–27 (Wiley 1981).

S. E. Levinson et al., "An Introduction to the Application of the Theory of Probabilistic Functions of a Markov Process to Automatic Speech Recognition," *Bell System Technical Journal*, vol. 62, No. 4, 1035–1074 (Apr. 1983).

M. S. Baird, "Document Image Defect Models," *Proc. IAPR Workshop on SSPR*, 1–9 (Jun. 1990).

D–S. Lee et al., "A Structural Approach to Recognize Hand–Printed and Degraded Machine–Printed Characters," *IAPR Workshop on Syntactic and Structural Pattern Recognition*, 256–272 (Jun. 1990).

J. J. Hull et al., "A Computational Approach to Visual Word Recognition: Hypothesis Generation and Testing," *Proc. IEEE Conf. Comput. Vision Pattern Recognition*, 156–161 (1986).

H. Baird, "Global–to–local Layout Analysis," *Proc. IAPR Workshop on Syntactic and Structural Pattern Recog.*, France (Sep. 1988).

FIG. 3
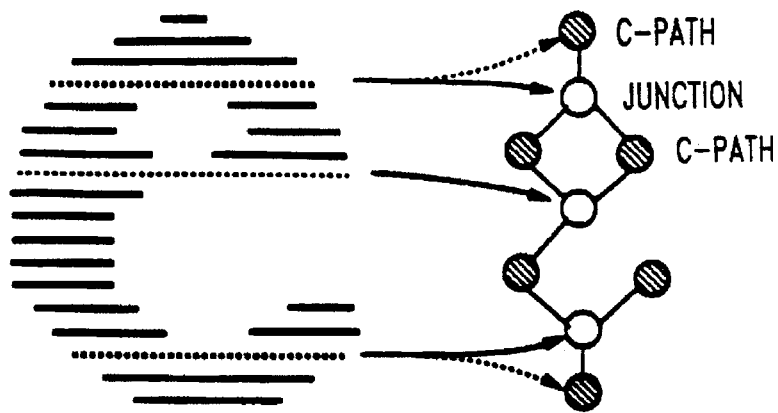
FIG. 4
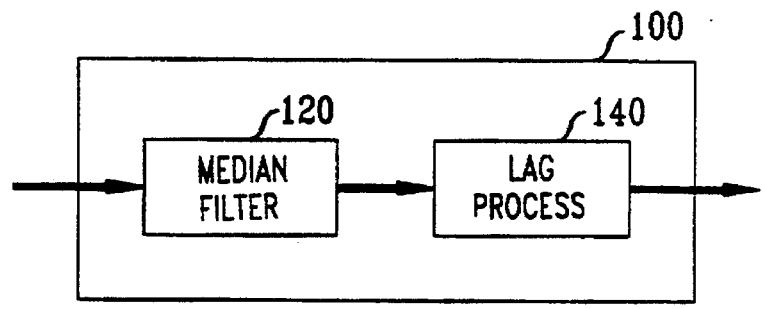
FIG. 5
| 1 | 2 | 3 |
|---|---|---|
| 4 | 5 | 6 |
| 7 | 8 | 9 |

STROKE          ARC

METHOD AND APPARATUS FOR CONNECTED AND DEGRADED TEXT RECOGNITION

CROSS-REFERENCE TO RELATED APPLICATION

This application is a divisional application of commonly assigned U.S. patent application Ser. No. 08/251,676, filed May 31, 1994, now U.S. Pat. No. 5,559,902, which is a Continuation Under Rule 1.62 of U.S. patent application Ser. No. 07/813,225 filed Dec. 23, 1991, now abandoned.

FIELD OF THE INVENTION

This invention relates generally to the field of optical text recognition, and specifically to the recognition of connected and degraded text.

BACKGROUND OF THE INVENTION

In modern business office environments, many devices and systems are used to improve the speed and efficiency associated with the creation, processing, and dissemination of documents. Among these are text processing systems, fax machines, and photocopiers.

From time to time, it may be necessary to convert the text of a printed document to electronic form for text processing or communication purposes. Such a circumstance may arise, e.g., when a document created on one text processing system must be edited on another system with which there exists no electronic communication capability. The conversion process for such text may comprise optical scanning and image analysis processes. The aim of the conversion process is the generation of a computer text file, typically comprising ASCII characters, which reflects the printed text. If a printed document comprises clean, well-formed text, this conversion process may not present much difficulty.

Because of distortion effects associated with repeated photocopying and facsimile transmission, certain documents may include fuzzy, swollen (degraded) and overlapped (connected) characters which make the text conversion process problematic. The greater the degree of degradation and connectivity, the more difficult it is to accurately discern and identify printed text characters. Naturally, computer files which result from the conversion of documents which contain such text frequently include errors in their representation of the document's words and characters.

SUMMARY OF THE INVENTION

The present invention provides a method and apparatus for recognizing connected and degraded text. An image preprocessing technique is provided which reduces the amount of spurious noise in scanned text images. Also provided is a segmentation process by which images are divided into a series of sub-character segments. A feature extraction procedure represents sub-character segments in terms of a set of predefined features. Identified features of segments are compared to stochastic models of known characters and character sequences for the purpose of text recognition.

BRIEF DESCRIPTION OF THE DRAWINGS

FIG. 3 presents line adjacency graph and compressed line adjacency graph representations of the character e.

FIG. 4 presents the illustrative word pre-processing process presented in FIG. 1.

FIG. 5 presents a 3×3 window of pixels used in a nominal filtering process of a modified median filter.

DETAILED DESCRIPTION

A. Introduction

Figure 1:
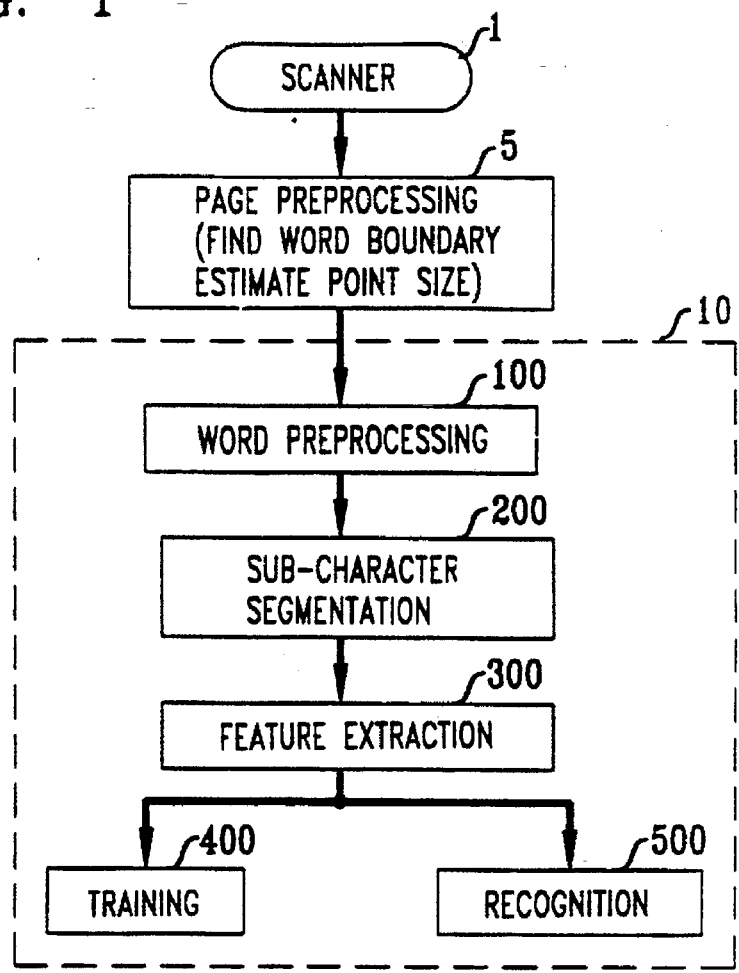
FIG. 1 presents an illustrative text recognition process.

FIG. 1 presents an illustrative text recognition process 10. Process 10, which receives binary pixel images of individual words to be recognized, comprises a word preprocessing process 100, a sub-character segmentation process 200, a feature extraction process 300, a training process 400, and a recognition process 500. The images received by process 10 may comprise connected (e.g., touching or overlapping) and degraded (L e., noisy) characters. They are provided by text scanning and page preprocessing systems, 1 and 5 respectively. These systems 1,5 scan text from paper copies of documents, identify columns of printed text from the scanned images, identify lines within a column, and word boundaries within a line. Text scanning and page preprocessing systems known in the art may be employed for these purposes. See, e.g., H. S. Baird, Global-w-local layout analysis, Proc. IAPR Workshop on Syntactic and Structural Pattern Recog., (Sept 1988); and S. N. Srihari and G. W. Zack, *Document Image Analysis,* Proc. 8th Int'l Conf. Pattern Recognition, 434-436 (October 1986). In addition to providing images of scanned words, these systems provide estimates of character point size and base-line location.

Word preprocessing 100 performs filtering and other processing based on line adjacency graphs to reduce noise and retain word image sharpness. Subcharacter segmentation 200 divides a preprocessed word image into a number of sub-character segments. These segments are defined using line adjacency graphs to identify strokes. Segments are defined based on the identified strokes. What results is a partitioning of the filtered pixel map received from word preprocessing 100 into a plurality of individual segment maps.

Following segmentation, feature extraction 300 is performed. Through feature extraction 300, each identified segment is characterized by one or more features which may be of either the stroke or arc variety. If a word presented for recognition is constrained not to comprise connected or significantly degraded characters, it is possible to perform recognition based on comparing extracted features to feature models of known letters.)

With segments characterized by their features, process 10 may perform either of two processes: training 400 or recognition 500. By the training process 400, a Hidden Markov Model (HMM) is built for each text character to be recognized. Data associated with one or more trained HMMs (e.g., state transition probabilities) may be stored in a semiconductor memory (not shown), such as a Read Only Memory (ROM). Through the recognition process 500, stochastic distances of the sequences of unknown character segments are obtained based on the HMM state transition and associated hi-gram probabilities stored in memory. These distances are used to determine the most likely sequence of text characters which might have produced the unknown observed image segments. The most likely sequence of text characters may be saved in memory (not shown) for later retrieval.

The present invention may be used to augment the capabilities of conventional optical character recognition systems commercially available. This may be done by providing such systems with software performing the functions of the invention.

An illustrative set of software programs including an embodiment of the present invention written in the "C" language is provided in an Appendix attached hereto. The Appendix also provides a list of the programs associated with each of the word preprocessing 100, sub-character segmentation 200, feature extraction 300, training 400, and recognition 500 processes. These programs may be executed on computer marketed under the trademark SUN SPARCstation 1.

For clarity of explanation, the illustrative text recognition process 10 is presented as comprising individual functional blocks. These functional blocks may be provided through the use of either shared or dedicated hardware, including, but not limited to, hardware capable of executing software. Illustrative embodiments may comprise digital signal processing (DSP) hardware, such as the AT&T DSP16 or DSP32C, and software performing the operations discussed below. Very large scale integration (VLSI) hardware embodiments, as well as hybrid DSP/VLSI embodiments, may also be provided.

1. Line Adjacency Graphs

Line adjacency graphs (LAGs) are employed by several aspects of process 10. As used in process 10, a LAG is stored in memory and represents run-lengths in a scanned and digitized image. Each "run" of consecutive black pixels on a scan line is denoted as a node of a LAG. The degree of a node is expressed as an ordered pair of numbers denoted as (a, b). The number a equals the number of nodes above and connected to a given node, while the number b equals the number of nodes below and connected to the node.

Figure 2:
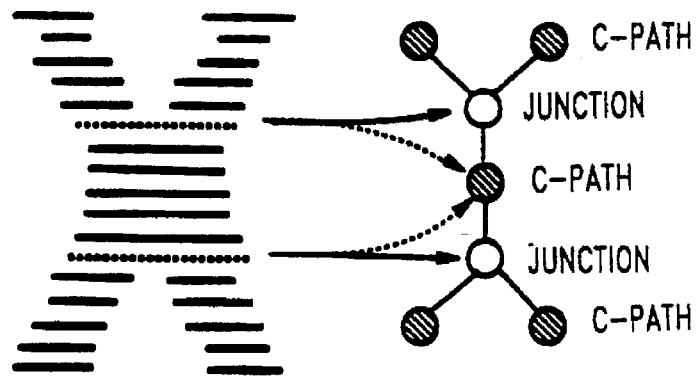
FIG. 2 presents line adjacency graph and compressed line adjacency graph representations of the character X.

A junction is a node of a LAG having a or b greater then one. A path is a node having a and b less than or equal to one. The left-hand portions of FIGS. 2 and 3 are LAG representations of characters X and e, respectively. In these figures, paths and junctions are indicated by solid and dotted lines, respectively.

The LAGs presented in FIGS. 2 and 3 can also be represented in a compressed form referred to as a c-LAG. In a c-LAG, connected paths can be represented in a compressed form referred to as a c-path. The right-hand portions of FIGS. 2 and 3 present c-LAG representations of characters X and e, respectively. Junctions are represented as circles, while c-paths are represented by shaded circles.

In case that one of the degrees of a junction is one, the junction is also included in the corresponding c-path connected to the junction if it is not an outlier compared to the nodes in the c-path. A junction may be considered to be an outlier if the width of the junction divided by the average width of the c-path exceeds a threshold, e.g., 1.4. For example, the two junctions of X in FIG. 2 are included into the corresponding c-path. However, the junction in the middle part of e in FIG. 3 is not included in the c-path connected to it, since it is an outlier.

B. Word Preprocessing

Illustrative word preprocessing 100 is performed on a presented word image in order to reduce spurious noise prior to training or recognition. As shown in FIG. 4, word preprocessing 100 comprises a modified median filter 120 and a LAG process 140. The modified median filter 120 reduces noise and preserves aspects of sharpness and connectivity while the LAG process 140 removes noise-like run-lengths in the image.

Modified median filter 120 comprises a nominal filtering process which is modified under certain circumstances. The nominal filtering process employs a 3×3 window of pixels, such as that shown in FIG. 5. The nominal process centers the window (window element no. five) over a given pixel in the image and assigns to that pixel the binary value associated with the majority of the pixels in the window (i.e., the binary value held by at least five of the nine pixels).

Two rules modify this nominal filtering process. The first rule concerns a situation when, according to the nominal filtering process, an empty (i.e., white) pixel should be fired (i.e., made black), such as pixel (i, j) in FIG. 6 (where i and j denote a specific row and column of the image). A 3×7 window, illustratively presented in FIG. 7, is centered over pixel (i, j). If more than 14 of the shaded pixels are filled (i.e., black) and both pixels (i−1, j) and (i−2, j) are empty, then the pixel (i, j) shall not be filled. This first rule preserves the sharpness of wedge-like shapes in the image which can enhance performance in subsequent processing steps. In this illustrative procedure, the wedge-like shapes preserved are V-like.

Figure 8:
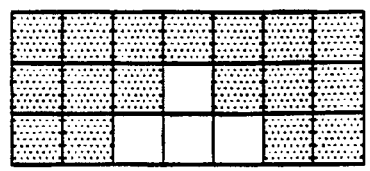
FIG. 8 presents a 3×7 window of pixels used in the modified median filter to preserve the sharpness of inverse V-like shapes in an image.

A like procedure may be performed using the 3×7 window of FIG. 8 to preserve the sharpness of inverse V-like wedge shapes. In this procedure, if more than 14 of the shaded pixels are filled and both pixels (i+1, j) and (i+2, j) are empty, then the pixel (i, j) shall not be filled.

The second rule for modifying the nominal filtering process concerns the situation when, according to the nominal process, a filled pixel should be emptied. If such a pixel is an element of a sequence (or run-length) of at least five consecutive filled pixels, then the pixel is not emptied. This second rule may preserve connectivity of run-lengths which may be broken by the nominal filtering process of median filter 120.

Figure 9:
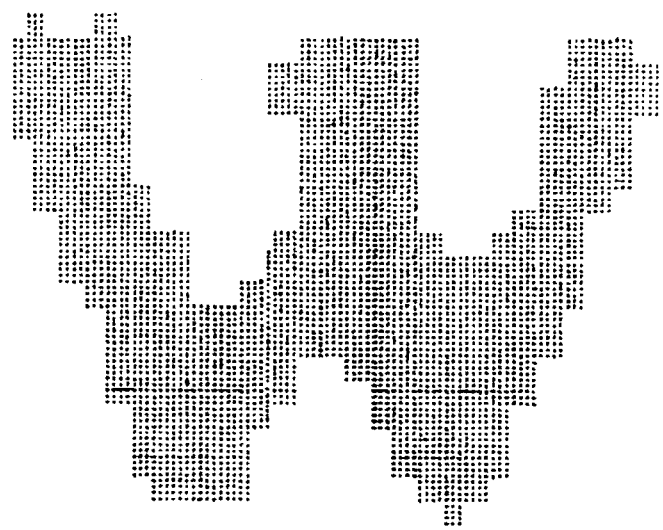
FIG. 9 presents the character w having two noise-like pixels to be removed by a line adjacency graph filter process.

Word preprocessing 1043 further comprises a LAG filter process 140 to remove some noise-like run-lengths by determining and checking the LAGs associated with the image. Every path (i) located at the top or bottom of each blob having degree (0,1) or (1,0), respectively, and (ii) connected to a junction is removed, such as those two paths located at the top left of 'w' in FIG. 9 (where a blob is any set of one or more pixels, wherein each pixel in the set is connected to at least one other pixel in the set in any of the eight ways one pixel may be connected to an adjacent neighbor pixel (vertically: up, down; horizontally: left, right; and diagonally: up-right, up-left, down-right, and down-left)). See Appendix, modules pEEp.c, lag.c, and clag.c.

Figure 6:
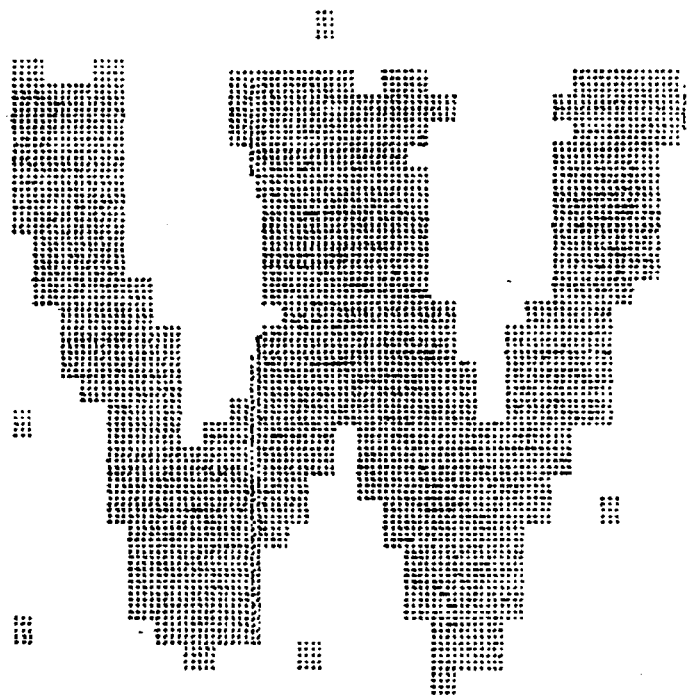
FIG. 6 presents an illustrative original noisy image of the character w.
Figure 7:
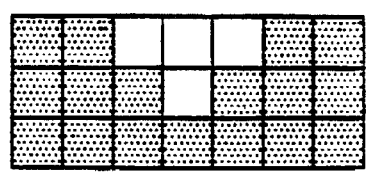
FIG. 7 presents a 3×7 window of pixels used in the modified median filter to preserve the sharpness of V-like shapes in an image.
Figure 10:
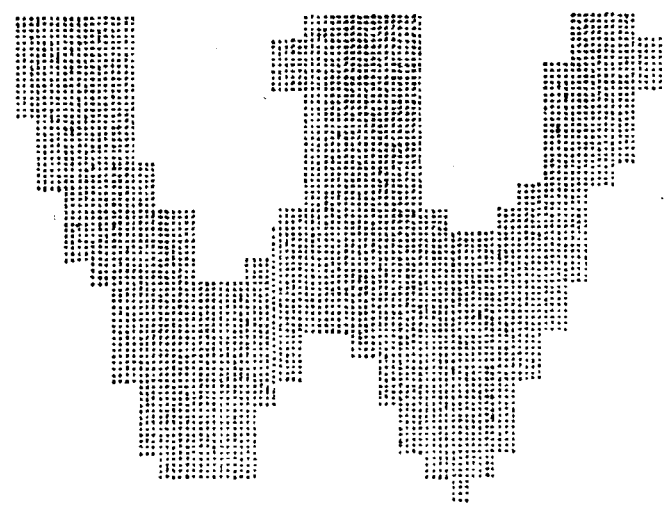
FIG. 10 presents the result of word preprocessing on the character image presented in FIG. 6.

FIG. 10 presents the character image w from FIG. 6 after operation of word preprocessing 100.

C. Sub-Character Segmentation

The sub-character segmentation process 200 divides image information received from the word preprocessing 100 into segments which can, in turn, be used to characterize the image in terms of segment features. Such characterization is useful to both the training and recognition processes, 400 and 500, respectively. Segmentation is carried out by identifying the strokes present in an image.

1. Stroke Identification

In the illustrative process 200, stroke identification is performed by first determining the direction of dominant strokes in the image. Dominant strokes may be identified by scanning the pixel profiles within a preset range of angular directions at small intervals, and choosing the direction of tallest peaks in the profile. If the direction of the dominant strokes is not vertical, the direction may be normalized by rotating the pixels on an imaginary slanted line (based on the slant angle) such that the pixels fall on a vertical line.

Primitive strokes are identified to provide useful structural information for segmentation. The primitive strokes in a word can be identified by generating and analyzing a c-LAG of the image to be recognized. See Appendix, modules lag.c and clag.c. A primitive stroke is identified by its endpoints in the two-dimensional plane in which it lies, $x_1$, $y_1$ and $x_2, y_2$, where values for x and y are related to the top left corner pixel of a rectangle surrounding a scanned blob. The rectangle has dimensions equal to the height and width of the blob. See Appendix, module blob_extr.c.

Each c-path of the c-LAG is analyzed according to its own characteristics and its neighborhood information. The first step of analyzing a c-path is to divide it into one or more groups of nodes which have similar width and collinear centers.

Consecutive nodes (indicated by i and i+1) will be considered to have dissimilar widths, w(i) and w(i+1), if all the following tests are satisfied:

$$|w(i) - w(i+1)| > \alpha; \quad\quad (i)$$

$$\text{either} \left| \frac{w(i)}{w(i+1)} \right| \beta \text{ or } \left| \frac{w(i)}{w(i+1)} \right| > \frac{1}{\beta} \text{ ; and} \quad (ii)$$

$$\left| \frac{w(i)}{w(i+1)} - \frac{w(i-1)}{w(i)} \right| + \left| \frac{w(i)}{w(i+1)} - \frac{w(i)}{w(i+2)} \right| > \delta, \quad (iii)$$

wherein, e.g., $\alpha=2.0$, $\beta=0.7$, and $\delta=0.15$. For a group which comprises nodes of similar widths, collinearity of node centers is determined by defining a line through the centers of the first and last nodes in the group and determining the maximum distance of any node center in the group from this line. If this maximum distance is, e.g. less than 2.6 pixel units, the nodes of the group are said to have collinear centers.

Figure 11:
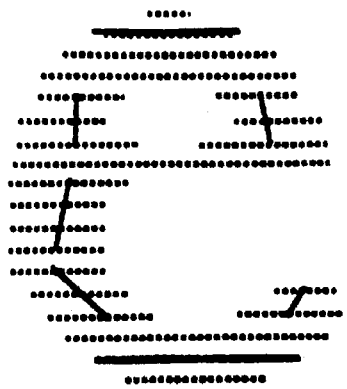
FIG. 11 presents a line adjacency graph for the character e and associated strokes representative thereof.
Figure 12:
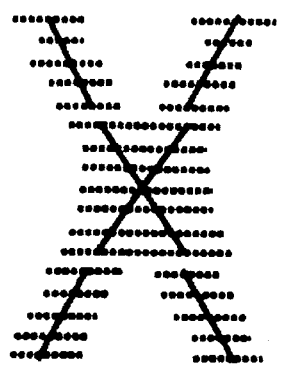
FIG. 12 presents a line adjacency graph for the character x and associated strokes representative thereof.

Strokes corresponding to each group with nodes of similar widths and collinear centers are identified (or returned) according to the following rules:

i. When the ratio of group height over average width of the group, denoted as $R_{h/w}$, is larger than a threshold (e.g., 1.50), a vertical stroke is returned which is a line fitting centers of the nodes.

ii. When the ratio $R_{h/w}$ is smaller than a threshold (e.g., 0.65), a horizontal stroke is returned which lies in the middle of the group.

iii. When a group is adjacent to a much wider junction or path of another group either at top or bottom, a vertical stroke is returned (see FIG. 11). A group is said to be much wider than another if its width at the point of adjacency divided by the average width of the other group is greater than a threshold, e.g., 1.7.

iv. If a c-path contains only one group and that group connects to two c-paths at both top and bottom, two crossed strokes are returned (see FIG. 12).

Each vertical stroke is characterized by a width which is used in segmentation. The width of a vertical stroke is defined as the average width of nodes in the group from which the stroke is returned. Horizontal strokes, on the other hand, are not characterized by widths since such width information is not used by the segmentation process 200.

Figure 13:
FIG. 13 presents the set of strokes associated with the word hello.

In order to avoid ambiguity in segmentation process 200, strokes are not returned from ambiguous c-paths, i.e., those c-paths which do not satisfy any of the rules (i-iv) for returning strokes. For example, in FIG. 13, no stroke is returned for the part of the image where "lo" touches and the upper right part of "o."

Figure 14:
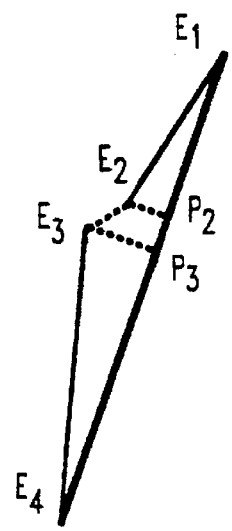
FIG. 14 presents two adjacent strokes and the quantities related thereto used to determine whether such strokes should be merged.

The final step for stroke identification in the illustrative segmentation process 200 is the merging of certain adjacent strokes. Strokes may be merged if deviation to be incurred as a result of the merge is within a predetermined tolerance. Consider the example in FIG. 14, where $E_1$, $E_2$, $E_3$ and $E_4$ are the endpoints of the two adjacent strokes. A new merged stroke is formed by connecting the starting point of the first stroke, $E_1$, to the end point of the second stroke, $E_4$. Then, five quantities are checked: three distances, $E_2P_2$, $E_3 P_3$ and $E_2E_3$, and two ratios, $$\frac{E_2P_2}{E_1E_4} \text{ and } \frac{E_3P_3}{E_1E_4}.$$

If all the distances and ratios are smaller than predetermined thresholds (e.g., 2.2, 2.2, 5.1, respectively, for the distances, and 1/7.4 for both ratios), the deviation is deemed acceptable and the two original strokes may be replaced by a new merged stroke. The threshold values are functions of scanning resolution (pixels per unit length—assumed known), font type and size (assumed available from the page layout preprocessor), and may be set with a look-up table.

2. Segmentation Rule

Sub-character segmentation is achieved by applying a set of rules based on the returned strokes. The segment boundaries obtained by applying these rules partition the original pixel image into individual image segments. The segmentation rules are as follows:

i. A non-horizontal stroke without any vertical overlap with any other stroke identifies a non-horizontal segment, where vertical overlap refers to one stroke partially or wholly lying above or below another stroke as viewed from a vertical direction. The width of the segment is obtained from the width of its strokes.

ii. The space between two non-horizontal segments identifies a horizontal segment.

iii. The vertical overlap of two vertical (or near-vertical) strokes or two inclined strokes identifies a non-horizontal segment with a width determined by the overlapped width of the individual strokes. Specifically, non-horizontal segment width refers to the lateral distance traversed by one or more vertically overlapping non-horizontal strokes plus an additional distance added to each stroke end. This additional distance is a fraction of the average path width of the paths forming the strokes. This fraction depends on the angle which the stroke makes with the vertical. See Appendix, module blob2feat.c. Because there may be more than one stroke in a segment, different non-horizontal strokes may define the left and right edges of a segment. Consequently, the average path width added to define each edge may not be the same.

iv. The vertical overlap of a vertical stroke with any other non-vertical stroke provides the segment boundaries dictated by the vertical stroke.

v. The vertical overlap of an inclined stroke with a horizontal stroke provides the segment boundaries dictated by the inclined stroke.

vi. Two intercepting inclined strokes with slopes of opposite sign (e.g., strokes forming an 'x' pattern) provide a segment boundary at the point of intersection.

D. Feature Extraction

Once a pixel image is segmented by the segmentation process 200, the individual segments may be characterized by identifying in such segments one or more features. Such identified features may be used both in training 400 and character recognition 500.

Figure 15:
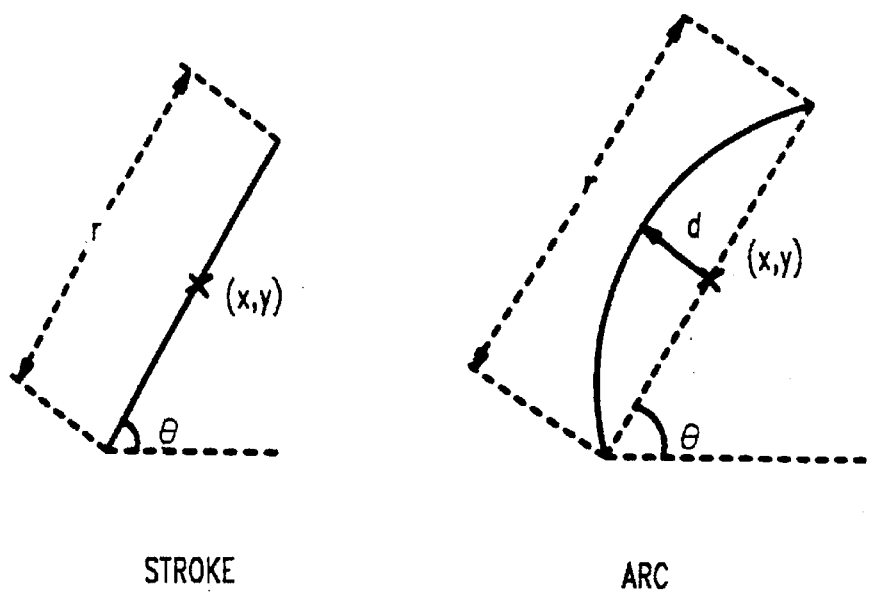
FIG. 15 presents an illustrative stroke and an illustrative arc.

In the illustrative feature extraction process 300, two types of features are identified within segments: strokes and arcs. FIG. 15 presents an illustrative stroke and an illustrative arc. A stroke, which is a line-segment, is uniquely identified by its centroid, length, and slope, and may be represented by a 5-tuple (x, y, rsin2θ, rcos2θ, d), where (x, y) is its centroid measured with respect to base-line information provided by systems 1,5, r is its length and θ is the slope angle. (Twice the slope angle is used for the purpose of maintaining continuity in the parametric representation, as the slope angle varies between −90 and +90 degrees.) The value d is always 0 for a stroke. An arc may also be represented as the 5-tuple (x, y, rsin2θ, rcos2θ, d), where the first four parameters represent a chord of the arc (in the same fashion as a stroke), and d is the maximum perpendicular distance of the arc from the chord.

1. Segment Preprocessing

Figure 16:
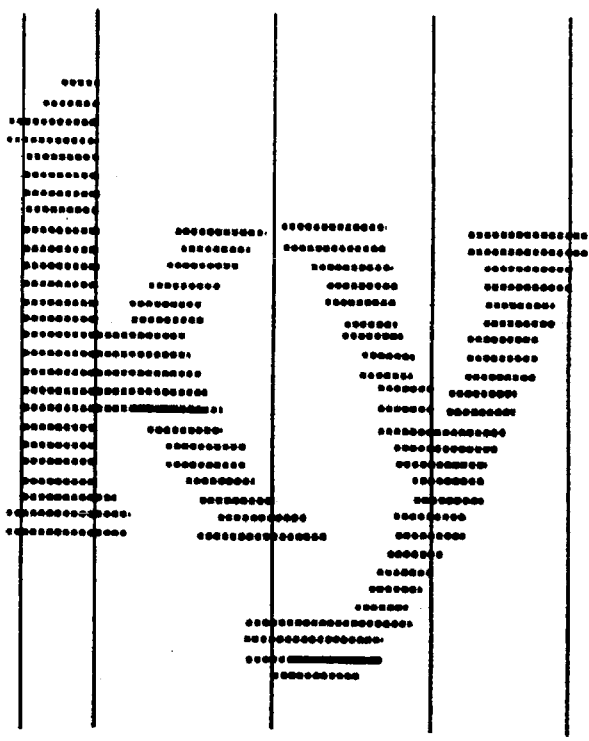
FIG. 16 presents several segments of a line adjacency graph for the characters ky.
Figure 17:
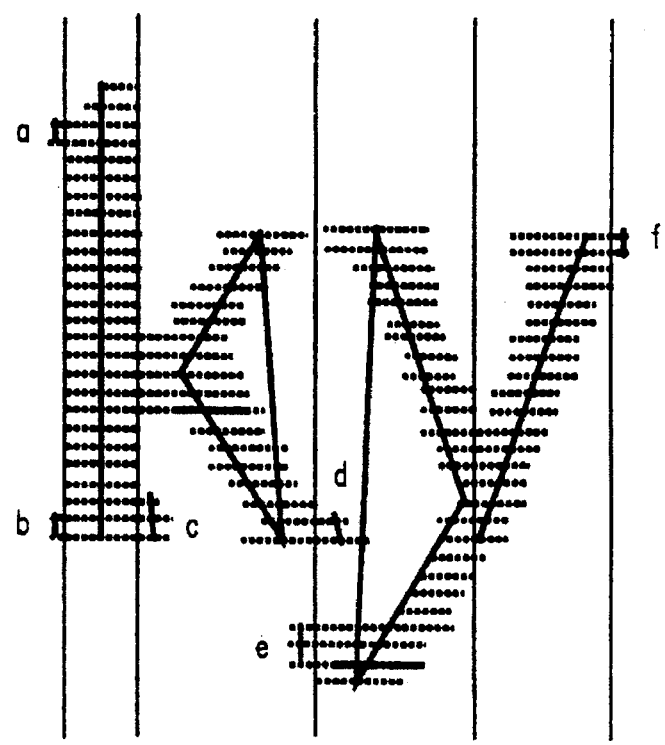
FIG. 17 presents a set of features extracted from un-preprocessed segments associated with the characters ky.

Prior to feature identification, the illustrative feature extraction process 300 preprocesses individual segments to remove certain noise-like pixels. For example, FIG. 16 presents several segments of the character string ky. If the illustrative feature identification technique is applied directly to these segments, some undesired features will be extracted due to groups of noise-like pixels as indicated in FIG. 17 by labels a–f.

Figure 18:
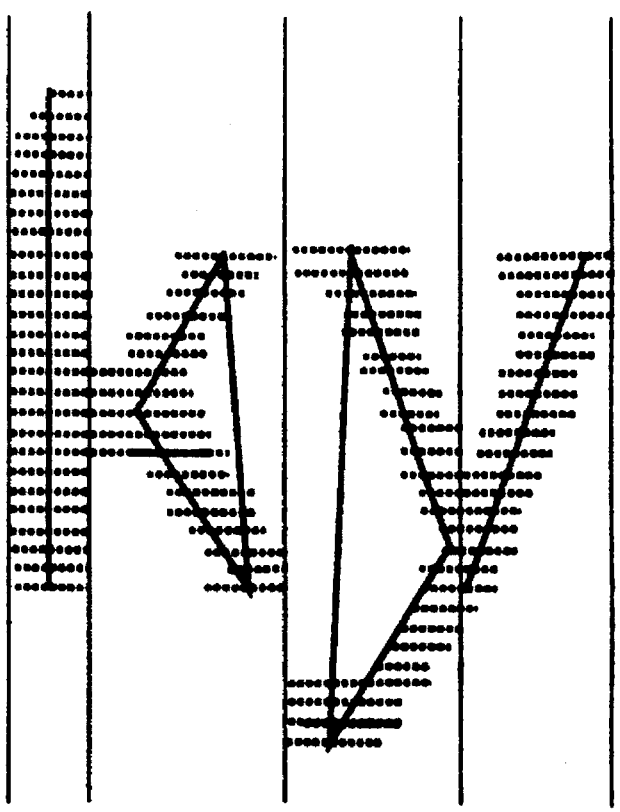
FIG. 18 presents the features extracted from preprocessed segments of the characters ky.

Consider the group of noise-like pixels identified by the label e. Since this group is actually a small portion of a c-path of the letter y, it can be excluded from the second segment (which concerns a portion of the letter k). Exclusion of noise-like pixels is done by eliminating all pixel groups which are a portion of either (i) a path or (ii) a c-path in a neighboring segment. FIG. 18 presents the features which are extracted from preprocessed segments of string ky. Strokes associated with noise-like pixel groups a–f are no longer present.

2. Feature Identification

A structural analysis similar to that described above for sub-character segmentation is employed for identifying (or extracting) segment features. The first step in this analysis involves representing each image segment by a c-LAG. Each c-path of a c-LAG is then analyzed to identify its features. If a segment is identified as horizontal, horizontal strokes are returned from each c-path of the segment. See Appendix, path_s.c. For non-horizontal segments, each c-path thereof is checked and subdivided into groups of nodes, if applicable.

The process of subdividing c-paths for feature identification is different from that performed for sub-character segmentation (where a c-path is subdivided based upon either a large width change between two adjacent nodes or non-collinear node centers). Here, groups are formed by checking for width change only as described above.

Two adjacent groups in a segment will be merged into a single group if the following two conditions are satisfied:

$$\|\overline{w_1} - \overline{w_2}\| \leq \alpha, \qquad \text{i.}$$

$$\beta \leq \frac{\overline{w_1}}{\overline{w_2}} \leq \frac{1}{\beta}. \qquad \text{ii.}$$

Where $\overline{w}_1$ and $\overline{w}_2$ denote the average widths of the two adjacent potential groups, and $\alpha$ and $\beta$ are predetermined constants (e.g., 3.0 and 0.6, respectively).

Figure 19:
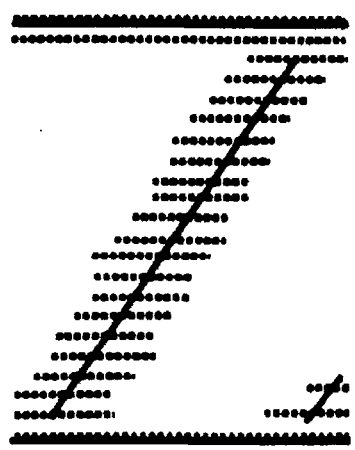
FIG. 19 presents a line adjacency graph for the character z and associated strokes representative thereof.

The purpose of conditional merging of groups is to preserve arc-features within segments. As shown in FIG. 18, there are two potential groups which might be identified in the first segment of the character y due to significant node width changes (at the bottom of the character). However, because the change of widths between the two potential adjacent groups is not large enough, as determined by the above conditions i and ii, the c-path contains only one group. Thus an arc is able to be extracted from that segment according to the criterion discussed below. In contrast, FIG. 19 shows a LAG for the letter z wherein the c-path beginning at the top of the letter is subdivided into two groups which cannot be merged under conditions i and ii. Therefore, separate corresponding strokes may be identified according to the rule discussed below.

Arc and stroke features are identified sequentially in each group of nodes within a segment. Arcs may be identified by constructing a line connecting the centers of the first and last nodes in a group. The center of a node, within the group, located at the greatest distance from the line is then determined. If the ratio of this largest distance over the length of the line is larger than a threshold (e.g., 0.1), an arc is identified and returned from the group. For example, in FIG. 20, an arc—indicated by a triangle—is returned from the 4th and 10th segments. The three vertices are the centers of the first and last nodes, and the node center located at the maximum distance from the line.

Generally, the same rules discussed above used in defining strokes for purposes of sub-character segmentation may be used here. As such, a stroke may be identified based on the ratio of height over average width of the group ($R_{h/w}$). Unlike stroke definition for segmentation, however, looser thresholds may be used in order to return strokes from most of the groups (e.g., 1.2 and 0.85 are used instead of 1.5 and 0.65, respectively).

Figure 21:
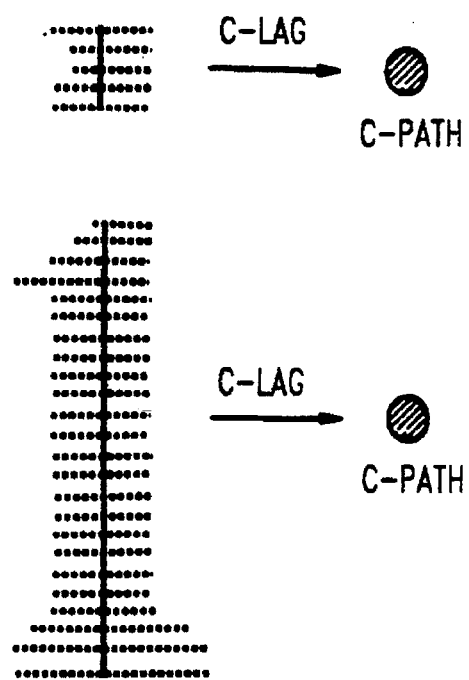
FIG. 21 presents the line adjacency graphs, compressed line adjacency graphs, and associated primitive feature strokes for the character i.

Special rules may be used for those unclear groups, such as:

i. For an isolated single c-path, such as, the top part of the character 'i' in FIG. 21, return a vertical stroke if $R_{h/w}$ is larger than 0.9. Otherwise, return a horizontal stroke.

ii. If any vertical stroke identified during segmentation is contained in a segment, each ambiguous group within this segment retrons a vertical stroke as a feature.

iii. If a junction is the first or last node in a c-LAG, a horizontal stroke is returned. See, e.g., the horizontal stroke at the bottom of character 'z' in FIG. 19.

Each identified feature is represented as a 5-tuple in a continuous vector space. In both the recognition and training modes, these vectors are mapped to a discrete space defined by a clustering algorithm (see the section on Training).

E. Training

1. Introduction

Identifying unknown connected and degraded character images is accomplished by illustrative process 10 by relating observed features, extracted as described above, to known features of known characters. The "closer" observed features are to a stochastic model of a given known character, the more confidently the image which produced the features can be identified as the known character.

Depending on the appearance of characters in an image, features extracted from a given segment of a given character image may .not always be the same (for any two samples of the character to be identified). Characters may appear differently, for example, due to varying connectivity with neighboring characters and varying character degradation (or blur). Furthermore, the starting and ending points of the individual characters become obscured.

Observing features of connected and degraded character images and determining the characters to which such features correspond depends upon a doubly embedded stochastic process. That is, one which has an underlying observable stochastic process concerning which features might be extracted from image segments, and another stochastic process, not directly observable, concerning which stochastic features might be associated with extracted features.

Illustrative process 10 represents the doubly embedded stochastic processes associated with connected and degraded text recognition through the use of Hidden Markov Models (HMM). Unlike the discrete observable Markov Model, wherein each model state corresponds to an observable event, the states of a HMM are not directly observable. Rather, observations are probabilistic functions of the state to be determined. A HMM is provided for each character to be recognized. See Appendix, modules reciniLc and ndorec.c. Each state of a HMM represents one segment of a character. Thus, the number of states in a model depends upon the number of segments needed to represent a character.

Each HMM of illustrative process 10, $\lambda$, may be described generally as follows:

i. Each model comprises a set of states: $\Omega=\{\omega_j:1\leq j\leq J\}$, where J is the number of states in the model. Each state is a stochastic representation of a segment of a character to be recognized.

ii. Each model has associated with it a matrix of state transition probabilities: $A=\{a_{jm}: 1\leq j,m\leq J\}$, where $a_{jm}=P$ ($\omega_m$ at i+1|$\omega_j$ at i). These probabilities represent the likelihood that, for a given model, one state (or segment), $\omega_m$, will follow a given state (or segment), $\omega_j$, in time.

iii. For each state of a model, a vector of observation probabilities for observation $X_i$: $B=\{b_j(X_i)\}$, where $b_j(X_i)=P(X_i|\omega_j$ at i). These probabilities represent the likelihood that a given observed segment vector, $X_i$, is associated with a given state, $\omega_j$ (see section 4, below).

iv. Associated with each state of a model is an initial state probability: $\Pi=\{\pi_j\}$, where $\pi_j=P(\omega_j$ at i=1). These probabilities represent the likelihood that a given model state will be the initial state from which the first state transition will be made.

v. As part of the recognition process 500 discussed below, each state of each HMM is compared against each segment vector in an observation vector sequence: $\bar{X}=\{X_i: 1\leq i\leq I\}$, where I is the number of observations. This vector represents the series of binary segment vectors representing the features extracted sequentially from the image of a character string.

In addition to the use of probabilities associated with each model of a character (i.e., state transition probabilities, $a_{jm}$; observation probabilities, $b_j$ ($X_i$); and initial state probabilities, $\pi_j$); illustrative process 10 employs measures of likelihood associated with the succession of characters in an image. Process 10 utilizes bi-gram probabilities to reflect the likelihood that one character will follow another in a word presented for recognition. Bi-gram probabilities provide contextual information to aid in the process of character and word recognition.

The training process 400 supplies the HMMs of the illustrative process 10 with information which may be used to analyze observations, $X_i$, to determine a maximum likelihood solution to the problem of identifying connected and degraded characters. That is, training 400 provides not only the state transition probabilities, $a_{jm}$, observation probabilities, $b_j$ ($X_i$), and initial state probabilities, $\pi_j$, but also the bi-gram probabilities for contextual analysis. Given an observation sequence $\bar{X}$ and the model parameters determined through training 400, a recognition process 500 may be employed to determine the optimal state sequence associated with the observations $\{\omega_{ji}:1\leq j\leq J, 1\leq i\leq I\}$. In other words, recognition 500 may determine the most likely sequence of characters which may be postulated given the set of observations.

2. Training Data Set

Figure 25:
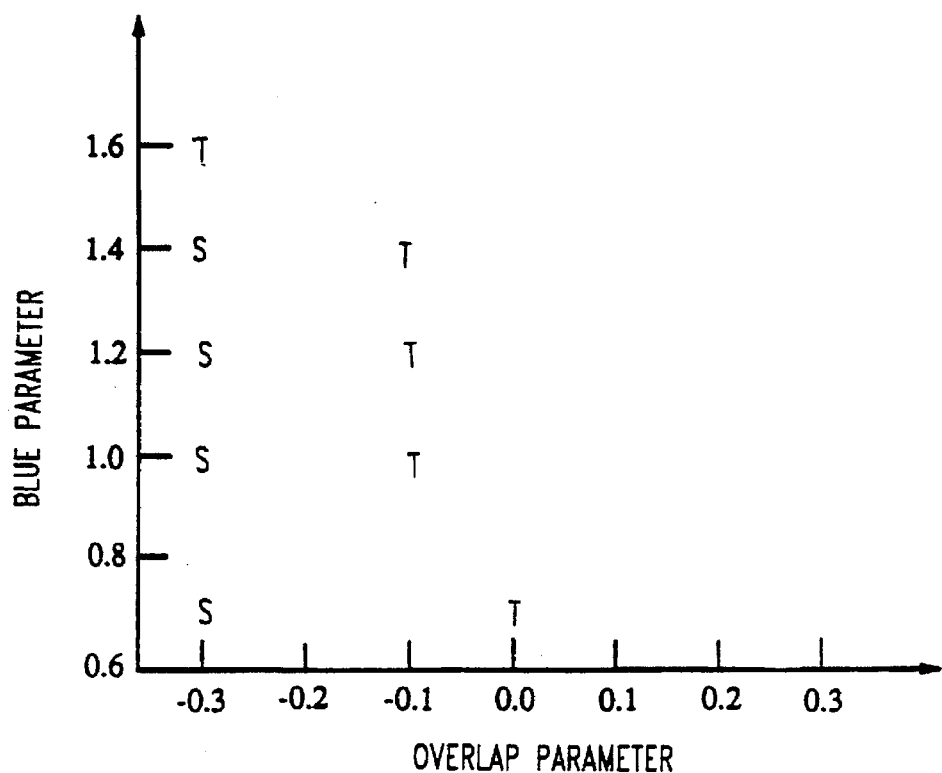
FIG. 25 presents illustrative overlap and blur parameter data for use in generating a training data set.

In order to have an appropriate training data set for deriving the HMM parameters, it is preferred that a character data set be generally representative of the expected characters in the words presented for recognition. A pseudo-random character generator of the type described by H. S. Baird, Document image defect models, Proc. IAPR Workshop on Syntactic and Structural Pattern Recog., (June 1990), may be used to obtain a set each of the characters for training. For example, the character generator may provide a training set comprising the lower case Roman alphabet (a–z), printed in Times Roman font (point size 10) and scanned (simulated) at 300 pixels per inch. The character generator should provide the two major sources of noise in printed text—overlap and blur. FIG. 25 presents illustrative overlap and blur parameter data for use with the character generator. In the figure, points indicated by an "S" indicate separate characters within a word while those indicated by a "T" indicate that characters are touching lightly. Overlap and blur are not orthogonal parameters; that is, a certain amount of blur may produce overlap. Nonetheless, it may be preferable to perform training with a certain amount of overlap not accomplished by blur parameters. A set of approximately 550 nonoverlapping training characters at several blur levels may be generated by the character generator, keeping other parameters of the above-referenced character generator constant.

3. Clustering of Features

The training set of characters should be segmented and their features extracted, as described above, to produce, for example, a set of 1400 segments consisting of a total of approximately 2000 features. These features may be clustered using a k-means algorithm, such as that described by, A. K. Jain and R. C. Dubes, *Algorithms for Clustering Data*, Chapter 3 (1988), and J. A. Hartigan, *Clustering Algorithms*, Chapter 4 (1975). The algorithm may be started with a set of 15 visibly distinct cluster centers chosen from one of the (a–z) training sets. A "compactness of cluster" index may be defined as:

$$C_c = \frac{\text{Mean weighted distance to other cluster centers}}{\text{Standard deviation of the cluster members}}.$$

Figure 22:
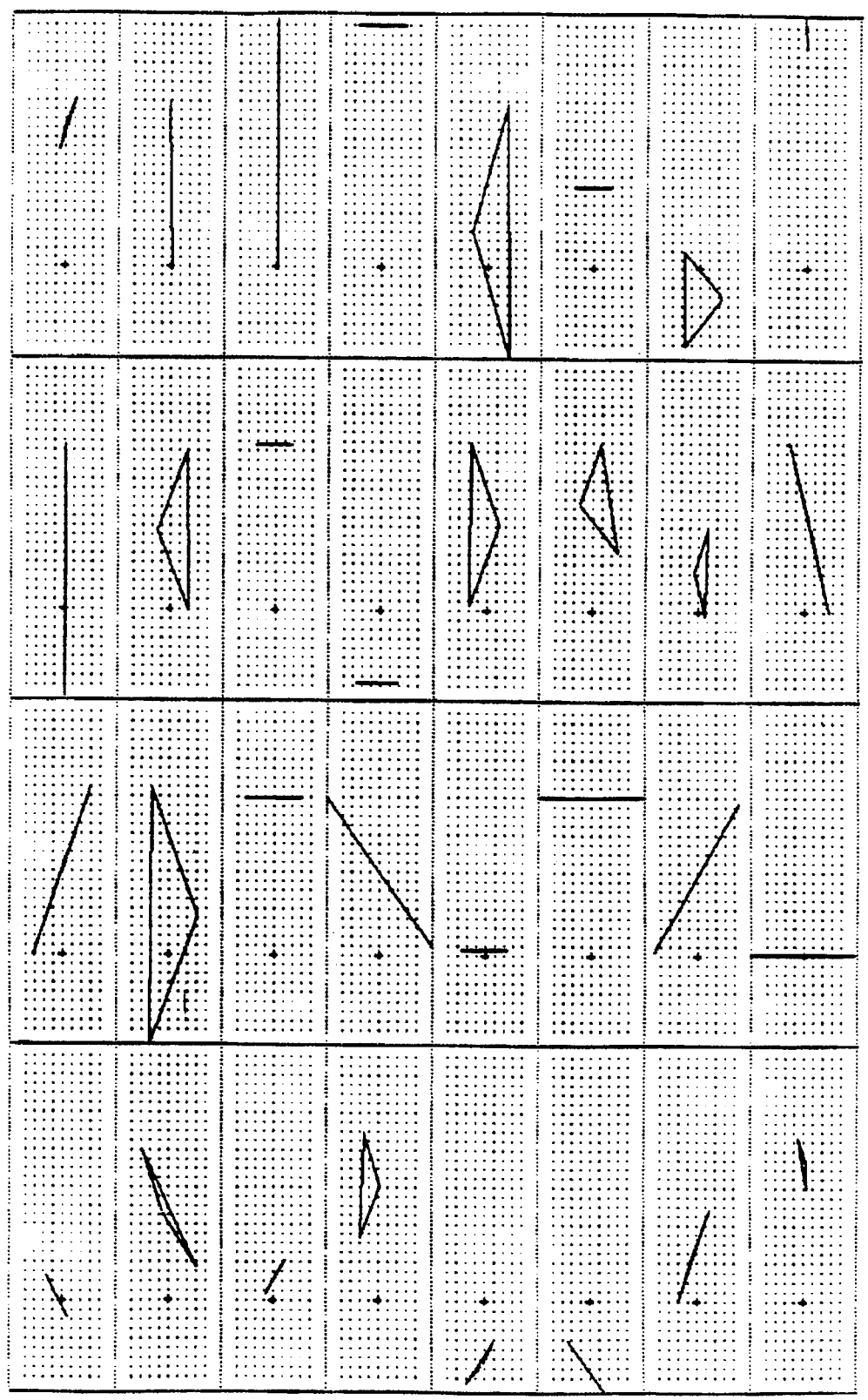
FIG. 22 presents an illustrative collection of 32 feature centers.

At the end of iterations of the clustering algorithm for the current number of centers, the mean of $C_c$ over all clusters should be determined (the distances in the numerator are weighted by the number of members). The number of clusters should be allowed to increase if the mean "compactness" increases, unless a predetermined number of clusters is reached. A new cluster center may be chosen for a new iteration as the most distant member of the worst (in the sense of the "compactness" criterion) cluster. For example, the algorithm may return a set of 32 cluster (or feature) centers from the set of approximately 2000 features. FIG. 22 presents an illustrative collection of 32 feature centers (the arcs are represented by triangles with the apex indicating the maximum deviation of the arc from the chord). Each dot in the field in which each feature center lies represents a corner of a pixel. The "+" represents the intersection of a vertical center-line and the character baseline. The feature centers are provided given 10-point scanned characters. They may be advantageously scaled based on input character point site information from systems 1,5. See Appendix, modules cluster.c and quant. c.

4. Vector Representation of Segments and Observation Probability

The clustering of features provides a way of partitioning the continuous feature space to a discrete feature space. A training character segment may be represented by a 32-bit binary segment vector, where each bit which is set identifies a given feature center of the discrete feature space which is closest to an identified feature in the segment.

Through the training process 400, observation probabilities are estimated with use of a Bayesian distortion measure using binary features, such as that described by R. O. Duda and P. E. Hart, *Pattern Classification and Scene Analysis*, Sec. 2 (1973), under the assumption of class-conditional statistical independence among the features. Training for each of the character models is performed by segmenting samples of each character, mapping features extracted from each segment to a binary segment vector, and associating with each feature extracted—each bit of the vector—a probability of occurrence (i.e., a probability that the feature associated with the bit position will be observed).

Each segment of a HMM may be labeled. For instance, the segments for the character 'u' may be labeled as 'u0', 'u1' and 'u2'. These labels may also be used to represent the corresponding states of the HMM for each character.

Each state of a character model is characterized by the binary probability distribution associated with each bit location. If $p_n$ is an estimate of the probability density function at bit location n, where $1 \leq n \leq N$ (e.g., N=32), then $$p_n = P(x_n = 1 | \omega_{jk}) = \frac{y_{jk}(n)}{y_{jk}},$$

wherein $x_n$ is the binary value of bit n in vector $X=\{x_n: 1 \leq n \leq N\}$, $\omega_{jk}$ is the event of the state being j in model k, $y_{jk}(n)$ is the total number of times the bit n of the segment vector for state j, model k was set during training, and $y_{jk}$ is the total number of times state j of model k appeared during training.

Naturally, density function $p_n$ is but an estimate of the density, and would approach the real density when the sample size is large. Note that many of the bit probabilities in a character model may be zero after a training run, due to the difference in features corresponding to different states and different models. In order to resolve any computational problems which might result from this situation, a small probability may be assigned in place of all zero probabilities.

The observation probability for an observation X is:

$$\{b_j(X)\} = P(X|\omega_{jk}) = \prod_n [p_n^{x_n}(1-p_n)^{1-x_n}],$$

assuming class-conditional statistical independence between features. Taking logarithm of the above expression (which simplifies the product to a sum, but retains the relative distance relationships), and redefining $\{b_j(X)\}$, $$\{b_j(X)\} =$$

$$\log \prod_n [p_n^{x_n}(1-p_n)^{1-x_n}] = \sum_n x_n \log \frac{p_n}{1-p_n} + \sum_n \log(1-p_n).$$

This observation (log) probability serves as a Bayesian measure of distortion or distance of the observation vector X with respect to a model state.

5. State Transition Probability

Within a specific HMM for a character, the state transition probability is defined as:

$$a_{jm} = P(\omega_m \text{ at } i+1 | \omega_j \text{ at } i),$$

where i is the observation sequence, $1 \leq j, m \leq J$ and $m \leq j$. Given the physical ordering of the states within a model, a left-right sequence of HMM states is preferred. As such, the HMM for the character 'u' where J=3 is: $\omega_1=u0$, $\omega_2=u1$, and $\omega_3=u2$. The state transition probabilities within a character may be estimated as:

$$a_{jm} = \frac{z_j(m)}{z_j},$$

where $z_j(m)$ is the total number of transitions from state $\omega_j$ to $\omega_m$, and $z_j$ is the total number of transitions from state $\omega_j$. Based on observations of connected characters, it is preferred to skip at most one state during the state transitions, i.e., $m-j \leq 2$.

Meaningful transition probabilities between states of the same character model should be determined from a large representative training data set. For the illustrative training data set character models, the transition probabilities are highly dependent on the degree of connectedness (overlap), the connected pair of characters, and the amount of noise existing in the test samples. The degree of overlap and blur in the training data set should be representative of that expected for the system in operation so that transition probabilities will accurately reflect the likelihood of state (segment) succession in real character images to be identified.

Figure 23:
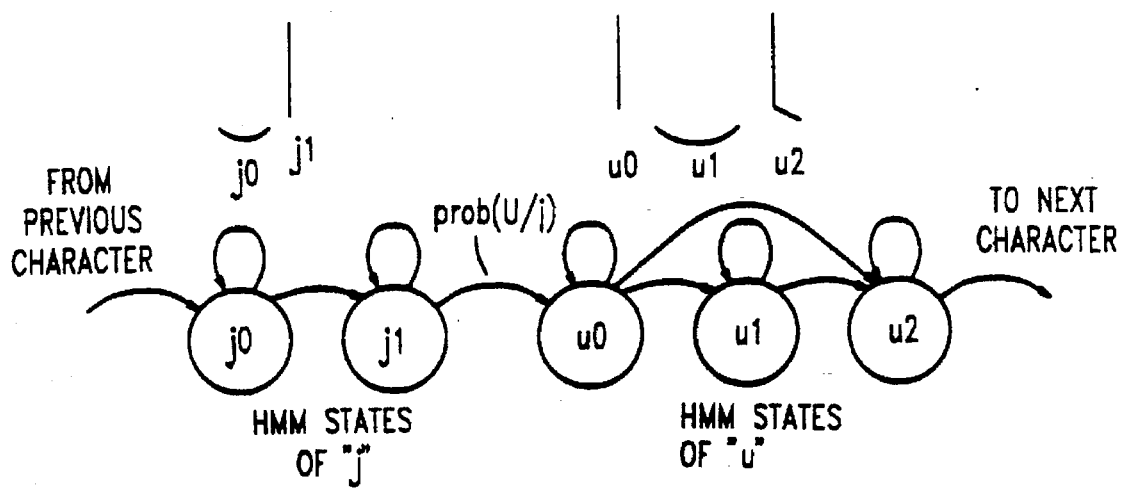
FIG. 23 presents the Hidden Markov Models for the characters ju.

Therefore, in lieu of the transition probabilities, penalty functions are is added to the cumulative distance measures, to penalize for skipping a state or for staying in the same state. See Appendix, module ndorec.c. Performance may be enhanced by providing penalty functions which are tuned (or graded) for (i) different characters or (ii) important states in a given character model. The skipping of a state may be induced by the overlapping of two characters (for instance, overlap of the last in the segment string {j0, j1} with the first segment in the segment string {u0, u1, u2} in the character string "... ju ... " in FIG. 23). It could also be induced by a missing segment due to deformation of the character. The decision to stay in the same state may be caused by an extra segment generated because of deformation of the character.

The transition probability between character models—the bi-gram probabilities—may be determined from the statistical studies of the type of text material the recognizer is expected to handle. For general English text, the statistical results of previous studies performed on the transition probabilities between characters may be used, such as those provided by A. G. Konheim, *Cryptography: A Primer*, Sec. 2.3 (1981), which reports first order transition probabilities between two successive letters in the English language. See Appendix, module recinit.c. These probabilities are used in a level building technique described below. Although the illustrative process 10 employs bi-gram probabilities, an embodiment may employ n-gram probabilities (n>2) without requiring much in the way of additional computational burden.

6. Initial State Probabilities

Each character is represented by a HMM with its own initial probability which is assigned to the first and second states in a left-right model. (A second state initial probability is assigned to address the skipping of model's first state.) Initial state probabilities apply to the model corresponding to the first character of a character string. This probability may be used at the start of the level building algorithm (described below) to discriminate between probable character strings. Again, the initial state probability may be estimated from the statistical studies of the type of text material the recognizer is expected to handle. In case of general English text, useful data is provided by A. Kundu, Y. He, and P. Bahl, *Recognition of handwritten word: First and second order Hidden Markov Model based approach*, Vol. 22, no. 3, Pattern Recognition (1989). This data is based on the dictionary entries of English words starting with each character.

F. Recognition

1. Introduction

For recognition of a character string, the segmentation technique for separating sub-character segments described above may be used. Using the process described above for the training mode, the binary feature vectors which correspond to each segment are found. The Bayesian distortion measure (defined above) for finding the distance of the observed segment from the statistical models for the trained segments is used. Modified Viterbi scoring is used to match the unknown connected segments against the single character HMMs. A level building procedure keeps track of the path yielding minimum distance (maximum probability) for the string up to any segment. Parallel processing techniques may be preferred for the recognition process 500 to minimize processing time. See Appendix, modules nrec.c and ndorec.c.

2. Viterbi Scoring

Let the states corresponding to I observations be defined as $Q=\{q_1, q_2, \ldots, q_i, \ldots, q_I\}$. The best state sequence (that is, the one which maximizes $P(Q|\overline{X})$, where $\overline{X}$ is the input observation sequence) is given by application of the Viterbi scoring procedure defined below:

i. Initialization:

$$\delta_1(j) = \pi_j b_j(X_1), \quad 1 \leq j \leq 2$$

$$\Psi_1(j) = 0$$

where $\delta_i(j)$ is the best score (highest probability) along a single path at observation i, and $\psi_i(j)$ keeps track of the optimal states which provide such score.

ii. Recursion:

$$\delta_i(m) = \max_{m-2 \leq j \leq m} [\delta_{i-1}(j) a_{jm}] b_m(X_i),$$

$$2 \leq i \leq I, \, 1 \leq m \leq J$$

$$\psi_i(m) = \operatorname*{argmax}_{m-2 \leq j \leq m} [\delta_{i-1}(j) a_{jm}],$$

$$2 \leq i \leq I, \, 1 \leq m \leq J$$

iii. Termination:

$$P^* = \max_{1 \leq j \leq J} [\delta_I(j)]$$

$$q_I^* = \operatorname*{argmax}_{1 \leq j \leq J} [\delta_I(j)]$$

iv. State sequence backtracking:

$$q_i^* = \psi_{i+1}(q_{i+1}^*),$$
$$i = I-1, I-2, \ldots, 1$$

Figure 20:
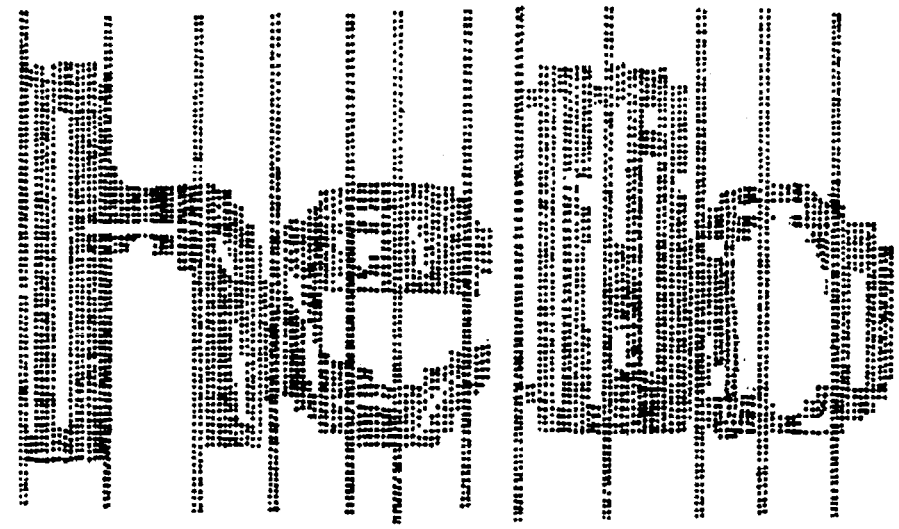
FIG. 20 presents a set of primitive features extracted from segments associated with the word hello.

A trellis structure, such as that presented in FIG. 20 and described by S. E. Levinson, L. R. Rabiner, M. M. Sondhi, *An introduction to the application of the theory of probabilistic functions of a Markov process to automatic speech recognition*, Vol. 62, no. 4, Bell Syst. Tech. Journal, 1035–1074, (April 1983), explains the implementation of Viterbi scoring (and the level-building technique). Each character is represented by a HMM, denoted as $\lambda^k$, ($1 \leq k \leq K$), where K is the total number of models, which may be greater than the number of characters to be identified. The HMMs allow state transitions (between two consecutive observations) either to the same state, or to the next state, or to the next higher state (skipping a state). The restrictions discussed above concerning penalty functions and state skipping are part of the model characteristics and reflect the nature of the character deformations. A character model is expected to start at the first or the second state. For each observation i, $\delta_i$ (m) is calculated for each state of each model. Based on the cumulative measure or score, a decision is made recursively on the optimum previous state at the previous observation (see FIG. 24). The above expressions for the termination and backtracking for a single model case have been modified in the level building algorithm described in the following section. For easier manipulations, the probabilities have been replaced by negative log-probabilities in the calculations of $b_m(X_i)$ and $\delta_i(m)$. (These are also referred to as "distances" herein.)

3. Level Building

In illustrative process 10 and recognition process 500, recognition is based on individual character models and is achieved through a determination of the optimum sequence of character models that best matches (in a maximum likelihood sense) the unknown character string (probably deformed and connected). The level building technique introduced above is applied to solve for such an optimum sequence of character models.

Figure 24:
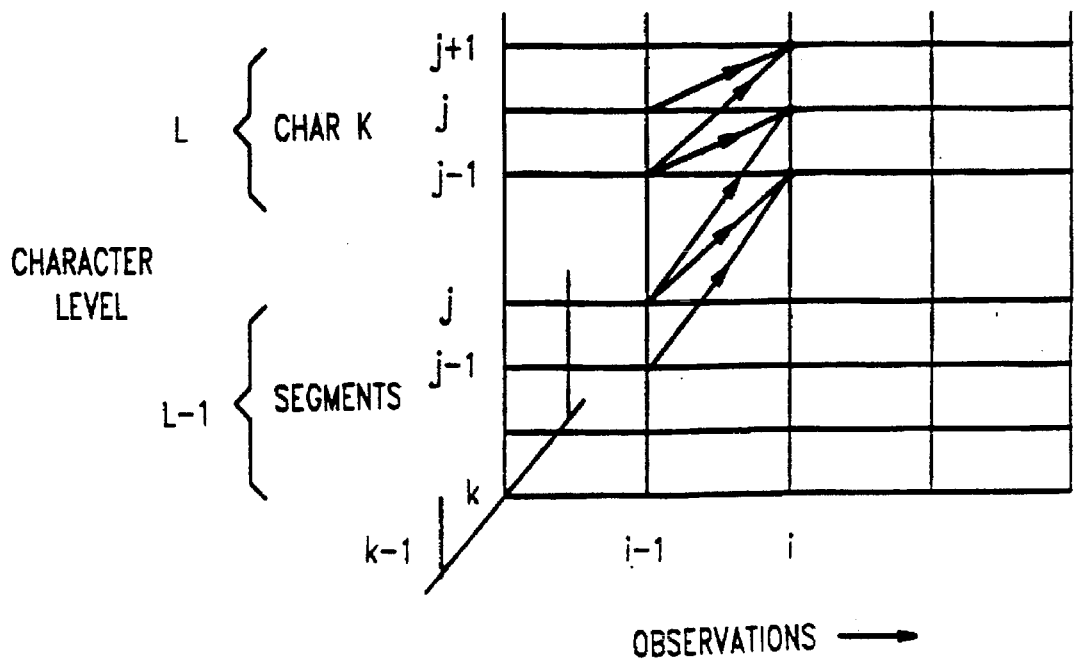
FIG. 24 presents a trellis representative of the Viterbi scoring and level building techniques.

The level building algorithm is presented in FIG. 24. In this figure, i is an observation point corresponding to the observation $X_i$, j is a state of the HMM $\lambda^k$, l is a level of the stacked models (level corresponds to character position within the string), and k (axis perpendicular to the plane of the page) is the character corresponding to the model $\lambda^k$. At each observation, the cumulative distances for each model and each state is updated for each level. The operation may be trimmed considerably by noting that, based on the slope of the trellis and the maximum number of states among the HMMs, some areas of the trellis cannot be reached.) At the end of each level l for the same observation, a minimization of the cumulative distance is performed over all k for identifying the best model at that observation with respect to each succeeding model.

If the cumulative distance at the end of level 1 for observation i is defined as $D_l^k$ (i), then the best model at observation i for the next character model p ($d_{tr}$(k, p) is the transition probability from model k to model p) is as follows:

$$D_{lp}^B(i) = \min_{1 \leq k \leq K} (D_l^k(i) + d_{tr}(k,p)), 1 \leq i \leq I;$$

$$C_{lp}^B(i) = \operatorname*{argmin}_{1 \leq k \leq K} (D_l^k(i) + d_{tr}(k,p)), 1 \leq i \leq I;$$

$$P_{lp}^B(i) = i - i_l, 1 \leq i \leq I;$$

where $C_{lp}^B(i)$ stores the value of k corresponding to the best character model at observation i, level 1 and for the next character p. $P_{lp}^B(i)$ stores the backpointer to the best model at the previous level corresponding to $C_{lp}^B(i)$. $i_l$ indicates the length (number of observations) of the current level for the model $C_{lp}^B(i)$. Since skipping of a state within a model is allowed, $D_l^k$ (i) holds the minimum of the cumulative distances at the last and next to last state of model $\lambda^k$.

The initial best probability (shortest cumulative distance) at each new level l for each model p is obtained from the stored value of $D_{lp}^B(i-1)$. The Viterbi score is incremented by matching the character models beginning at the new level.

The best character string of length l may be identified at each observation i by backtracking the pointer $P_{lp}^B(i)$ to l=1. This process continues recursively until the end of the maximum expected levels. The overall best string is obtained from min $D_{lp}^B(I)$, where L is the maximum expected number of characters in the string, I is the last observation and $d_{tr}$ (k,p)=0. See Appendix, modules nrec.c and ndorec.c.

4. Context by Lexicon

In addition to the context provided by the use of bi-gram probabilities, context may be provided through the use of a dictionary or lexicon. Words which are identified by the Viterbi/level building techniques may be compared with a lexicon of words to see if such identified words are present. If not, the closest word in the lexicon may be used in place of the identified word or, the closest word may simply be noted for future use by an operator.

Bose-Kuo 8-3

Appendix

Word Preprocessing a. ftr.h b. fe.c 5    c. prep.c d. clag.c e. lag.c f. dwln.c g. grylvl.c 10 ### Sub-Character Segmentation a. ftr.h b. fe.c c. lag.c d. clag.c 15    e. path_analy.c f. wx_detect.c g. blob_extr.c h. blobth.c i. y_detect.c 20    j. line_fit.c k. merge.c l. blob2feat.c m. dwln.c n. grylvl.c Bose-Kuo 8-3

Feature Extraction a. ftr.h b. fe.c c. seg2vec.c d. path_s.c e. dwln.c f. grylvl.c

Training a. cluster.h b. cluster.c c. quant.c

Recognition a. nrec.h b. nrec.c c. ndorec.c d. recinit.c

Bose-Kuo 8-3

```
/* extract seperated blobs from input image */          blob_extr.c
include <ftr.h> void blob_extr(rows,cols,node,no_node,blob_list,no_blob,clagimage)
int rows,cols,no_node;
struct node *node;
struct blob **blob_list;
int *no_blob;
int **clagimage;
{
  struct clagnode *clagnode;
  struct blob *add_blob(), *blob_t;
  void sort_blob();
  int no_clagnode, s_node, left,rgt;
  int **blob;
  int i,j,m,n,k;
  int clag_ct=0,col_start,col_end;

if((*blob_list=(struct blob *)calloc(1,sizeof(struct blob)))
     == (struct blob *)0 )
    printf("calloc fail in blob_list\n");
  (*blob_list)->next = (struct blob *)NULL;

s_node=1;
  *no_blob = 0;

do {
    blob_t = add_blob(*blob_list,s_node);
    *no_blob += 1;

clagnode = (struct clagnode *)calloc((unsigned) no_node,
                                         sizeof(struct clagnode));
    clagnode -= 1;   /* let clagnode number start from ONE */ no_clagnode=0;

clag(rows, node, s_node, clagnode, &no_clagnode);

/* look for the starting node for next blob */
    for(i=1;i<=no_node;i++)
      {
        if((node+i)->mark != 1)
          {
            s_node = i;
            break;
          }
        else  s_node=0;
      }

/* find start and end column for each blob and form clag-image */
    left = cols;
    rgt = 0;
    for(i=1;i<=no_clagnode;i++)
      {
        if((clagnode+i)->class=='p') clag_ct += 1;
        for(j=1;j<=((clagnode+i)->number);j++)
          {
            col_start = (node+(clagnode+i)->node[j])->col_start;
            if(left>col_start)
              left = col_start;
            col_end = (node+(clagnode+i)->node[j])->col_end;
            if(rgt<col_end)
              rgt=col_end;
            if((clagnode+i)->class=='p')
              for(n=col_start;n<=col_end;n++)
```

- 25 -

Bose-Kuo 8-3

```
                    clagimage[(node+(clagnode+i)->node[j])->rowth][n] = clag_ct;
        }
    blob_t->col_start = left;
    blob_t->col_end = rgt;

for(i=1;i<=no_clagnode;i++)
       free((char*)((clagnode+i)->node+1));
    for(i=1;i<=no_clagnode;i++)
       if((clagnode+i)->no_vector!=0) free((char*)((clagnode+i)->vctr+1));
    free((char*)(clagnode+1));

} while (s_node > 0);

for(i=1;i<=no_node;i++)
      {
        (node+i)->clagnode=0;
        (node+i)->clagnode_p=0;
        (node+i)->mark = 0;
      }

/* sort the blob_list */
    blob = imatrix(1,(*no_blob),1,3);
    blob_t = *blob_list;
    for(i=1;i<=(*no_blob);i++)
      {
        blob[i][1] = blob_t->s_node;
        blob[i][2] = blob_t->col_start;
        blob[i][3] = blob_t->col_end;
        blob_t = blob_t->next;
      }
    sort_blob(blob,(*no_blob));
    blob_t = *blob_list;
    for(i=1;i<=(*no_blob);i++)
      {
        blob_t->s_node = blob[i][1];
        blob_t->col_start = blob[i][2];
        blob_t->col_end = blob[i][3];
        blob_t = blob_t->next;
      }
    free_imatrix(blob,1,(*no_blob),1,3);

}

/* rerange f from min. to max. */
void sort_blob(f,n)
int **f;
int n ;
{
  int ith,i,k ;
  int min,s_node,end ;

for(k=1; k<=n; ++k)
    {
      min = 9999999999 ;
      for(i=k; i<=n; ++i)
        {
          if ( f[i][2] < min )
            {
              ith = i ;
              min = f[i][2] ;
            }
        }
      s_node = f[ith][1];
      end = f[ith][3];
```

Bose-Kuo 8-3

```
        f[ith][1] = f[k][1] ;
        f[ith][2] = f[k][2] ;
        f[ith][3] = f[k][3] ;
        f[k][1] = s_node ;
        f[k][2] = min ;
        f[k][3] = end ;
      }
}

/* add new entry to end of blob_list */
 truct blob *add_blob(blob_list,s_node)
.truct blob *blob_list;
int s_node;
{ while( blob_list->next != (struct blob *)NULL )
    blob_list = blob_list->next;
  /* reserve a space for the next new entry */
  if((blob_list->next=(struct blob *)calloc(1,sizeof(struct blob)))
      == (struct blob *)0 )
    printf("calloc fail in add_vctr(): 1\n");
  /* add NULL to the new end of the list */
  (blob_list->next)->next = (struct blob *)NULL;

blob_list->s_node = s_node;

return(blob_list);
}
```

- 27 -

Bose-Kuo 8-3 blob2feat.c

```c
/* Conversion of Blob to Feature Vectors.
 *
 *
 *
 */ include <math.h>
include <ftr.h>
include <cluster.h> define GAP    2.0      /* minimum width of a segment */
define MINVEC 2.0      /* minimum length of a vector */
#define NX     0        /* no intersect */
#define NV     1        /* x/v-intersect */
#define LV     2        /* intersect with left vector vertical */
#define RV     3        /* intersect with right vector vertical */
/*
typedef struct
{
        float start;
        float end;
        char type;
} BSEG;
*/ void blob2feat(bimage, bcol, vctr_list, bname, base, out1,
                        dspl_s, dspl, col_start,in,lagimg,clagimg)
int **bimage, bcol, **dspl_s, **dspl, col_start,**lagimg,**clagimg;
struct vector *vctr_list;
char bname;
int base;
FILE *out1;
PICFILE *in;
{
        extern int Rows, Cols;
        struct vector **vppt, *vecpt, *vec, *vtemp;
        static BSEG    seg[20];
        FEAT feat;
        int i, j, k, vcount, scount, flag, vec_id, x1;
        void sort(), find_x(), vec2param();
        float x, y, z, laststart, lastend, *xvec, vwi, vwj, wid, width();
        float isect, vend, len;
        struct vector *v_list, *vctr;
        char dum[20];
        int type;

/* Find the total count of vectors in the blob */
        /* and sort them based on their x-location    */ for (vcount = 0, vecpt = vctr_list; (vecpt->next !=
                (struct vector *) NULL); vecpt = vecpt->next)
                        vcount++;

if (!vcount)
        {
                seg[0].start = 0;
                seg[0].end = (float) bcol;
                seg[0].type = 'h';
```

Bose-Kuo 8-3

```
                scount = 1;
                goto do_vec;
        } vec = (struct vector *) calloc((unsigned)vcount, sizeof(struct vector ));

/* Copy the vector list for manipulation */
        /* Interchange vector ends so that x1 < x2 */
        /* Place x[0] of vectors in an array for sorting */ xvec = (float *) calloc((unsigned)vcount, sizeof(float));

for (i=0, vecpt=vec, vctr=vctr_list; i<vcount; i++, vecpt++)
        {

*vecpt = *vctr;

/* flag very short vectors */
                /* do not flag vectors of type 'c', generated around
                   small holes, such as in char 'e' */ len = sqrt(SQR(vecpt->y[1]-vecpt->y[0]) +
                           SQR(vecpt->x[1]-vecpt->x[0]));

if ((len < MINVEC) && ((vecpt->small_v != 'c') || (len == 0)))
                        vecpt->type = 'e';

if (vecpt->x[0] > vecpt->x[1])
                {
                    vecpt->x[0] = vctr->x[1];
                    vecpt->y[0] = vctr->y[1];
                    vecpt->x[1] = vctr->x[0];
                    vecpt->y[1] = vctr->y[0];
                } wid = width(vecpt);

vecpt->l = MAX(0, vecpt->x[0] - wid);
                vecpt->r = MIN(vecpt->x[1] + wid, (float) bcol);

vecpt->id = -1;
                xvec[i] = vecpt->l;
                vctr = vctr->next;
        } if (vcount > 1)
                sort(vcount, xvec-1);

vppt = (struct vector **) calloc((unsigned)vcount,
                                    sizeof(struct vector *));

for (j=0; j<vcount; j++)
                for (i=0, vecpt=vec; i<vcount; i++, vecpt++)
                    if((vecpt->l == xvec[j]) && (vecpt->id == -1))
                    {
                        vppt[j] = vecpt;
                        vecpt->id = i;
                        break;
                    }
#ifdef DBUG5
        fprintf(stderr, "V_id  V_1   V_start  V_end   V_r   V_type\n\n");
        for (i=0; i<vcount; i++)
            fprintf(stderr, "%d  %0.2f  %0.2f   %0.2f   %0.2f   %c\n",
                    i, vppt[i]->l,
                vppt[i]->x[0], vppt[i]->x[1], vppt[i]->r, vppt[i]->type);
```

- 29 -

Bose-Kuo 8-3
endif

```c
        /* Do segmentation sequentially based on the spread of the
           "vertical" vectors.

Find the starting segment */ isect = vend = 0;
        flag = 0;
        for (i=0, scount=0; i<vcount; i++)
        {
                if ((vppt[i]->type == 'v') || (vppt[i]->type == 'I'))
                {
                        seg[scount].start = vppt[i]->l;

/* Check for segment overlap */ if (scount && ((seg[scount].start - seg[0].start) <= GAP))
                        {   /* merge with last seg */
                                scount = 0;
                        }
                        else if (scount)
                        {   /* modify end of prev. seg */
                                seg[0].end = MIN(seg[0].end,
                                                    (seg[1].start-0.1));
                        } seg[scount].end = 0;
                        seg[scount].type = 'v';
                        break;
                }
                else if ((vppt[i]->type == 'h') && !flag)
                {
                        seg[0].start = vppt[i]->l;
                        seg[0].end = vppt[i]->r;
                        seg[0].type = 'h';
                        scount = 1;
                        flag = 1;
                }
                else continue;
        } if (i == vcount)
        {
                seg[0].start = vppt[0]->l;
                seg[0].end = (float) bcol;
                seg[0].type = 'h';
                scount = 1;
                goto do_vec;
        } while (1)
        {
            vend = MAX(vend, vppt[i]->r);
            seg[scount].type = 'v';

if (vppt[i]->type == 'I')
            {
                seg[scount].end = vppt[i]->r;
                seg[scount+1].start = MIN((float) bcol,
                                            seg[scount].end + 0.1);
                scount++;
            }

/* Find next "vertical" vector */
```

Bose-Kuo 8-3

```
        for (j=i+1; j<vcount; j++)
            if ((vppt[j]->type == 'v')  || (vppt[j]->type == 'I'))
            {
                break;
            } if (j == vcount)
        {
            if (isect && ((isect - seg[scount].start) > GAP))
            {
                seg[scount].end = isect - 0.1;
                seg[scount].type = 'v';
                scount++;
                seg[scount].start = isect;
            } break;
        } z = vppt[j]->l;

/* Set seg.end if an intersect was detected */ if (isect && (seg[scount].start < isect) && (z > isect))
        {
            if ((isect - seg[scount].start) > GAP)
            {
                seg[scount].end = isect - 0.1;
                seg[scount].type = 'v';
                scount++;
                seg[scount].start = isect;
            }
        }

/* Set seg.end if next vert is clear */ if (z > vend)
        {
            if ((vend - seg[scount].start) > GAP)
            {
                seg[scount].end = vend;
                seg[scount].type = 'v';
                scount++;
                seg[scount].start = vend + 0.1;
            } if ((z - seg[scount].start) > GAP)
            {
                seg[scount].end = z - 0.1;
                seg[scount].type = 'h';
                scount++;
                seg[scount].start = z;
            }
            else
            {
                seg[scount].start = z;
            }
        }
        else if (vppt[j]->type == 'I')
        {
            if ((z - seg[scount].start) > GAP)
            {
                seg[scount].end = z - 0.1;
                seg[scount].type = 'v';
                scount++;
                seg[scount].start = z;
```

- 31 -

Bose-Kuo 8-3

```
                }
                else if ((z - seg[scount].start) < 0)
                    scount--;   /* merge with prev. segment */
            }

/* Find intersect of i with all other vectors
               and set isect */ if (vppt[i]->type != 'I')
                for (k = i+1; k < vcount; k++)
                {

/* check, if vectors i and k intersect */ if (vppt[k]->l > vppt[i]->r) break;

find_x(vppt[i], vppt[k], &x, &y, &type);

if (type != NX)
                    {
                        isect = x;
                        break;
                    }
                } i = j;

} seg[scount].end = vend;
        seg[scount].type = 'v';

if (scount && ((seg[scount].end-seg[scount].start) <= GAP))
        {
            seg[scount-1].end = seg[scount].end;
            scount--;
        } if ((bcol-seg[scount].end) > GAP)
        {
            scount++;
            seg[scount].start = seg[scount-1].end + 0.1;
            seg[scount].end = bcol;
            seg[scount].type = 'h';
        } for (i=0; i<scount; i++)
        {
            seg[i].end = MIN(seg[i].end,
                             seg[i+1].start - 0.1);
            seg[i].end = MAX(seg[i].start, seg[i].end);
        } scount++;

do_vec:
#ifdef DBUG5
        fprintf(stderr, "scount, s_start s_end\n\n");
        for (i=0; i<scount; i++)
        {
            fprintf(stderr, "%d %0.1f     %0.1f\n",
                    i, seg[i].start, seg[i].end);
        }
```

- 32 -

Bose-Kuo 8-3

```
#endif

/* Convert segments to feature vectors and parameterize */ feat.lab[0] = ((bname > 0x20) ? bname : '?');   /* symbol name */
        feat.lab[3] = 0;
        for (i=0, k=0; i<scount; i++)
        {
                if ((seg[i].end - seg[i].start) <= GAP)
                        continue;

seg2vec(bimage, Rows, bcol, &seg[i], &v_list,col_start,lagimg,dspl_s,clagim ifdef DEMO
                /* show segment cutting line on vctr.pic */
                x1 = (int) ((seg[i].start+col_start)*10.0);
                if(x1<0) x1=0;
                dwln(x1,0,x1,Rows*10,90,dspl);
                dwln((x1+1),0,(x1+1),Rows*10,90,dspl);
                if(x1 != 0) dwln((x1-1),0,(x1-1),Rows*10,90,dspl);

/* show segment cutting line on vctrs.pic */
                x1 = (int)(((int)(seg[i].start+0.4)+col_start)*10.0);
                if(x1<0) x1=0;
                dwln(x1,0,x1,Rows*10,90,dspl_s);
                dwln((x1+1),0,(x1+1),Rows*10,90,dspl_s);
                if(x1 != 0) dwln((x1-1),0,(x1-1),Rows*10,90,dspl_s);

endif feat.lab[1] = k + 0x30;
                feat.num = (int) (seg[i].start + 0.5);
                vecpt = v_list;
                j = 0;
                while (vecpt->next != (struct vector *) NULL)
                {
                    vec2param((float)base, seg[i].start, seg[i].end,
                              vecpt, &feat);

/* Ignore very small vectors */ if (!feat.px && !feat.py)
                    {
                        vecpt = vecpt->next;
                        continue;
                    } feat.lab[2] = j + 0x30;

ifdef DEMO
                    outimg_s(dspl_s,vecpt,col_start);
endif ifdef DBUG5
                    fprintf(stderr, "%d %s %f %f %f %f %f\n", feat.num, feat.lab,
                            feat.x, feat.y, feat.px, feat.py, feat.d);
endif fprintf(outl, "%d %s %f %f %f %f %f\n", feat.num, feat.lab,
                            feat.x, feat.y, feat.px, feat.py, feat.d);

vecpt = vecpt->next;
                    if (!j) k++;
                    j++;
                }
                while( v_list->next != (struct vector *)NULL )
```

Bose-Kuo 8-3

```
                {
                        vctr=v_list;
                        v_list = v_list->next;
                        free(vctr);
                }
                free(v_list);
        } free((char*)vec);
        free((char*)xvec);
} void find_x(vpti, vptj, xpt, ypt, type)
struct vector *vpti, *vptj;
float *xpt, *ypt;
int *type;
{
        float x1, x2, x3, x4, y1, y2, y3, y4, m1, m2;
        float hyp1, hyp2, z1, z2;

x1 = vpti->x[0];
        y1 = vpti->y[0];
        x2 = vpti->x[1];
        y2 = vpti->y[1];

x3 = vptj->x[0];
        y3 = vptj->y[0];
        x4 = vptj->x[1];
        y4 = vptj->y[1];

m1 = (x2 - x1)/(y2 - y1);
        m2 = (x4 - x3)/(y4 - y3);

*ypt = (x3 - x1 - m2*y3 + m1*y1)/(m1 - m2);
        *xpt = x1 + m1*(*ypt - y1);

hyp1 = sqrt(SQR(y2-y1)+SQR(x2-x1));
        hyp2 = sqrt(SQR(y4-y3)+SQR(x4-x3));

z1 = (fabs(*xpt-x1) > fabs(*xpt-x2) ? (*xpt-x1) : (*xpt-x2));
        z2 = (fabs(*xpt-x3) > fabs(*xpt-x4) ? (*xpt-x3) : (*xpt-x4));

/* Determine if the vectors intersect */ if (((fabs(m1) < 0.26) && (hyp1 <= 4.0)) ||
                ((fabs(m2) < 0.26) && (hyp2 <= 4.0)))
        {
                *type = NX;
                return;
        } else if ((*xpt>=x1) && (*xpt<=x2) && (*xpt>=x3) && (*xpt<=x4) &&
                        (hyp1 > MINVEC) && (hyp2 > MINVEC))
                *type = NV;

else if ((m1*m2 < 0) && (z1*z2 < 0) && ((x3-x2) <= GAP))
                *type = NV;

else
        {
                *type = NX;
                return;
        }
```

- 34 -

Bose-Kuo 8-3

```c
        /* Find if the intersect forms a "vertical V" */ if ((hyp1>5) && (fabs(m1)<0.2))
            *type = LV; /* left vector vert */ else if ((hyp2>5) && (fabs(m2)<0.2))
            *type = RV; /* right vector vert */ else
            *type = NV; /* no vert */
} void vec2param(base, beg, end, vpt, fpt)
float base, beg, end;
struct vector *vpt;
FEAT *fpt;
{
        float x1, y1, x2, y2, x, y;
        float sint, cost, sin2t, cos2t, hyp;
/*
        fpt->d = 3.0 * (vpt->dst);      normalize wrt other parameters */ fpt->d = vpt->dst;

if (fpt->d)
        {
                x1 = vpt->ax[0] - (end + beg)/2.0;
                y1 = base - vpt->ay[0];
                x2 = vpt->ax[1] - (end + beg)/2.0;
                y2 = base - vpt->ay[1];
        }
        else
        {
                x1 = vpt->x[0] - (end + beg)/2.0;
                y1 = base - vpt->y[0];
                x2 = vpt->x[1] - (end + beg)/2.0;
                y2 = base - vpt->y[1];
        }

/* Make x1 <= x2 for limiting theta bet. -90 and +90 */ if (x1 > x2)
        {
                x = x1, y = y1;
                x1 = x2, y1 = y2;
                x2 = x, y2 = y;
        } hyp = sqrt(SQR(y2-y1)+SQR(x2-x1));
        if (hyp < MINVEC)
        {
                fpt->px = 0;
                fpt->py = 0;
        }
        else
        {
                sint = (y2-y1)/hyp;
                cost = (x2-x1)/hyp;
                sin2t = 2*sint*cost;
                cos2t = 2*SQR(cost) - 1;

fpt->x = (x2+x1) / 2.0;
                fpt->y = (y2+y1) / 2.0;
                fpt->px = hyp * sin2t;
                fpt->py = hyp * cos2t;
```

Bose-Kuo 8-3

```
            if (fpt->d)
            {
                x = vpt->ax[2] - (end + beg)/2.0;
                y = base - vpt->ay[2];

if (x <= x1)
                        fpt->d = -fpt->d;

else if (x2 > x1)
                    if (fabs((y-y1)/(x-x1)) > fabs((y2-y1)/(x2-x1)))
                        fpt->d = -fpt->d;
            }
        }
} float width(vpt)
struct vector *vpt;
{
        float x1, y1, x2, y2, x, y, hyp, m, sint;

if (vpt->type == 'h') return(0);

x1 = vpt->x[0];
        y1 = vpt->y[0];
        x2 = vpt->x[1];
        y2 = vpt->y[1];

/* Make x1 <= x2 for limiting theta bet. -90 and +90 */ if (x1 > x2)
        {
                x = x1, y = y1;
                x1 = x2, y1 = y2;
                x2 = x, y2 = y;
        } m = (x2 - x1)/(y2 - y1);

hyp = sqrt(SQR(y2-y1)+SQR(x2-x1));

if ((fabs(m) < 0.23) && (hyp > 4.0))
          {
            vpt->type = 'I';
            return( vpt->width/2.0);
          } else if ((vpt->small_v == 'c') && (hyp < MINVEC))
          return((vpt->width < 8.0) ? (vpt->width/2.0) : 4.0);

else return( vpt->width/4.0 );
}
```

Bose-Kuo 8-3 blobth.c

```c
/* retrieve an image contains seperated blobs and return a vector list
   containing all vectors inside this blob */ include <ftr.h> void blobth(blob_list,gnode,rows,bimage,bcol,b_col_start,b_vctr_list,
            b_clagnode,b_no_clagnode,dspl)
struct blob **blob_list;
struct node *gnode;       /* globol lag node */
int rows,**dspl;
int ***bimage, *bcol, *b_col_start;
struct vector **b_vctr_list;
struct clagnode **b_clagnode;
int *b_no_clagnode;
{
  int **image,**image_loc,cols,no_clagnode=0,**group;
  int s_node,no_blob=1, no_node=0, max_no_node=0, node_ct=0;
  int i,j,m,n,k,col_start,col_end,s_clagnode,c_node;
  int clagnode_p,no,count,count_b,b_node;
  int x1,x2,x3,y1,y2,y3;
  int flag, find_theta();
  float *x,*y,width,ratio;
  struct clagnode *clagnode;
  struct node *node;
  struct vector *vctr_list, *vctr, *vctr1, *vctr2;
  struct blob *blobin,*blob_max;

if((vctr_list=(struct vector *)calloc(1,sizeof(struct vector)))==
     (struct vector *)NULL)
    printf("calloc fail in vctr_list\n");
  vctr_list->next = (struct vector *)NULL;

blobin = *blob_list;

col_start = blobin->col_start;
  col_end = blobin->col_end;
  for( ; (blobin->next!=(struct blob *)NULL) ; )
    {
      blobin = blobin->next;
      if( blobin->next==(struct blob *)NULL ) break;
      else if( ((col_start-2)<blobin->col_start &&
           (col_end+2)>blobin->col_end) )
        {
          if(blobin->col_start<col_start) col_start=blobin->col_start;
          if(blobin->col_end>col_end) col_end=blobin->col_end;
          no_blob += 1;
        }
      else if( (col_start>(blobin->col_start-2) &&
               col_end<(blobin->col_end+2)) )
        {
          if(blobin->col_start<col_start) col_start=blobin->col_start;
          if(blobin->col_end>col_end) col_end=blobin->col_end;
          no_blob += 1;
        }
      else break;
    } cols = col_end - col_start + 1 ;
  image = imatrix(0,(rows-1),0,(cols-1));
  image_loc = imatrix(0,(rows-1),0,(cols-1));
  /* initialize background to white */
  for(i=0;i<rows;i++)
    for(j=0;j<cols;j++)
      {
        image_loc[i][j] = 255;
```

Bose-Kuo 8-3

```
      image[i][j] = 255;
   }

/* form the image */ clagnode = (struct clagnode *)calloc((unsigned) (cols*rows/2),
                                    sizeof(struct clagnode));
clagnode -= 1;   /* let clagnode number start from ONE */ blobin = *blob_list;
for(i=1;i<=no_blob;i++)
   {
      s_clagnode = no_clagnode+1;
      s_node = blobin->s_node;
      no_node=0;
      node_ct=0;
      clag(rows, gnode, s_node, clagnode, &no_clagnode);
      for(j=s_clagnode;j<=no_clagnode;j++)
        for(m=1;m<=((clagnode+j)->number);m++)
           {
              clagnode_p = (gnode+((clagnode+j)->node[m]))->clagnode_p;
              if(clagnode_p==0 || (clagnode_p!=0 && clagnode_p!=j))
                 no_node += 1;
           }
      blobin->no_node = no_node;
      if((blobin->node=(int*)calloc(no_node,sizeof(int))) == (int*)0)
         printf("calloc fail in blobin->node\n");
      blobin->node -= 1;
      for(j=s_clagnode;j<=no_clagnode;j++)
        for(m=1;m<=((clagnode+j)->number);m++)
           {
              clagnode_p = (gnode+((clagnode+j)->node[m]))->clagnode_p;
              if(clagnode_p==0 || (clagnode_p!=0 && clagnode_p!=j))
                 {
                    node_ct += 1;
                    blobin->node[node_ct]=(clagnode+j)->node[m];
                 }
           }
      if(no_node != node_ct) printf("error in blob->node finding\n");

if(no_node > max_no_node)
         {
            max_no_node = no_node;
            blob_max = blobin;
         } width = 0.0;
      ratio=0.0;
      for(j=1;j<=no_node;j++)
         {
            c_node = blobin->node[j];
            width += (float)((gnode+c_node)->col_end -
                             (gnode+c_node)->col_start+1);
            for(m=((gnode+c_node)->col_start);
                m<=((gnode+c_node)->col_end);m++)
               image[(gnode+c_node)->rowth][m-col_start] = 0;
         }
      width /= (float)no_node;
      ratio = (float)no_node / width;
      blobin->ratio = ratio;

blobin = blobin->next;
   } for(i=1;i<=no_clagnode;i++)
   free((char*)((clagnode+i)->node+1));
```

Bose-Kuo 8-3

```
free((char*)(clagnode+1));

/* vectorize only the largest blob and blobs have dominant verticals */
for(j=1;j<=max_no_node;j++)
   {
      c_node = blob_max->node[j];
      for(m=((gnode+c_node)->col_start);
          m<=((gnode+c_node)->col_end);m++)
         image_loc[(gnode+c_node)->rowth][m-col_start] = 0;
   }
if(no_blob>1)
   {
      blobin = *blob_list;
      for(i=1;i<=no_blob;i++)
         {
            if(blobin!=blob_max && blobin->ratio>3.0)
               for(j=1;j<=(blobin->no_node);j++)
                  {
                     c_node = blobin->node[j];
                     for(m=((gnode+c_node)->col_start);
                         m<=((gnode+c_node)->col_end);m++)
                        image_loc[(gnode+c_node)->rowth][m-col_start] = 0;
                  }
            blobin = blobin->next;
         }
   } ifdef DEMO
   /* write the blob image into the displaying-purpose array */
   for(i=0;i<(10*rows);i++)
      for(j=0;j<(10*cols);j++)
         dspl[i][j+10*col_start] = image_loc[i/10][j/10];
endif node = (struct node *) calloc((unsigned)(cols*rows),sizeof(struct node));
   if(node == (struct node *) NULL)
      {
         fprintf(stderr, "calloc failed for node\n");
         exit (1);
      }
   node -= 1;   /* let node number start from ONE */ lag(image_loc, rows, cols, node, &no_node);
   clagnode = (struct clagnode *)calloc((unsigned) (no_node),
                                         sizeof(struct clagnode));
   clagnode -= 1;  /* let clagnode number start from ONE */ no_clagnode = 0;
   s_node = 1;
   do{
      clag(rows, node, s_node, clagnode, &no_clagnode);
      /* look for the starting node for next blob */
      for(i=1;i<=no_node;i++)
         {
            if((node+i)->mark != 1)
               {
                  s_node = i;
                  break;
               }
            else s_node=0;
         }
   } while (s_node > 0);

/* Analysis each clag-path-node */
   for(i=1;i<=no_clagnode;i++)
```

- 39 -

```
Bose-Kuo 8-3 if((clagnode+i)->class=='p')
       path_analy(image_loc,rows,cols,node,clagnode,i,vctr_list);

/* merging vectors in adjacent clag-path-nodes */
 do
    {
       merge(vctr_list,clagnode,no_clagnode,&flag);
    } while(flag == 1);

/* delete the 'v' vectors if they are not merged with other vectors or
    the merged 'v' has large angle */
 for(i=1;i<=no_clagnode;i++)
    if((clagnode+i)->type == 'v')
       {
          if((clagnode+i)->no_vector != 2)  printf("error in blobth(1)\n");
          vctr1 = (clagnode+i)->vctr[1];
          vctr2 = (clagnode+i)->vctr[2];
          if(vctr1->no_clag==1 && vctr2->no_clag==1 )
             {
                if(vctr1->clagnode[0]!=i || vctr2->clagnode[0]!=i )
                  printf("error in blobth(2)\n");
                dlt_vctr(&vctr_list,vctr1);
                dlt_vctr(&vctr_list,vctr2);
                (clagnode+i)->no_vector = 0;
                free((char*)((clagnode+i)->vctr+1));
             }
/* CAUTION: if the following block is implemented, the vector information
            inside clagnode structure is wrong */
          else if( find_theta(vctr1,vctr2) )
             {
                dlt_vctr(&vctr_list,vctr1);
                dlt_vctr(&vctr_list,vctr2);
                (clagnode+i)->no_vector = 0;
                free((char*)((clagnode+i)->vctr+1));
             }
       }

/* prepare output data */
 for(i=1;i<=no_blob;i++)
    *blob_list = (*blob_list)->next;
 *bimage = image;
 *bcol = cols;
 *b_vctr_list = vctr_list;
 *b_clagnode = clagnode;
 *b_no_clagnode = no_clagnode;
 *b_col_start = col_start;

free_imatrix(image_loc,0,(rows-1),0,(cols-1));
 free((char*)(node+1));

} find_theta(vpti, vptj)
struct vector *vpti, *vptj;
{
        float x1, x2, x3, x4, y1, y2, y3, y4;
        float sint1, sint2, cost1, cost2;
        float hyp1, hyp2;

x1 = vpti->x[0];
        y1 = vpti->y[0];
        x2 = vpti->x[1];
        y2 = vpti->y[1];

x3 = vptj->x[0];
        y3 = vptj->y[0];
```

Bose-Kuo 8-3

```
        x4 = vptj->x[1];
        y4 = vptj->y[1];

if (x2==x1 || x4==x3) return (-1);

hyp1 = sqrt((y2-y1)*(y2-y1)+(x2-x1)*(x2-x1));
        hyp2 = sqrt((y4-y3)*(y4-y3)+(x4-x3)*(x4-x3));

sint1 = fabs((x2-x1)/hyp1);
        cost1 = fabs((y2-y1)/hyp1);

sint2 = fabs((x4-x3)/hyp2);
        cost2 = fabs((y4-y3)/hyp2);

if ((cost1*cost2 - sint1*sint2) > 0.0)
                return (0);
        else return (1);
}
```

Bose-Kuo 8-3 clag.c
```
/* convert LAG to c-LAG */ include <ftr.h>
define JOUT 1.4  /* threshold for outlier in including junction to path */ void clag(rows, node, s_node, clagnode, no_clagnode)
int rows;
int s_node;    /* starting node in the lag to do clag converting */
int *no_clagnode;
struct node *node;
struct clagnode *clagnode;
{
  void pushval(),popval();
  int c_node, p_node, nbr_node;
  int i,j;
  int count,find,touch;
  int s_clagnode;
  struct stack *ST;
  int *PATH;
  float width,width_j;
  int flag;

s_clagnode = *no_clagnode + 1;

ST = (struct stack *)NULL ;
  if( (PATH=(int *)calloc((unsigned)rows,sizeof(int))) == (int *)0 )
    printf("calloc fail in PATH \n");
  PATH -= 1;     /* index start from ONE */
  pushval(&ST,s_node,0);
  while( ST != (struct stack *)0 )      /* step 2 */
    {
      popval(&ST,&c_node,&p_node);
      if( (node+c_node)->mark == 1 )   continue;
      count=1;
      PATH[count]=c_node;

/* similar to "do B" loop */
      do
        {
          c_node=PATH[count];
          find=0;
          touch =0;
          for(i=1;i<=((node+c_node)->above);i++)
            {
              nbr_node=(node+c_node)->a_node[i-1];
              touch += 1;
              if(nbr_node == p_node) continue;
              if( ((node+nbr_node)->mark) != 1)
                {
                  find += 1;
                  if(find==1)
                    {
                      count += 1;
                      PATH[count]=nbr_node;
                    }
                  else   pushval(&ST,nbr_node,c_node);
                }
            }
          for(i=1;i<=((node+c_node)->below);i++)
            {
              nbr_node=(node+c_node)->b_node[i-1];
              touch += 1;
              if(nbr_node == p_node) continue;
              if( ((node+nbr_node)->mark) != 1)
                {
```

Bose-Kuo 8-3

```
                find += 1;
                if(find==1)
                   {
                     count += 1;
                     PATH[count]=nbr_node;
                   }
                else    pushval(&ST,nbr_node,c_node);
             }
        }
     /* similar to step 14 (creat a junction and/or a path)*/
     if(find>0 && ((node+c_node)->above>=2 || (node+c_node)->below>=2))
        {
           if(count>2)
              {
                *no_clagnode += 1;
                (clagnode+*no_clagnode)->class='p';
                (clagnode+*no_clagnode)->number = count-2;
                if( ((clagnode+*no_clagnode)->node =
                       (int *)calloc((unsigned)(count-2),sizeof(int)))
                    == (int *)0 )
                  printf("calloc fail in clagnode->node: 'p'\n");
                (clagnode+*no_clagnode)->node -= 1;  /* start from ONE */
                for(i=1;i<=(count-2);i++)
                   {
                     (clagnode+*no_clagnode)->node[i] = PATH[i];
                     (node+PATH[i])->mark = 1;
                     (node+PATH[i])->clagnode = *no_clagnode;
                   }
              }
           *no_clagnode += 1;
           (clagnode+*no_clagnode)->class='j';
           (clagnode+*no_clagnode)->number = 1;
           if( ((clagnode+*no_clagnode)->node =
                  (int *)calloc(1,sizeof(int))) == (int *)0 )
             printf("calloc fail in clagnode->node: 'j'\n");
           (clagnode+*no_clagnode)->node -= 1;  /* start from ONE */
           (clagnode+*no_clagnode)->node[1]=PATH[count-1];
           (node+PATH[count-1])->mark = 1;
           (node+PATH[count-1])->clagnode = *no_clagnode;
           PATH[1] = PATH[count];
           count = 1;
        }
      p_node=c_node;
  } while(find != 0);

/* similar to step 15 & 16 */
/* creat a path node if paths exist */
if(((node+c_node)->above >= 2) || ((node+c_node)->below >= 2))
   count -= 1;
if(count>0)
   {
     *no_clagnode += 1;
     (clagnode+*no_clagnode)->class='p';
     (clagnode+*no_clagnode)->number = count;
     if( ((clagnode+*no_clagnode)->node =
            (int *)calloc((unsigned)count,sizeof(int))) == (int *)0 )
       printf("calloc fail in clagnode->node: 'p'\n");
     (clagnode+*no_clagnode)->node -= 1;  /* start from ONE */
     for(i=1;i<=count;i++)
        {
          (clagnode+*no_clagnode)->node[i] = PATH[i];
          (node+PATH[i])->mark = 1;
          (node+PATH[i])->clagnode = *no_clagnode;
        }
   }
/* creat a junction if it exists */
```

- 43 -

Bose-Kuo 8-3

```
        if(((node+c_node)->above >= 2) || ((node+c_node)->below >= 2))
        {
           *no_clagnode += 1;
           (clagnode+*no_clagnode)->class='j';
           (clagnode+*no_clagnode)->number = 1;
           if( ((clagnode+*no_clagnode)->node =
                (int *)calloc(1,sizeof(int))) == (int *)0 )
             printf("calloc fail in clagnode->node: 'j'\n");
           (clagnode+*no_clagnode)->node -= 1;    /* start from ONE */
           (clagnode+*no_clagnode)->node[1]=PATH[count+1];
           (node+PATH[count+1])->mark = 1;
           (node+PATH[count+1])->clagnode = *no_clagnode;
        }
   }

/* sort nodes inside each path_node in increasing order */
for(i=s_clagnode;i<=*no_clagnode;i++)
   if((clagnode+i)->class == 'p' && (clagnode+i)->number > 1)
   {
      if((clagnode+i)->node[2] < (clagnode+i)->node[1])
      {
         count=(clagnode+i)->number ;
         for(j=1;j<=count;j++)
            PATH[count-j+1] = (clagnode+i)->node[j] ;
         for(j=1;j<=count;j++)
            (clagnode+i)->node[j] = PATH[j] ;
      }
   }

/* modify c-lag: when one of the degrees of a junction is 1, the junction
   is included in the path connected to the junction if the junction is
   not a outlier */
for(i=s_clagnode;i<=*no_clagnode;i++)
   if((clagnode+i)->class == 'p')
   {
      count = 0;
      c_node=(clagnode+i)->node[1];
      if((node+c_node)->above == 1 )
      {
         p_node=(node+c_node)->a_node[0];

/* check the junction is a outlier or not */
         width_j=(float)((node+p_node)->col_end -
                         (node+p_node)->col_start+1);
         flag=0;
         for(j=1;j<=((clagnode+i)->number);j++)
         {
            c_node=(clagnode+i)->node[j];
            width = ((float)((node+c_node)->col_end -
                             (node+c_node)->col_start + 1)) ;
            if(width_j < JOUT*width ) flag=1;
         } if((node+p_node)->below == 1 && flag==1 )
         {
            count += 1;
            PATH[count]=p_node;
            (node+p_node)->clagnode_p = i;
         }
      } for(j=1;j<=((clagnode+i)->number);j++)
      {
         count += 1;
         PATH[count]=(clagnode+i)->node[j];
      }
```

Bose-Kuo 8-3

```
         c_node=(clagnode+i)->node[(clagnode+i)->number];
         if((node+c_node)->below == 1 )
            {
               p_node=(node+c_node)->b_node[0];

/* check the junction is a outlier or not */
               width_j=(float)((node+p_node)->col_end -
                               (node+p_node)->col_start+1);
               flag=0;
               for(j=1;j<=((clagnode+i)->number);j++)
                  {
                     c_node=(clagnode+i)->node[j];
                     width = ((float)((node+c_node)->col_end -
                                     (node+c_node)->col_start + 1)) ;
                     if(width_j < JOUT*width ) flag=1;
                  } if((node+p_node)->above == 1 && flag==1 )
                  {
                     count += 1;
                     PATH[count]=p_node;
                     (node+p_node)->clagnode_p = i;
                  }
            } free((char*)((clagnode+i)->node+1));
         if( ((clagnode+i)->node =
              (int *)calloc((unsigned)count,sizeof(int))) == (int *)0 )
            printf("calloc fail in clagnode->node: 'p'\n");
         (clagnode+i)->node -= 1;    /* start from ONE */
         for(j=1;j<=count;j++)
            (clagnode+i)->node[j]=PATH[j];
         (clagnode+i)->number=count;
      }

/* connect adjacent c-lag nodes */
   for(i=s_clagnode;i<=*no_clagnode;i++)
      if((clagnode+i)->class == 'j')
         {
            c_node=(clagnode+i)->node[1];
            for(j=1;j<=((node+c_node)->above);j++)
               {
                  nbr_node=(node+c_node)->a_node[j-1];
                  (clagnode+i)->a_clagnode[j-1]=(node+nbr_node)->clagnode;
                  if((clagnode+(node+nbr_node)->clagnode)->class=='p')
                     (clagnode+(node+nbr_node)->clagnode)->b_clagnode[0]=i;
               }
            for(j=1;j<=((node+c_node)->below);j++)
               {
                  nbr_node=(node+c_node)->b_node[j-1];
                  (clagnode+i)->b_clagnode[j-1]=(node+nbr_node)->clagnode;
                  if((clagnode+(node+nbr_node)->clagnode)->class=='p')
                     (clagnode+(node+nbr_node)->clagnode)->a_clagnode[0]=i;
               }
         } free((char*)(PATH+1));
   free((char*)ST);
}
#undef JOUT

/* push a node into stack */
void pushval(stack,node,p_node)
int node,p_node;
struct stack **stack;
```

- 45 -

Bose-Kuo 8-3

```
   {
      struct stack *np;

np=(struct stack *) malloc(sizeof(struct stack));
      if( np == (struct stack *) 0 ) printf("malloc fail in pushval()\n");
      np->node = node;
      np->p_node = p_node;
      /* push operation */
      np->next = *stack;
      *stack = np;
   }

/* pop a node from stack */
void popval(stack,node,p_node)
int *node, *p_node;
struct stack **stack;
   {
      struct stack *out;

/* pop operation */
      if( (out=*stack) == (struct stack *) 0 )
         printf("STACK empty\n");
      else
         {
            *stack = out->next;
            out->next = (struct stack *)0;
         }
      /* get the value */
      *node = out->node;
      *p_node = out->p_node;
      free((char*)out);
   }
```

Bose-Kuo 8-3

```
/****************************************************************/
/*                                                              */
/*                       CLUSTER.C                              */
/*                                                              */
/****************************************************************/

/*
 * cluster: find cluster centers for a set of feature vectors
 *
 *
 * usage: cluster [-i file.fv] [-s seed.fv] [-c file.cv]
 * usage: cluster [-q file.sv]
 *
 */ include <cluster.h> define  K       32       /* max no of clusters */
define  S       10       /* initial no. of seeds if seed file is unavailable*/ main(argc, argv)
int argc;
char *argv[];
{
    register int i, j, jj, k, n;
    int    nfeat = 0;         /* no. of features for clustering */
    int    nclust = 0;        /* no. of active clusters */
    int    old_nclust;
    FILE   *f1, *f2, *f3, *f4;
    static FEAT feat[2200], old_feat[2200], *fpt, *fpt1;
    static CLUST clust[K], old_clust[K], new_cl, *new_clust, *cpt, *cpt1;
    char   file1[40], file2[40], file3[40], file4[40];
    short  cent = 0, quantize = 0, seed = 0, go_end = 0;
    short  change, mid, bigclust, minclust;
    float  gindex, old_gindex = 0, mean_var;
    float  mval, mdist, fdist(), cdist(), dum1;
    float  *data, adev;
    void   pr_clust(), rs_ex(), quant();

sprintf(file2,"temp.cv");  /* default file */
    sprintf(file3,"temp.sv");  /* default file */ while(argc-- > 1)
        if(argv[argc][0] == '-')
            switch(argv[argc][1])
            {
                case 'u':
                    printf("usage: usage: cluster [-i file.fv] [-s seed.fv]\
 [-c file.cv] [-q file.sv] \n");
                    exit(1);
                case 'i':      /* input file with feature vectors */
                    sprintf(file1,"%s",argv[argc+1]);
                    cent = 1;
                    break;
                case 's':      /* input file with cluster seeds */
                    sprintf(file4,"%s",argv[argc+1]);
                    seed = 1;
                    break;
                case 'c':      /* output/input file with cluster centers */
                    sprintf(file2,"%s",argv[argc+1]);
```

- 47 -

Bose-Kuo 8-3

```
                    break;
                case 'q':        /* output file with training vectors */
                    sprintf(file3,"%s",argv[argc+1]);
                    quantize = 1;
                    break;
                default:
                    break;
            } fpt = feat;
    cpt = clust;

if (!quantize)
    {
        if ((f1 = fopen (file1, "r")) == (FILE *) NULL)
        {
            fprintf(stderr, "*** clust.fv file cannot be opened\n");
            exit(1);
        }

/* Convert the label to index and increment corresponding
           entries in the segstat structure */

/* Read total no. of features */
/*      fscanf(f1, "%d", &nfeat);           */

/* clust.v file format: [serial label x y r t d] */ fpt = feat, i = 0;

while (fscanf(f1,"%d %s %f %f %f %f %f", &fpt->num, fpt->lab,
                &fpt->x, &fpt->y, &fpt->px, &fpt->py, &fpt->d) != EOF)
        {
            if (*(fpt->lab+2) != '*') {fpt++, i++;}
        } nfeat = i;
        minclust = MAX(2, nfeat*2/100);

#ifdef DBUG
        fprintf(stderr, "No. of entries in file.fv read = %d\n", nfeat);
endif /* If seed file is available, initialize the cluster points and
           set nclust (no. of clusters), else it is 0 */ if (seed)
        {
            if ((f4 = fopen (file4, "r")) == (FILE *) NULL)
            {
                fprintf(stderr, "*** clust.v file cannot be opened\n");
                exit(1);
            }

/*          fscanf(f4, "%d", &nclust);      Read total no. of seed clusters */

/* seed.v file format: [serial label x y r t d] */ cpt = clust, i = 0;

while (fscanf(f4,"%*s %*s %f %f %f %f %f",
                    &cpt->x, &cpt->y, &cpt->px, &cpt->py, &cpt->d) != EOF)
            {
                cpt++, i++;
```

- 48 -

Bose-Kuo 8-3

```
            }
            old_nclust = nclust = i;
    }
    else
            /* assume the first S entries as seeds */
    {
            old_nclust = nclust = MIN(nfeat, S);

for (i = 0, cpt = clust, fpt = feat; i < nclust; i++, cpt++, fpt++)
            {
                cpt->x = fpt->x;
                cpt->y = fpt->y;
                cpt->px = fpt->px;
                cpt->py = fpt->py;
                cpt->d = fpt->d;
            }
    }
    /* Assign all points to the clusters, find cluster centroids,
       reiterate. Exit when no reassignment */ new_clust = &new_cl;
    new_clust->x = 0;
    new_clust->y = 0;
    new_clust->px = 0;
    new_clust->py = 0;
    new_clust->d = 0;
    n = 0;  /* no. of new cluster allocations */ while(1)
    {
            for (k=0, change=1; (change && (k < 25)); k++)
            {
                /* Assign features to clusters */ for (i=0, fpt=feat, mid=0, change=0; i < nfeat; i++, fpt++)
                {
                    for (j=0, cpt1=clust, mval=MEG; j < nclust; j++, cpt1++)
                    {
                        duml = fdist(fpt, cpt1);
                        if (duml < mval) {mval = duml, mid = j;}
                    }

/* Store cluster info. in feature */ if (fpt->c_id != mid) change = 1;
                    fpt->c_id = mid;
                    fpt->c_dist = mval;
                }

/* Store cumulative distances in the cluster */
                /* and find centroids */ for (j = 0, cpt = clust; j < nclust; j++, cpt++)
                {
                    cpt->f_sum = 0;
                    cpt->x = 0;
                    cpt->y = 0;
                    cpt->px = 0;
                    cpt->py = 0;
                    cpt->d = 0;
                    cpt->var = 0;
                } for (i=0, fpt=feat, mval = MEG, mid=0; i < nfeat;
                    i++, fpt++)
                {
```

Bose-Kuo 8-3

```
                    cpt = clust + fpt->c_id;
                    (cpt->f_sum)++;
                    cpt->x += fpt->x;
                    cpt->y += fpt->y;
                    cpt->px += fpt->px;
                    cpt->py += fpt->py;
                    cpt->d += fpt->d;
                }

/* Find centroid of clusters */ for (j = 0, cpt = clust; j < nclust; j++, cpt++)
                {
                    cpt->x = cpt->x / cpt->f_sum;
                    cpt->y = cpt->y / cpt->f_sum;
                    cpt->px = cpt->px / cpt->f_sum;
                    cpt->py = cpt->py / cpt->f_sum;
                    cpt->d = cpt->d / cpt->f_sum;
                }
/***
#ifdef DBUG
                if (nclust == 11)
                for (i=0, cpt=clust+10, fpt=feat;
                        i<nfeat; fpt++, i++)
                {
                    if (fpt->c_id == 0)
                    fprintf(stderr, "**** For Debug Only (Cluster 11) ****\nfeat[%d]....
                }
endif
***/
                /* Remove any cluster with less than 2% population, */
/***
                for (j = 0, cpt = clust; j < nclust; j++, cpt++)
                {
                    if (cpt->f_sum < minclust)
                    {
                        for (i = j; i < nclust; i++)
                            *(clust+i) = *(clust+i+1);

nclust--, j--;
                        change = 1;
                    }
                }
***/
            } /* End of k-loop */

/* Find variance of clusters */ for (i=0, fpt=feat; i < nfeat; i++, fpt++)
            {
                cpt = clust + fpt->c_id;
                cpt->var += fpt->c_dist;
            } for (j = 0, mean_var = 0; j < nclust; j++)
            {
                cpt = clust + j;
                cpt->var = cpt->var / cpt->f_sum;
                if (cpt->var < 0.01)
                {
                        continue;
                }
                mean_var += cpt->var;
/***
                if (cpt->var < EPS)
```

- 50 -

Bose-Kuo 8-3

```
#ifdef DBUG
                {
                        fprintf(stderr, "Var = %.3f too low for Cluster %d\n",
                                cpt->var, j);
#endif
                        go_end = 1;
                }
***/
            }
            mean_var = mean_var / nclust;

data = (float *) calloc(nclust, sizeof (float));
            for (j = 0; j < nclust; j++)
            {
                cpt = clust + j;
                if (cpt->var < 0.01) continue;
                *(data + j) = cpt->var / mean_var;
            } if (nclust >= 2)
                find_sigma(data, nclust, &adev);
            free(data);

#ifdef DBUG
            fprintf(stderr, "Deviation of (Var/Mean_var) = %.3f\n", adev);
endif if (go_end)
            {
                if (n)
                {
                    gindex = old_gindex;
                    nclust = old_nclust;
                    rs_ex(clust, old_clust, feat, old_feat, nclust, nfeat);
                }
                break;
            }

/* Find compactness index for each cluster (weighted av.
               sq. distance to another cluster / variance of the cluster) */
            for (j = 0, cpt = clust; j < nclust; j++, cpt++)
            {
                for (jj=0, mval=0, cpt1=clust; jj < nclust; jj++, cpt1++)
                    if (jj != j) {mval += ((cdist(cpt1, cpt)) * cpt1->f_sum);} cpt->cindex = (mval / (nfeat-cpt->f_sum)) / cpt->var;
            }

/* If min Cindex exceed 15, exit */
            for (j = 0, cpt = clust, mval = MEG; j < nclust; j++, cpt++)
                if (cpt->cindex < mval)
                    mval = cpt->cindex;

if ((mval > 15) && (adev < 0.4))
            {
#ifdef DBUG
                fprintf(stderr, "All Cindex exceed 15\n");
#endif
#ifdef DBUG
                fprintf(stderr, "Deviation of (Var/Mean_var) is satisfactory\n");
#endif
                if (n)
```

- Bose-Kuo 8-3

```
            break;
        }

/* Find the the wt. av. cindex for all clusters and compare
           with the previous iteration (for nclust-1). If worse,
           return to previous configuration, else grow untill
           nclust = K is reached */ for (j = 0, cpt = clust, gindex = 0; j < nclust; j++, cpt++)
        {
            if (cpt->var < 0.01) continue;
            gindex += (cpt->cindex * cpt->f_sum);
        } gindex = gindex / nfeat;
        if (gindex <= old_gindex)
        {
#ifdef DBUG
            fprintf(stderr, "New Gindex %.3f < Old Gindex %.3f\n", gindex,
                    old_gindex);
#endif
            go_end = 1;
        }
        if (go_end)
        {
            if (n)
            {
                gindex = old_gindex;
                nclust = old_nclust;
                rs_ex(clust, old_clust, feat, old_feat, nclust, nfeat);
            }
            break;
        }
        /* Find min. dist to another cluster, must exceed 4(var) */
/* for (j = 0, cpt = clust; j < nclust; j++, cpt++)
            for (jj=0, mval=MEG, cpt1=clust; jj < nclust; jj++, cpt1++)
            {
                if ((jj != j) && (mdist = cdist(cpt1, cpt)) < mval)
                    mval = mdist;

if ((mval / cpt->var) < 4)
                {
#ifdef DBUG
                    fprintf(stderr, "Dist. of Clust %d to Clust %d is %.3f (less than 4)
#endif
                    go_end = 1;
                }
            } if (go_end)
        {
            if (n)
            {
                gindex = old_gindex;
                nclust = old_nclust;
                rs_ex(clust, old_clust, feat, old_feat, nclust, nfeat);
            }
            break;
        }
*/
        /* Find min cindex, quit if greater than 0.5 * gindex */
```

Bose-Kuo 8-3

```
        for (j = 0, cpt = clust, mval = MEG; j < nclust; j++, cpt++)
        {
            if (cpt->var <0.01) continue;
            if (mval > cpt->cindex)
            {
                mval = cpt->cindex;
                mid = j;
            }
        } if (mval > (gindex * 0.5))
        {
#ifdef DBUG
            fprintf(stderr, "Min. Cindex = %.3f for Cluster %d ( > 0.5*Gindex = %.3f)
                mval, mid, gindex);
#endif
            break;
        } if (nclust == K)
        {
#ifdef DBUG
            fprintf(stderr, "Cluster size is %d (max)\n", K);
#endif
            break;
        } ifdef DBUG
        fprintf(stderr, "No. of clust = %d, Iter = %d, Mean Var = %.3f, Gindex = %f\n
                nclust, k, mean_var, gindex);
/***
        pr_clust(feat, clust, nfeat, nclust);
***/
        fprintf(stderr, "C_id  Var Var/Mvar Cindex         Center \n");
        for (i = 0, cpt = clust; i < nclust; i++, cpt++)
        {
            fprintf(stderr, "%d    %.3f %.3f %.3f %.3f %.3f %.3f %.3f %.3f\n",
                    i, cpt->var, *(data+i), cpt->cindex,
                    cpt->x, cpt->y, cpt->px, cpt->py, cpt->d);
        }
        fprintf(stderr, "-----------------------------\n");
#endif
        /* Save the current configuration */ old_gindex = gindex;
        old_nclust = nclust;

for (j=0, cpt=clust, cpt1=old_clust; j<nclust; j++, cpt++,
             cpt1++) *cpt1 = *cpt;

for (i=0, fpt=feat, fpt1=old_feat; i<nfeat; i++, fpt++,
             fpt1++) *fpt1 = *fpt;

/* Find the cluster with min. cindex */ for (j = 0, cpt = clust, mval = MEG; j < nclust; j++, cpt++)
            if (cpt->cindex < mval)
            {
                mval = cpt->cindex, mid = j;
            } bigclust = mid;

/* Find the feature at the farthest dist in min. Cindex cluster */ for (i=0, fpt=feat, mval = EPS; i < nfeat; i++, fpt++)
```

- 53 -

Bose-Kuo 8-3

```
            {
                if ((fpt->c_id == bigclust) && (fpt->c_dist > mval))
                {
                    mid = i;
                    mval = fpt->c_dist;
                }
            } ifdef DBUG
            fprintf(stderr, "Worst Center ID = %d, Farthest Feature ID = %d\n",
                bigclust, mid);
endif /* If this feature was the new center at the previous iteration,
               exit */
/****
            if (old_nclust == nclust)
            {
                fpt = feat + mid;
                if ((new_clust->x == fpt->x) && (new_clust->y == fpt->y) &&
                    (new_clust->px == fpt->px) && (new_clust->py == fpt->py) &&
                    (new_clust->d == fpt->d))
                {
#ifdef DBUG
                    fprintf(stderr, "Cluster Centers same as in prev. iter.\n");
#endif
                    break;
                }
            }
***/

/* Save the current configuration */ old_gindex = gindex;
            old_nclust = nclust;

for (j=0, cpt=clust, cpt1=old_clust; j<nclust; j++, cpt++,
                cpt1++) *cpt1 = *cpt;

for (i=0, fpt=feat, fpt1=old_feat; i<nfeat; i++, fpt++,
                fpt1++) *fpt1 = *fpt;

/* Use this feature as center for the new cluster */ n++;
            nclust++;
            cpt = clust + nclust - 1;
            fpt = feat + mid;
            new_clust->x = cpt->x = fpt->x;
            new_clust->y = cpt->y = fpt->y;
            new_clust->px = cpt->px = fpt->px;
            new_clust->py = cpt->py = fpt->py;
            new_clust->d = cpt->d = fpt->d;

} /* End of while(1) loop */
#ifdef DBUG
        fprintf(stderr, "FINAL RESULTS:\n");
        fprintf(stderr, "No. of clust = %d, Iter = %d, Gindex = %f\n",
                nclust, k, gindex);
        pr_clust(feat, clust, nfeat, nclust);
endif if ((f2 = fopen (file2, "w")) == (FILE *) NULL)
        {
            fprintf(stderr, "*** seed.cv file cannot be opened\n");
```

- 54 -

Bose-Kuo 8-3

```
            exit(1);
        } fprintf(f2,"%d\n", nclust);
        for (i = 0, cpt = clust; i < nclust; i++, cpt++)
        {
            fprintf(f2, "%f %f %f %f %f\n",
                    cpt->x, cpt->y, cpt->px, cpt->py, cpt->d);
        } fclose(f1);
        fclose(f2);
        if (seed) fclose(f4);

}   /* End of if(!quantize) block */

/* Merge current clusters two at a time and check if it reduces
           the compactness measure...... */

/* The following part converts a continuous vector to a bit vector
       for representing a segment  */ else
    {
        /* Open file.fv file */ if ((f1 = fopen (file1, "r")) == (FILE *) NULL)
        {
            fprintf(stderr, "*** file.fv cannot be opened\n");
            exit(1);
        }

/* Open file.cv file */ if ((f2 = fopen (file2, "r")) == (FILE *) NULL)
        {
            fprintf(stderr, "*** file.cv cannot be opened\n");
            exit(1);
        }

/* Open file.sv file */ if ((f3 = fopen (file3, "w")) == (FILE *) NULL)
        {
            fprintf(stderr, "*** file.sv file cannot be opened\n");
            exit(1);
        }

/* Call quantizer program to convert a set of continuous feature
           vectors for a segment to a binary bit vector */ quant(f1, f2, f3);
        fclose(f1);
        fclose(f2);
        fclose(f3);

}
}
/*****************************************/

/* Cluster center to feature distance */ float fdist(fpt, cpt)
FEAT    *fpt;
CLUST   *cpt;
```

Bose-Kuo 8-3

```
{
        return(SQR(fpt->x - cpt->x) + SQR(fpt->y - cpt->y) +
        SQR(fpt->px - cpt->px) + SQR(fpt->py - cpt->py) +
        SQR(fpt->d - cpt->d));
}

/*****************************************/
/* Cluster center to cluster center distance */ float cdist(cpt1, cpt)
CLUST   *cpt, *cpt1;
{
        return(SQR(cpt1->x - cpt->x) + SQR(cpt1->y - cpt->y) +
        SQR(cpt1->px - cpt->px) + SQR(cpt1->py - cpt->py) +
        SQR(cpt1->d - cpt->d));
}

/*****************************************/
/* Print cluster members */ void pr_clust(feat, clust, nfeat, nclust)
FEAT    *feat;
CLUST   *clust;
short   nfeat, nclust;
{
    FEAT    *fpt;
    CLUST   *cpt;
    short   i, j;

fprintf(stderr, "C_id  Var  Cindex      Center \n");
    for (i = 0, cpt = clust; i < nclust; i++, cpt++)
    {
        fprintf(stderr, "%d    %.3f %.3f %.3f %.3f %.3f %.3f %.3f\n",
                i, cpt->var, cpt->cindex,
                cpt->x, cpt->y, cpt->px, cpt->py, cpt->d);
    }
    fprintf(stderr, "-----------------------\n");

for (i = 0, cpt = clust; i < nclust; i++, cpt++)
    {
        fprintf(stderr, "\nCluster id = %d:    Cindex = %.3f Center = %.3f %.3f %.3f %.3f %
                i, cpt->cindex, cpt->x, cpt->y, cpt->px, cpt->py, cpt->d);
        fprintf(stderr, "F_id         F_num   F_lab   C_dist\n");

for (j = 0, fpt = feat; j < nfeat; j++, fpt++)
            if (fpt->c_id == i)
                fprintf(stderr, "feat[%d]      %d       %s      %.3f\n",
                        j, fpt->num, fpt->lab, fpt->c_dist);
    }
    fprintf(stderr, "***************\n");
}

/*****************************************/
    /* Restore the old configuration */ void rs_ex(clust, old_clust, feat, old_feat, nclust, nfeat)
CLUST *clust, *old_clust;
FEAT *feat, *old_feat;
int  nclust, nfeat;
{
    register int i, j;
    FEAT    *fpt, *fpt1;
    CLUST   *cpt, *cpt1;
```

Bose-Kuo 8-3

```
    for (j=0, cpt=clust, cpt1=old_clust; j<nclust; j++, cpt++,
        cpt1++) *cpt = *cpt1;

for (i=0, fpt=feat, fpt1=old_feat; i<nfeat; i++, fpt++,
        fpt1++) *fpt = *fpt1;
}

/****************************************/
find_sigma(data, n, adev)
float *data, *adev;
int n;
{
    int j;
    float s, av;

if (n <= 1) return (-1);
    else
    {
        for (j=0, s=0.0; j<n; j++)
            s += *(data+j);

av = s/n;

for (j=0, *adev=0.0; j<n; j++)
            *adev += SQR((*(data+j)) - av);

*adev = sqrt(*adev/n);
        return(0);
    }
}
```

Bose-Kuo 8-3

```
/* given two end-points to draw a line in image plane */          dwln.c
include <math.h> void dwln(x1,y1,x2,y2,greylevel,image)
int x1,y1,x2,y2,greylevel,**image;
{
  int length,i,j;
  float x,y,xincrement,yincrement;

length = abs(x2-x1);
  if( abs(y2-y1) > length ) length=abs(y2-y1);
  xincrement = (float)(x2-x1) / (float)length ;
  yincrement = (float)(y2-y1) / (float)length ;
  x = x1 + 0.5;
  y = y1 + 0.5;
  for(i=1;i<=length;i++)
    {
       image[((int)y)][((int)x)]=greylevel;
       x += xincrement;
       y += yincrement;
    }
}
```

· Bose-Kuo 8-3

```
#include <math.h>                                                          ftr.h
#include <stdio.h>
include <picfile_sig.h>
#include <nrutil.h>
#define SYMIN 12.
#define SXMIN 7.

struct stack {
  struct stack *next;
  int node;
  int p_node; };

struct queue {
  struct stack *front;
  struct stack *rear; };

struct vector{
  struct vector *next;
  int id;
  float width;   /* average width for vertical-vector */
  int no_lag;    /* total number of effective lag nodes count for width */
  char type;     /* vertical('v') or horizontal('h') vector or arc('a')
                    or dominant diagonal vector for s/z ('s') */
  char small_v;  /* the vertical vector adjacent to long run-lengths */
  float x[2];    /* x location for start and end points */
  float y[2];    /* y location for start and end points */
  float ax[3];   /* x location for start, end and the farest points of arc*/
  float ay[3];   /* y location for start, end and the farest points of arc*/
  float dst;     /* In first phase, dst=200 if this is a vector in the
                    middle part of y. In second phase, dst is the distance
                    from the farest point to the chord of an arc. */
  float l;       /* left-most pixel after subtracting half width */
  float r;       /* right-most pixel after adding half width */
  int no_clag;   /* total no. of clagnodes covered by this vector */
  int clagnode[5]; /* clagnodes covered by this vector */
  };

struct blob{
  struct blob *next;
  int s_node;    /* starting node for this blob */
  int col_start;
  int col_end;
  int no_node;   /* total no. of node inside this blob */
  int *node;     /* lag-nodes inside this blob (start from ONE) */
  float ratio;   /* height to width ratio */
  };

struct node {
  int rowth;
  int col_start;
  int col_end;
  int above;       /* above degree */
  int a_node[10];  /* lag-node number connected above */
  int below;       /* below degree */
  int b_node[10];  /* lag-node number connected below */
  int mark;
  int clagnode;    /* belong to which clagnode */
  int clagnode_p;  /* probably belong to the other clagnode */
  };

struct clagnode {
  char class;      /* 'p' for PATH, 'j' for junction */
  char type;       /* type of returned vectors (x or v) from wx_detect() */
  int number;      /* total number of lag-node inside this clag-node */
  int *node;       /* lag-node number start from ONE */
  int a_clagnode[10]; /* clag-node number connected above */
```

Bose-Kuo 8-3

```
    int b_clagnode[10];  /* clag-node number connected below */
    int group;           /* total no. of group inside this clag-node */
    int no_vector;       /* total no. of vectors in this clag-node */
    struct vector **vctr; /* pointers to vectors in this clagnode
                             (start from ONE) */
};

typedef struct
{
        float start;
        float end;
        char type;       /* vert = 'v', hor = 'h' */
} BSEG;

void lag(), clag(), dwln(), path_analy(), merge();
void line_fit(),grylvl(), blob_extr(), blobth();
void seg2vec(), prep(), mdn();
float p2line();
int collinear(),collinear_s(),wx_detect(),y_detect(),arc_check();
int dn_change();
int find_degree();
struct vector *add_vctr(),*dlt_vctr();
void outimg(),outimg_s();
void path_s();
```

Bose-Kuo 8-3

```
                                                                              fe.c
/* Extract features from a character image
 *
 * Usage: fe [-i image.pic]
 *
 * Default output file is temp.fv
 *
 */ include <ftr.h> int Rows, Cols;

main(argc, argv)
int argc;
char *argv[];
{
        PICFILE *in1,*out2,*out3,*out4,*out5,*out6;
        FILE *out1, *out7;
        unsigned char *temp;
        int **image, **block, **dspl, **dspl_s, **bimage;
        int **clagimg, **lagimg;
        int bcol, cols, rows;
        int no_blob, col_start;
        int no_node, no_clagnode;
        int blob_ct=0, str_ct=0;
        int i,j;
        char buf1[50],buf2[50],dum1[20],dum2[30];
        struct node *node;
        struct clagnode *clagnode;
        struct vector *vctr_list, *vctr;
        struct blob *blob_list, *blob_t;
        int base;
        char *str, *charpt;

if(argc==1)
        {
                printf("usage: fe [-i image.pic] [-o file.fv]\n");
                exit(1);
        } sprintf(buf2, "temp.fv");       /* default output file */ while(argc-- > 1)
                if(argv[argc][0] == '-')
                        switch(argv[argc][1])
                        {
                        case 'i':       /* input image .pic file */ sprintf(buf1,"%s",argv[argc+1]);
                                if( (in1 = picopen_r(buf1)) == 0 )
                                {
                                        perror(buf1);
                                        exit(1);
                                }
                                break;

case 'o':       /* output file.fv file */
                                sprintf(buf2,"%s",argv[argc+1]);
                                break;

default:
                          fprintf(stderr,"command line option error\n");
                          fprintf(stderr,
                            "usage: fe [-i image.pic] [-o file.fv]\n");
```

Bose-Kuo 8-3

```
/*******************************************************************/
/*                                                                 */
/*                          CLUSTER.H                              */
/*                                                                 */
/*******************************************************************/ include <stdio.h>
include <math.h> define EPS     1.0e-6   /* Small value   */
define MEG     1.0e+6   /* Large value   */ define SQR(a_) ((a_) * (a_))
define MIN(x_,y_) (((x_) < (y_)) ? (x_) : (y_))
#define MAX(x_,y_) (((x_) > (y_)) ? (x_) : (y_))

typedef struct
{
        int num;        /* feature identifier, used for display */
        char lab[4];    /* feature label */
        float x;        /* feature parameters */
        float y;
        float px;
        float py;
        float d;
        int c_id;       /* feature cluster id */
        float c_dist;   /* dist from cluster center */
} FEAT;

typedef struct
{
        float x;        /* cluster parameters */
        float y;
        float px;
        float py;
        float d;
        int f_sum;      /* no. of features in cluster */
        float var;      /* deviation of cluster */
        float cindex;   /* compactness and isolation index */
} CLUST;
```

· Bose-Kuo 8-3

```
                        break;
                } if( (out1 = fopen(buf2,"w")) == (FILE *) NULL )
        {
                fprintf(stderr,"%s : cannot open for writing\n","file.fv");
                exit(1);
        }

Cols = cols = in1->width ;
        Rows = rows = in1->height ;

base = atoi(picgetprop("BASL", in1));
        str = picgetprop("STRING", in1);

str_ct = strlen(str);

#ifdef DEMO
        fprintf(stderr,"\n");
#else
        printf("              %s ",str);

if( (out7 = fopen("temp.res","w")) == (FILE *) NULL )
        {
                fprintf(stderr,"%s : cannot open for writing\n","file.fv");
                exit(1);
        } fprintf(out7, "%s ", str);
        fclose(out7);
#endif

/* reserve space for input character image */
        image = imatrix(0,(rows-1),0,(cols-1));
        block = imatrix(0,(rows-1),0,(cols-1));
        lagimg = imatrix(0,(rows-1),0,(cols-1));
        clagimg = imatrix(0,(rows-1),0,(cols-1));
        /* initialize background to white */
        for(i=0;i<rows;i++)
                for(j=0;j<cols;j++)
                        image[i][j] = 255;

/* read the input character image */
        temp = (unsigned char *) calloc( (unsigned)cols ,
                                        sizeof(unsigned char));
        if(temp == (unsigned char *) NULL)
        {
                fprintf(stderr, "calloc failed for temp\n");
                exit (1);
        }
        for (i=0; i<rows; i++)
        {
                picread(in1, temp);
                for (j=0; j<cols; j++)
                        image[i][j] = (int)temp[j];
        }
        free((char*)temp);

/* preprocess the input image by median filter and a mask */
        prep(image,rows,cols);

#ifdef DEMO
        /* output the processed image */
        sprintf(dum1,"prep.pic");
        if( (out6 = picopen_w(dum1,PIC_SAMEARGS(in1))) == 0 )
            {
```

Bose-Kuo 8-3

```
                perror(dum1);
                exit(1);
        }
        grylvl(image, rows, cols, out6);

/* enlarge the input image in order to display
                                        vectors and segmentation*/
        dspl = imatrix(0,(10*rows-1),0,(10*cols-1));
        for(i=0;i<10*rows;i++)
                for(j=0;j<10*cols;j++)
                        dspl[i][j] = 255;

dspl_s = imatrix(0,(10*rows-1),0,(10*cols-1));

for(i=0;i<10*rows;i++)
                for(j=0;j<10*cols;j++)
                        dspl_s[i][j] = 255;
endif node = (struct node *) calloc((unsigned)(cols*rows),
                                        sizeof(struct node));
        if(node == (struct node *) NULL)
        {
                fprintf(stderr, "calloc failed for node\n");
                exit (1);
        }
        node -= 1;   /* let node number start from ONE */ lag(image, rows, cols, node, &no_node);

for(i=1;i<=no_node;i++)
          for(j=((node+i)->col_start);j<=((node+i)->col_end);j++)
            lagimg[(node+i)->rowth][j] = i;

blob_extr(rows,cols,node,no_node,&blob_list,&no_blob,clagimg);

charpt = str;
        blob_t = blob_list;
        while( blob_t->next != (struct blob *)NULL )
        {
            ++blob_ct;
#ifdef DEMO
                printf("\n ");
                printf("--- WORKING ON BLOB %d ---\n", blob_ct );
                printf("\n ");
endif blobth(&blob_t,node,rows,&bimage,&bcol,&col_start,&vctr_list,
                    &clagnode,&no_clagnode,dspl);

for(i=0;i<rows;i++)
                  for(j=0;j<bcol;j++)
                    if(bimage[i][j]==0) block[i][j+col_start] = blob_ct;

#ifdef DEMO
                sprintf(dum1,"vctr.pic");
                outimg(dspl,vctr_list,col_start,in1,dum1);
endif /* blob_t advanced in blobth() */ blob2feat(bimage, bcol, vctr_list, *charpt, base, out1,
                        dspl_s, dspl, col_start,in1,lagimg,clagimg);

for(i=1;i<=no_clagnode;i++)
```

Bose-Kuo 8-3

```
                        free((char*)((clagnode+i)->node+1));
                for(i=1;i<=no_clagnode;i++)
                        if((clagnode+i)->no_vector!=0)
                                free((char*)((clagnode+i)->vctr+1));
                free((char*)(clagnode+1));
                while( vctr_list->next != (struct vector *)NULL )
                {
                        vctr=vctr_list;
                        vctr_list = vctr_list->next;
                        free(vctr);
                }
                free(vctr_list);
                free_imatrix(bimage,0,(rows-1),0,(bcol-1));
                charpt++;
        } fclose(out1);

if defined (DEMO) && defined (SKUO)

for(i=0;i<rows;i++)
           dwln(0,(i*10),(cols*10-1),(i*10),220,dspl);
        for(j=0;j<cols;j++)
           dwln((j*10),0,(j*10),(rows*10-1),220,dspl);
#elif defined (DEMO)
        printf("\n");
else if(blob_ct != str_ct)
           printf("  (**T**)   ");
        else
           printf("                ");

endif ifdef DEMO
        /* output the vector image */
        sprintf(dum1,"vctrs.pic");
        if((out3 = picopen_w(dum1,in1->type,0,0,Cols*10,Rows*10,
                            in1->chan,argv,in1->cmap)) == 0 )
          {
            perror(dum1);
            exit(1);
          }
        grylvl(dspl_s,(out3->height),(out3->width),out3);

sprintf(dum1,"vctr.pic");
        if((out2 = picopen_w(dum1,in1->type,0,0,Cols*10,Rows*10,
                            "rgb",argv,in1->cmap)) == 0 )
          {
            perror(dum1);
            exit(1);
          }
        grylvl(dspl,(out2->height),(out2->width),out2);
        /* output the blob image */
        sprintf(dum1,"blob.pic");
        if( (out4 = picopen_w(dum1,PIC_SAMEARGS(in1))) == 0 )
          {
            perror(dum1);
            exit(1);
          }
        grylvl(block, rows, cols, out4);
        /* output the lag image */
        sprintf(dum1,"lag.pic");
        if( (out5 = picopen_w(dum1,PIC_SAMEARGS(in1))) == 0 )
          {
```

- 65 -

Bose-Kuo 8-3

```
                perror(dum1);
                exit(1);
            }
        grylvl(lagimg, rows, cols, out5);
        /* output the clag image */
        sprintf(dum1,"clag.pic");
        if( (out6 = picopen_w(dum1,PIC_SAMEARGS(in1))) == 0 )
            {
                perror(dum1);
                exit(1);
            }
        grylvl(clagimg, rows, cols, out6);
endif free_imatrix(block,0,(rows-1),0,(cols-1));
        free_imatrix(lagimg,0,(rows-1),0,(cols-1));
        free_imatrix(clagimg,0,(rows-1),0,(cols-1));
        free_imatrix(image,0,(rows-1),0,(cols-1));
        free((char*)(node+1));
        while( blob_list->next != (struct blob *)NULL )
            {
                    blob_t = blob_list;
                    blob_list = blob_list->next;
                    free(blob_t);
            }
        free(blob_list);

#ifdef DEMO
        free_imatrix(dspl,0,(10*rows-1),0,(10*cols-1));
        free_imatrix(dspl_s,0,(10*rows-1),0,(10*cols-1));
#endif

} void outimg(dspl,vctr_list,col_start,in,dum)
int **dspl,col_start;
struct vector *vctr_list;
PICFILE *in;
char *dum;
{ int count,x1,x2,y1,y2;
  int i,j;
  PICFILE *out;
  char **dum1 = (char **)NULL;

if((out = picopen_w(dum,in->type,0,0,Cols*10,Rows*10,
                        in->chan,dum1,in->cmap)) == 0 )
        {
          perror(dum);
          exit(1);
        }
  count = 0;
  while( (vctr_list->next) != NULL )
     {
        if(vctr_list->type != 'a')
          {
            x1=(int)(10*(vctr_list->x[0]+col_start));
            x2=(int)(10*(vctr_list->x[1]+col_start));
            y1=(int)(10*(vctr_list->y[0]));
            y2=(int)(10*(vctr_list->y[1]));

dwln(x1,y1,x2,y2,220,dspl);
            for(i=(y1-1);i<=(y1+1);i++)
              for(j=(x1-1);j<=(x1+1);j++)
                dspl[i][j]=220;
```

Bose-Kuo 8-3

```
            for(i=(y2-1);i<=(y2+1);i++)
               for(j=(x2-1);j<=(x2+1);j++)
                  dspl[i][j]=220;
            /* make the line fatter */
            if(y1==y2)
               {
                  dwln(x1,(y1+1),x2,(y2+1),220,dspl);
                  dwln(x1,(y1-1),x2,(y2-1),220,dspl);
               }
            else
               {
                  dwln((x1+1),y1,(x2+1),y2,220,dspl);
                  dwln((x1-1),y1,(x2-1),y2,220,dspl);
               }
         }
      else
         {
            x1=(int)(10*(vctr_list->ax[0]+col_start));
            x2=(int)(10*(vctr_list->ax[1]+col_start));
            y1=(int)(10*(vctr_list->ay[0]));
            y2=(int)(10*(vctr_list->ay[1]));
            dwln(x1,y1,x2,y2,180,dspl);
            dwln((x1+1),y1,(x2+1),y2,180,dspl);
            dwln((x1-1),y1,(x2-1),y2,180,dspl);

for(i=(y1-1);i<=(y1+1);i++)
               for(j=(x1-1);j<=(x1+1);j++)
                  dspl[i][j]=170;
            for(i=(y2-1);i<=(y2+1);i++)
               for(j=(x2-1);j<=(x2+1);j++)
                  dspl[i][j]=170;
            x2=(int)(10*(vctr_list->ax[2]+col_start));
            y2=(int)(10*(vctr_list->ay[2]));
            dwln(x1,y1,x2,y2,180,dspl);
            dwln((x1+1),y1,(x2+1),y2,180,dspl);
            dwln((x1-1),y1,(x2-1),y2,180,dspl);

for(i=(y2-1);i<=(y2+1);i++)
               for(j=(x2-1);j<=(x2+1);j++)
                  dspl[i][j]=170;
            x1=(int)(10*(vctr_list->ax[1]+col_start));
            y1=(int)(10*(vctr_list->ay[1]));
            dwln(x1,y1,x2,y2,180,dspl);
            dwln((x1+1),y1,(x2+1),y2,180,dspl);
            dwln((x1-1),y1,(x2-1),y2,180,dspl);
         }
      vctr_list = (vctr_list)->next;
      }
   /* grylvl(dspl,(out->height),(out->width),out);*/
   picclose(out);
} void outimg_s(dspl,vctr_list,col_start)
int **dspl,col_start;
struct vector *vctr_list;
{ int count,x1,x2,y1,y2;
   int i,j;

if(vctr_list->type != 'a')
      {
         x1=(int)(10*(vctr_list->x[0]+col_start));
         x2=(int)(10*(vctr_list->x[1]+col_start));
```

Bose-Kuo 8-3

```
    y1=(int)(10*(vctr_list->y[0]));
    y2=(int)(10*(vctr_list->y[1]));

dwln(x1,y1,x2,y2,220,dspl);
    for(i=(y1-1);i<=(y1+1);i++)
      for(j=(x1-1);j<=(x1+1);j++)
        dspl[i][j]=220;
    for(i=(y2-1);i<=(y2+1);i++)
      for(j=(x2-1);j<=(x2+1);j++)
        dspl[i][j]=220;

/* make the line fatter */
    if(y1==y2)
      {
        dwln(x1,(y1+1),x2,(y2+1),220,dspl);
        dwln(x1,(y1-1),x2,(y2-1),220,dspl);
      }
    else
      {
        dwln((x1+1),y1,(x2+1),y2,220,dspl);
        dwln((x1-1),y1,(x2-1),y2,220,dspl);
      }
  }
else
  {
    x1=(int)(10*(vctr_list->ax[0]+col_start));
    x2=(int)(10*(vctr_list->ax[1]+col_start));
    y1=(int)(10*(vctr_list->ay[0]));
    y2=(int)(10*(vctr_list->ay[1]));
    dwln(x1,y1,x2,y2,180,dspl);
    dwln((x1+1),y1,(x2+1),y2,180,dspl);
    dwln((x1-1),y1,(x2-1),y2,180,dspl);

for(i=(y1-1);i<=(y1+1);i++)
      for(j=(x1-1);j<=(x1+1);j++)
        dspl[i][j]=170;
    for(i=(y2-1);i<=(y2+1);i++)
      for(j=(x2-1);j<=(x2+1);j++)
        dspl[i][j]=170;
    x2=(int)(10*(vctr_list->ax[2]+col_start));
    y2=(int)(10*(vctr_list->ay[2]));
    dwln(x1,y1,x2,y2,180,dspl);
    dwln((x1+1),y1,(x2+1),y2,180,dspl);
    dwln((x1-1),y1,(x2-1),y2,180,dspl);

for(i=(y2-1);i<=(y2+1);i++)
      for(j=(x2-1);j<=(x2+1);j++)
        dspl[i][j]=170;
    x1=(int)(10*(vctr_list->ax[1]+col_start));
    y1=(int)(10*(vctr_list->ay[1]));
    dwln(x1,y1,x2,y2,180,dspl);
    dwln((x1+1),y1,(x2+1),y2,180,dspl);
    dwln((x1-1),y1,(x2-1),y2,180,dspl);

}
}
```

Bose-Kuo 8-3 grylvl.c

```c
/* rescale the grey level for displaying */
#include <math.h>
#include <stdio.h>
include <picfile_sig.h> void grylvl(image, rows, cols, outpt)
int **image,rows,cols;
PICFILE *outpt;
  {
    float TLO = 999999.0;
    float THI = -999999.0;
    float SLOPE;

unsigned char *temp ;

int i,j;

temp = (unsigned char *)calloc((unsigned)cols,sizeof(unsigned char));
    if(temp == (unsigned char *) NULL)
       {
         fprintf(stderr, "calloc failed in grylvl()\n");
         exit (1);
       } for (i=0; i<rows; i++)
      for (j=0; j<cols; j++)
         {
           if ( (float)image[i][j] > THI )  THI=(float)image[i][j];
           if ( (float)image[i][j] < TLO )  TLO=(float)image[i][j];
         } ifdef SKUO
    printf("Extreme value of image: min=%f  max=%f \n", TLO, THI );
endif SLOPE = 255.0/(THI-TLO);
    for (i=0; i<rows; i++)
      {
        for (j=0; j<cols; j++)
          temp[j] = (unsigned char)((short int)(SLOPE*(image[i][j]-TLO)));
        picwrite(outpt, temp);
      } free((char*)temp);
    picclose(outpt);
  }
```

Bose-Kuo 8-3

```
                                                                                    lag.c
/* find the line adjacent grapf (LAG) of image[0,rows-1][0,cols-1]
   node is the output, no_node is the total number of nodes          */ include <ftr.h> void lag(image, rows, cols, node, no_node)
int **image, rows, cols, *no_node;
struct node *node;
{
  int find=0, row, count;
  int i,j;

/* find start and end point for each node */
  *no_node = 1;
  for(i=0;i<rows;i++)
    for(j=0;j<cols;j++)
      {
         if(image[i][j]==0 && find == 0)
            {
              (node + *no_node)->rowth = i;
              (node + *no_node)->col_start = j;
              find = 1 ;
            }
         if( image[i][j]==255 && find == 1)
            {
              (node + *no_node)->col_end = (j-1) ;
              find = 0 ;
              *no_node += 1;
            }
         if( j==(cols-1) && find == 1)
            {
              (node + *no_node)->col_end = j ;
              find = 0 ;
              *no_node += 1;
            }
      }
  *no_node -= 1;

/* find degree for each node */
  for(i=1; i<=*no_node; i++)
    {
      row = (node+i)->rowth ;
      if(row == 0)    (node+i)->above=0;
      else
         {
           find=0;
           count=0;
           for(j=((node+i)->col_start);j<=((node+i)->col_end);j++)
              {
                if( image[row-1][j]==0 && find==0)
                   {
                     find=1;
                     count += 1;
                   }
                if( image[row-1][j]==255 && find==1)   find=0;
              }
           if(count>10)
              printf("Not enough space for a_node in struct node\n");
           (node+i)->above=count;
         }
      if(row == (rows-1))    (node+i)->below=0;
      else
         {
           find=0;
           count=0;
```

- 70 -

Bose-Kuo 8-3

```
        for(j=((node+i)->col_start); j<=((node+i)->col_end); j++)
          {
            if( image[row+1][j]==0 && find==0)
              {
                find=1;
                count += 1;
              }
            if( image[row+1][j]==255 && find==1)    find=0;
          }
        if(count>10)
          printf("Not enough space for b_node in struct node\n");
        (node+i)->below=count;
      }
  }

/* connect adjacent nodes */
for(i=1; i<=*no_node; i++)
  {
    row = (node+i)->rowth ;
    if( (node+i)->above > 0  )
      {
        count=0;
        for(j=(i-1); j>=1; j--)
          {
            if( (node+j)->rowth < (row-1) ) break;
            if( (node+j)->rowth == (row-1) &&
                (node+j)->col_start <= (node+i)->col_end &&
                (node+j)->col_end >= (node+i)->col_start )
              {
                (node+i)->a_node[count] = j;
                count += 1;
              }
          }
        if(count != (node+i)->above)
          printf("error in a_degree of node %d\n",i);
      }
    if( (node+i)->below > 0  )
      {
        count=0;
        for(j=(i+1); j<=*no_node; j++)
          {
            if( (node+j)->rowth > (row+1) ) break;
            if( (node+j)->rowth == (row+1) &&
                (node+j)->col_start <= (node+i)->col_end &&
                (node+j)->col_end >= (node+i)->col_start )
              {
                (node+i)->b_node[count] = j;
                count += 1;
              }
          }
        if(count != (node+i)->below)
          printf("error in b_degree of node %d\n",i);
      }
  }
}
```

Bose-Kuo 8-3 line_fit.c

```c
/* fit a line to a bounch of points start from x[start] y[start]
   to x[end] y[end] */ include <ftr.h> define SQR(a_) ((a_) * (a_))

int ndatat=0;  /* defining declaration */
float *xt=0,*yt=0,aa=0.0,abdevt=0.0;   /* defining declaration */ void line_fit(group,x, y, start, end, x1, x2, start_new, end_new)
int **group;
float *x,*y,*x1,*x2;
int start, end, *start_new, *end_new;
{
        float *xp,*yp,c,m,abdev,slope,width;
        int ndata, invert=0,start_o,end_o,i;
        void medfit();

start_o = start;
        end_o = end;
        /* check and discard the start and end lag-path node
           if it is an outlier */
        if(abs(end-start+1)>=3)
          {
            ndata = end_o - start_o - 1;
            for(i=(start_o+1); i<=(end_o-1); i++)
              width += (float) group[i][2];
            width /= (float)ndata ;
            if((float)group[start_o][2] < 1.4*width &&
               (float)group[start_o][2] > 0.6*width )
              {
                width = width*((float)ndata) + (float)group[start_o][2];
                ndata += 1;
                width /= (float)ndata;
              }
            if((float)group[end_o][2] < 1.4*width &&
               (float)group[end_o][2] > 0.6*width )
              {
                width = width*((float)ndata) + (float)group[end_o][2];
                ndata += 1;
                width /= (float)ndata;
              }
            if((float)group[start_o][2] > 2.0*width ||
               (float)group[start_o][2] < 0.4*width )     start = start_o+1;
            if((float)group[end_o][2] > 2.0*width ||
               (float)group[end_o][2] < 0.4*width )     end = end_o-1;
          }
        if(ndata==1)
          {
            start=start_o;
            end=end_o;
          }
        *start_new = start;
        *end_new = end;

ndata = end -start + 1;
        slope=fabs((y[end]-y[start])/(x[end]-x[start]));
        if ( slope < 1. )
        {
                xp = &x[start] - 1;
                yp = &y[start] - 1;
        }
        else
        {
```

-Bose-Kuo 8-3

```
                invert = 1;
                yp = &x[start] - 1;
                xp = &y[start] - 1;
        }
        medfit(xp,yp,ndata,&c,&m,&abdev);

if (invert)
        {
                *x1 = m * y[start_o] + c;
                *x2 = m * y[end_o] + c;
        }
        else
        {
                *x1 = (y[start_o] - c) / m;
                *x2 = (y[end_o] - c) / m;
        }
} void medfit(x,y,ndata,a,b,abdev)
float *x,*y,*a,*b,*abdev;
int ndata;
{
        int j,count=0;
        float bb,b1,b2,del,f,f1,f2,sigb,temp,bbu,abdevtu,aau;
        float sx=0.0,sy=0.0,sxy=0.0,sxx=0.0,chisq=0.0;
        float rofunc();

ndatat=ndata;
        xt=x;
        yt=y;
        for (j=1;j<=ndata;j++) {
                sx += x[j];
                sy += y[j];
                sxy += x[j]*y[j];
                sxx += x[j]*x[j];
        }
        del=ndata*sxx-sx*sx;
        aa=(sxx*sy-sx*sxy)/del;
        bb=(ndata*sxy-sx*sy)/del;
        for (j=1;j<=ndata;j++)
                chisq += (temp=y[j]-(aa+bb*x[j]),temp*temp);
        if (chisq == 0.)
          {
            *a = aa;
            *b = bb;
            *abdev=abdevt/ndata;
            return;
          }
        sigb=sqrt(chisq/del);

bbu=bb;
        f1=rofunc(bbu);
        abdevtu=abdevt;
        aau = aa;

b1=bb;
        f1=rofunc(b1);
        b2=bb+((f1 > 0.0) ? fabs(3.0*sigb) : -fabs(3.0*sigb));
        f2=rofunc(b2);
        while (f1*f2 > 0.0) {
                bb=2.0*b2-b1;
                b1=b2;
                f1=f2;
                b2=bb;
```

Bose-Kuo 8-3

```
                f2=rofunc(b2);
                count += 1;
                if(count >20)
                    {
                       *a=aau;
                       *b=bbu;
                       *abdev=abdevtu/ndata;
                       return;
                    }
            }
        sigb=0.01*sigb;
        while (fabs(b2-b1) > sigb) {
                bb=0.5*(b1+b2);
                if (bb == b1 || bb == b2) break;
                f=rofunc(bb);
                if (f*f1 >= 0.0) {
                        f1=f;
                        b1=bb;
                } else {
                        f2=f;
                        b2=bb;
                }
        }

*a=aa;
        *b=bb;
        *abdev=abdevt/ndata;

if(abdevtu<abdevt)
           {
              *a=aau;
              *b=bbu;
              *abdev=abdevtu/ndata;
           }
} float rofunc(b)
float b;
{
        int j,n1,nmh,nml;
        float *arr,d,sum=0.0,*vector();
        void sort(),free_vector();

arr=vector(1,ndatat);
        n1=ndatat+1;
        nml=n1/2;
        nmh=n1-nml;
        for (j=1;j<=ndatat;j++) arr[j]=yt[j]-b*xt[j];
        sort(ndatat,arr);
        aa=0.5*(arr[nml]+arr[nmh]);
        abdevt=0.0;
        for (j=1;j<=ndatat;j++) {
                d=yt[j]-(b*xt[j]+aa);
                abdevt += fabs(d);
                sum += d > 0.0 ? xt[j] : -xt[j];
        }
        free_vector(arr,1,ndatat);
        return sum;
} void sort(n,ra)
int n;
float ra[];
```

Bose-Kuo 8-3

```
{
        int l,j,ir,i;
        float rra;

l=(n >> 1)+1;
        ir=n;
        for (;;) {
                if (l > 1)
                        rra=ra[--l];
                else {
                        rra=ra[ir];
                        ra[ir]=ra[1];
                        if (--ir == 1) {
                                ra[1]=rra;
                                return;
                        }
                }
                i=l;
                j=l << 1;
                while (j <= ir) {
                        if (j < ir && ra[j] < ra[j+1]) ++j;
                        if (rra < ra[j]) {
                                ra[i]=ra[j];
                                j += (i=j);
                        }
                        else j=ir+1;
                }
                ra[i]=rra;
        }
}
```

Bose-Kuo 8-3

```c
/* check and merge vectors in adjacent two clag-path-node */            merge.c
include <ftr.h> define DT 2.2          /* distance threshold for merging two vectors */
define DT_2e 5.1       /* distance threshold of two adjacent ending
                           point for merging two vectors */
#define DT_y 3.0        /* distance threshold for merging two vectors if one
                           of them is a vector of y */
#define DT_r 1./7.4     /* distance ratio threshold for merging two vectors */
#define DT_2e_r 1./5.   /* distance ratio threshold of two adjacent ending
                           point for merging two vectors */
#define MINL 4.0        /* minimum length for a vector to be merged */
#define INIQ(h)   (h)->front=(h)->rear=(struct stack *)NULL;

void merge(vctr_list,clagnode,no_clagnode,flag)
struct vector *vctr_list;
struct clagnode *clagnode;
int no_clagnode,*flag;
{
  int i,count,count_1;
  int c_node,j_node,jj_node;
  struct queue *PATH,*JCT;
  void merge_test(), addq(), dumpq();

*flag = 0;
  PATH = (struct queue *)calloc(1,sizeof(struct queue));
  JCT = (struct queue *)calloc(1,sizeof(struct queue));

for(i=1;i<=no_clagnode;i++)
    if((clagnode+i)->class=='p')
      {
         INIQ(PATH);
         INIQ(JCT);
         if((clagnode+i)->a_clagnode[0]!=0)
           {
              addq(&JCT,(clagnode+i)->a_clagnode[0]);
              while( (JCT->front)!=(struct stack *)NULL )
                 {
                    dumpq(&JCT,&j_node);
                    count = 0;
                    while( (clagnode+j_node)->a_clagnode[count]!=0 )
                       {
                          c_node = (clagnode+j_node)->a_clagnode[count];
                          if((clagnode+c_node)->class=='p')
                            {
                               addq(&PATH,c_node);
                               if((clagnode+c_node)->a_clagnode[0]!=0)
                                  addq(&JCT,(clagnode+c_node)->a_clagnode[0]);
                            }
                          else if((clagnode+c_node)->class=='j')
                             addq(&JCT,c_node);
                          else printf("error in merge(1) \n");
                          count += 1;
                       }
                 }
           }
         if( (JCT->front!=(struct stack *)NULL) ||
             JCT->rear!=(struct stack *)NULL )
             printf("error in merge(2) \n");

INIQ(JCT);
         if((clagnode+i)->b_clagnode[0]!=0)
           {
              addq(&JCT,(clagnode+i)->b_clagnode[0]);
              while( (JCT->front)!=(struct stack *)NULL )
```

Bose-Kuo 8-3

```
            {
                dumpq(&JCT,&j_node);
                count = 0;
                while( (clagnode+j_node)->b_clagnode[count]!=0 )
                    {
                        c_node = (clagnode+j_node)->b_clagnode[count];
                        if((clagnode+c_node)->class=='p')
                            {
                                addq(&PATH,c_node);
                                if((clagnode+c_node)->b_clagnode[0]!=0)
                                    addq(&JCT,(clagnode+c_node)->b_clagnode[0]);
                            }
                        else if((clagnode+c_node)->class=='j')
                            addq(&JCT,c_node);
                        else printf("error in merge(3) \n");
                        count += 1;
                    }
            }
        if( (JCT->front!=(struct stack *)NULL) ||
            JCT->rear!=(struct stack *)NULL )
            printf("error in merge(4) \n");

while( (PATH->front)!=(struct stack *)NULL )
            {
                dumpq(&PATH,&c_node);
                merge_test(vctr_list,clagnode,i,c_node,&flag);
            }
        }
} void merge_test(vctr_list,clagnode,c_node,b_node,flag)
struct vector *vctr_list;
struct clagnode *clagnode;
int c_node, b_node, *flag;
{
    struct vector *vctr_a, *vctr_b, *vctr_temp;
    int i,j,m,n,no_lag;
    float a[3], L, dq1, dq2, dp, L1, L2;

for(i=1;i<=((clagnode+c_node)->no_vector);i++)
        {
            for(j=1;j<=((clagnode+b_node)->no_vector);j++)
                {
                    vctr_a = (clagnode+c_node)->vctr[i] ;
                    vctr_b = (clagnode+b_node)->vctr[j] ;
                    if(vctr_b == vctr_a ||
                        !(vctr_b->type=='v' && vctr_a->type=='v') ) continue;
                    /* sort two vectors in above and below order */
                    if(vctr_a->y[0] > vctr_b->y[0])
                        {
                            vctr_temp = vctr_b;
                            vctr_b = vctr_a;
                            vctr_a = vctr_temp;
                        } a[0] = vctr_a->y[0] - vctr_b->y[1];
                    a[1] = vctr_b->x[1] - vctr_a->x[0];
                    a[2] = vctr_b->y[1]*vctr_a->x[0] - vctr_a->y[0]*vctr_b->x[1];
                    L = sqrt( a[0]*a[0] + a[1]*a[1] );
                    dq1 = fabs((a[0]*vctr_a->x[1] + a[1]*vctr_a->y[1] + a[2])/L);
                    dq2 = fabs((a[0]*vctr_b->x[0] + a[1]*vctr_b->y[0] + a[2])/L);
                    dp=sqrt((vctr_b->x[0]-vctr_a->x[1])*(vctr_b->x[0]-vctr_a->x[1])+
                            (vctr_b->y[0]-vctr_a->y[1])*(vctr_b->y[0]-vctr_a->y[1]));

L1=sqrt((vctr_b->x[0]-vctr_b->x[1])*(vctr_b->x[0]-vctr_b->x[1])+
```

Bose-Kuo 8-3

```
                (vctr_b->y[0]-vctr_b->y[1])*(vctr_b->y[0]-vctr_b->y[1]));
     L2=sqrt((vctr_a->x[0]-vctr_a->x[1])*(vctr_a->x[0]-vctr_a->x[1])+
                (vctr_a->y[0]-vctr_a->y[1])*(vctr_a->y[0]-vctr_a->y[1]));
#ifdef SKUO
     if( ((dq1/L)<DT_r && (dq2/L)<DT_r && (dp/L)<DT_2e_r &&
         dq1<DT && dq2<DT && dp<DT_2e &&
         (L1>=MINL || L2>=MINL)) ||
         (vctr_b->dst==200. && dq1<DT_y && dq2<DT_y && dp<(DT_y+1.0) ))
       printf("dq1=%.5f dq2=%.5f dp=%.5f\n",dq1/L,dq2/L,dp/L);
     else
       printf("                                     dq1=%.5f dq2=%.5f dp=%.5f\n",dq1/L,dq2/L,dp
endif if( ((dq1/L)<DT_r && (dq2/L)<DT_r && (dp/L)<DT_2e_r &&
         dq1<DT && dq2<DT && dp<DT_2e &&
         (L1>=MINL || L2>=MINL)) ||
         (vctr_b->dst==200. && dq1<DT_y && dq2<DT_y && dp<(DT_y+1.0) ))
     {
       *flag = 1;
       vctr_a->x[1] = vctr_b->x[1];
       vctr_a->y[1] = vctr_b->y[1];
       for(m=0;m<(vctr_b->no_clag);m++)
         {
           vctr_a->no_clag += 1;
           vctr_a->clagnode[vctr_a->no_clag-1] = vctr_b->clagnode[m];
           for(n=1;n<=((clagnode+vctr_b->clagnode[m])->no_vector);
               n++)
             if(((clagnode+vctr_b->clagnode[m])->vctr[n]) == vctr_b)
               (clagnode+vctr_b->clagnode[m])->vctr[n] = vctr_a;
         }
       if(vctr_a->no_lag!=0 && vctr_b->no_lag!=0)
         {
           no_lag = vctr_a->no_lag + vctr_b->no_lag;
           vctr_a->width=((float)(vctr_a->no_lag) * vctr_a->width
             +(float)(vctr_b->no_lag) * vctr_b->width)/(float)no_lag;
           vctr_a->no_lag = no_lag;
         }
       else if(vctr_b->no_lag!=0)
         {
           vctr_a->width = vctr_b->width;
           vctr_a->no_lag = vctr_b->no_lag;
         } while( (vctr_list->next) != vctr_b )
         vctr_list = vctr_list->next;
       vctr_list->next = vctr_b->next;
       free((char*)vctr_b);
     }
   }
 }
}
#undef DT
#undef DT_2e
#undef DT_r
#undef DT_2e_r
#undef DT_y
#undef MINL
#undef INIQ(h)

/* add a node to queue */
void addq(head,node)
int node;
struct queue **head;
{
  struct stack *np;
```

Bose-Kuo 8-3

```
  np=(struct stack *) malloc(sizeof(struct stack));
  if( np == (struct stack *) 0 ) printf("malloc fail in addq()\n");
  np->next = (struct stack *)NULL ;
  np->node = node;
  /* add operation */
  if((*head)->front == (struct stack *)NULL)
     (*head)->front = np;
  else (*head)->rear->next = np;
  (*head)->rear = np;
}

/* dump a node from queue */
void dumpq(head,node)
int *node;
struct queue **head;
{
  struct stack *out;

if( (out=(*head)->front) == (struct stack *) NULL )
      printf("STACK empty\n");
  else
    {
      if( (*head)->rear==(*head)->front )   (*head)->rear=out->next;
      (*head)->front = out->next;
    }

*node = out->node;
  free((char*)out);
}
```

Bose-Kuo 8-3

```
/***************************************************************/
/*                                                             */
/*                      NDOREC.C                               */
/*                                                             */
/***************************************************************/ include <nrec.h>
include <math.h> define PEN0    5.0     /* Penalty for staying in the same state */
define PEN2    5.0     /* Penalty for skipping a state */ typedef struct
{
        int pframe;     /* last frame of prev. model */
        int pmodel;     /* best model in current level */
} BPT;                  /* Back-pointer */ extern char *sname[];
extern unsigned short **pdim2();
extern double Tran[KM][KM];     /* transition prob. */ void ndorec(file1, file2, rows, cols)
char file1[40], file2[40];
int rows, cols;
{
        double **pdimf2(), **sprob;
        double bitprob, minprob, sum, smin, smin_old, tr_dist, val0, val1, val2;
        unsigned short *invec;
        char file3[40];
        FILE *f1, *f2, *f3;
        char dum[5], str[6], *spt;
        int hval, loc, segnum, lev_len;
        int i, j, k, l, jl, kl, j_high, jk, I, K, K_old, L;
        short t[KM+1][JM+1];    /* translates [char,seg] to [snum] */
        double d[KM+1][JM+1];                   /* dist of the new vector */
        double dt[KM+1][JM+1];                  /* dist of the prev vector */
        double D[LM+1][KM+1][JM+1];             /* cum dist */
        unsigned short B[LM+1][KM+1][JM+1];     /* no of segments in the path */
        double Dt[5*LM+1][KM+1][JM+1];          /* cum dist at prev seg,
                                                   prev char */
        unsigned short stay[LM+1][KM+1][JM+1], Ostay[LM+1][KM+1][JM+1];
                        /* Flag for staying in the prev. state */
        double dist_k;
        unsigned short **sval;
        BPT bpt[5*LM+1][LM+1][KM+1];    /* Back-pointer */
            /* In bpt[I][l][k], I = current frame,
                                l = current level,
                                k = next model in frame I+1,
                                pframe = last frame of prev. model
                                pmodel = best model in current level for
                                         transition to model k in next frame
            */ if ((f1 = fopen (file1, "r")) == (FILE *) NULL)
        {
              fprintf(stderr, "**** statfile cannot be opened\n");
              exit(1);
```

Bose-Kuo 8-3

```c
        }
ifdef DBUG1
        fprintf(stderr, "Creating %d x %d array\n", rows, cols);
#endif
        sval = pdim2(rows, cols);              /* create 2D array */

/* read in from statfile */ if(fread(sval[0], sizeof(unsigned short), cols*rows, f1)== 0)
        {
            fprintf(stderr, "Cannot read from statfile\n");
            exit(1);
        } sprob = pdimf2(rows, cols);    /* create 2D array to */
                                       /* store bit-dep. probabilities */ minprob = 1.0 / (2.0 * (double) cols);

for (i=0; i<rows; i++)
        {
            for (j = 0, sum = 0; j < (cols-1); j++)
            {
                if (!sval[i][cols-1])
                    sval[i][cols-1] = 1;

bitprob = ((float) sval[i][j])/((float) sval[i][cols-1]);

if (bitprob == 0.0)
                        bitprob = minprob;
                if (bitprob == 1.0)
                        bitprob = 1.0 - minprob;
                sprob[i][j] = log(bitprob/(1-bitprob));
                sum = sum + log(1-bitprob);
            } sprob[i][cols-1] = sum;
        } ifdef DBUG1
        fprintf(stderr, "label=p0, ind=38:\n");
        for (j=0; j<cols; j++)
                fprintf(stderr,"[%d]=%1.1e%c",j,sprob[38][j],
                                (j+1)%6 ? ' '    ' : '\n');
        fprintf(stderr, "\n");
endif /* Allocate memory for the incoming vector */ invec = (unsigned short *) calloc(N, sizeof(unsigned short));

/* Initialize the sstat[] of structures */

/* Initialize translation table t[k][j]  */
        /* Max JM states (segments) plus no. of states in each row */ for (j=0; j<=JM; j++)
            t[0][j] = -1;

for (i=0, j=k=1, jk=1; i<rows; i++)
        {
            t[k][j] = i;
```

Bose-Kuo 8-3

```
            if ((sname[i+1][1] == '0') || (i == (rows-1)))
            {
                while (++j <= JM)
                    t[k][j] = -1;        /* unused space */ t[k][0] = jk;   /* store J(k), max state for k */
                jk = 1, j = 1, k++;
            }
            else
            {
                j++, jk++;
            }
        }
ifdef DBUG1
        for (i=0; i<=KM; i++)
        {
            for (j=0; j<=JM; j++)
                fprintf(stderr, "%d%   ", t[i][j]);
            fprintf(stderr, "\n");
        }
endif if ((f2 = fopen (file2, "r")) == (FILE *) NULL)
        {
            fprintf(stderr, "**** Vector_file cannot be opened\n");
            exit(1);
        }

/* Initialize the arrays */ for (l=LM; l>=0; l--)
            for (k=KM; k>=0; k--)
            {
                B[l][k][0] = 0;
                for (j=JM; j>=0; j--)
                {
                    D[l][k][j] = MEG;
                    stay[l][k][j] = 0;
                    Ostay[l][k][j] = 0;
                }
            } for (j=LM; j>=0; j--)
            for (k=1; k<=KM; k++)
            {
                Dt[0][j][k] = MEG;
                bpt[0][j][k].pframe = 0;
                bpt[0][j][k].pmodel = 0;
                bpt[1][j][k].pframe = 0;
                bpt[1][j][k].pmodel = 0;
            } for (i=5*LM; i>=0; i--)
            for (k=1; k<=KM; k++)
            {
                Dt[i][0][k] = MEG;
                bpt[i][0][k].pframe = 0;
                bpt[i][0][k].pmodel = 0;
            } for (k=1; k<=KM; k++)
            Dt[0][0][k] = 0;

for (k=1; k<=KM; k++)
        {
```

Bose-Kuo 8-3

```
            jk = t[k][0];
            for (j=1; j<=jk; j++)
            {
                dt[k][j] = MEG;
            }
        }

/* Read the vector_file for the segment vectors */
        I = 0;
        while (fscanf(f2, "%s", dum) != EOF)
        {
            I++;
            i=0, j=0;
            while(i < (N/8))
            {
                if (!(fscanf(f2, "%x", &hval)))
                {
                    fprintf(stderr, "*** Unexpected end of Vector file");
                    exit(1);
                }
ifdef DBUG1
                fprintf(stderr, "hval = %x\n", hval);
endif for (k=7; k>=0; k--)
                {
                    invec[j+k] = (hval & 0x01);
                    hval = hval >> 1;
                } j = (++i)*8;
            }
            if (i = N%8)
            {
                if (!(fscanf(f2, "%x", &hval)))
                {
                    fprintf(stderr, "*** Unexpected end of Vector file");
                    exit(1);
                }
ifdef DBUG1
                fprintf(stderr, "hval = %x\n", hval);
endif
                for (k=i-1, j=(N/8)*8; k>=0; k--)
                {
                    invec[j+k] = (hval & 0x01);
                    hval = hval >> 1;
                }

} ifdef DBUG1
            fprintf(stderr, "Stat()-> ");
            for (i=0; i<N; i++)
                fprintf(stderr, "%d ",invec[i]);
            fprintf(stderr, "\n\n");
#endif
/* Level-building algorithm using HMM (scoring with Viterbi algorithm)  */

/* Find the Bayesian distance score of the observed seg from
```

- 83 -

Bose-Kuo 8-3

```
            the learned vectors   */ for (k=1; k<=KM; k++)
        {
            jk = t[k][0];
            for (j=1; j<=jk; j++)
            {
                l = t[k][j];
                for (i=0, sum=0; i<(cols-1); i++)
                    sum = sum - (double) invec[i] * sprob[l][i];

d[k][j] = sum - sprob[l][cols-1];
            }
        } ifdef DBUG1
        fprintf(stderr, "\na0=%f,a1=%f,a2=%f",d[1][1],d[1][2],d[1][3]);
endif /* Do for each level, each model and each state */ for (l=1; l<=LM; l++)
        {
            if (l > I) continue;

for (k=1; k<=KM; k++)
            {
                D[l][k][0] = Dt[I-1][l-1][k];

jk = t[k][0];

for (j=jk; j>0; j--)
                {
                    if ((j>2) || ((j==2) && (l!=1)))
                    {

/* three possibilities- from same state with penalty,
                           from prev. state, or skipping a state with penalty */ val0 = D[l][k][j] + (Ostay[l][k][j] ? 1.5*PEN0 :
                                                                  PEN0);
                            val1 = D[l][k][j-1] + d[k][j];

if (j == 2)
                                val2 = D[l][k][j-2] + d[k][j] +
                                        (Ostay[l-1][k][0] ? PEN2/2.0 : PEN2);
                            else
                                val2 = D[l][k][j-2] + d[k][j] +
                                        (Ostay[l][k][j-2] ? 0 : PEN2);

if ((val1 <= val0) && (val1 <= val2))
                            {
                                /* from prev. state */
                                D[l][k][j] = val1;
                                B[l][k][j] = B[l][k][j-1] +1;
                            }
                            else if (val2 <= val0)
                            {
                                /* penalize for skipping a state */
                                D[l][k][j] = val2;
                                B[l][k][j] = B[l][k][j-2] +1;
                            }
                            else
                            {
                                /* penalize for staying in same state, */
                                D[l][k][j] = val0;
```

- 84 -

Bose-Kuo 8-3

```
                    B[l][k][j] = B[l][k][j] +1;
                    stay[l][k][j] = 1;
                }
            }
            else if (j==2)
            {
            /* two possibilities at level 1 - from prev. state, or
               from the same state */ val0 = D[l][k][2] + (Ostay[l][k][2] ? 1.5*PEN0 :
                                                      PEN0);
                val1 = D[l][k][1] + d[k][2];

if (val1 <= val0)
                {
                    D[l][k][2] = val1;
                    B[l][k][2] = B[l][k][1] + 1;
                }
                else
                {
                    D[l][k][2] = val0;
                    B[l][k][2] = B[l][k][2] + 1;
                    stay[l][k][j] = 1;
                }
            }
            else if (j==1)

/* two possibilities- from the same state, or
               from previous level */
            {
                val0 = D[l][k][1] + (Ostay[l][k][1] ? 1.5*PEN0 :
                                                      PEN0);
                val1 = D[l][k][0] + d[k][1];

if (val1 <= val0)
                {
                    D[l][k][1] = val1;
                    B[l][k][1] = 1;
                }
                else
                {
                    D[l][k][1] = val0;
                    B[l][k][1] = B[l][k][1] + 1;
                    stay[l][k][j] = 1;
                }
            }
        }   /* end of j-loop */

}    /* end of k-loop */

/* Ignore frame 1. level 1, if the min. distance is
   large (noise) */ if (I == 1 && l == 1)
{
    smin = MEG * 2;
    for (k=KM ; k>0; k--)
    {
        if (D[l][k][1] < smin)
            smin = D[l][k][1];
    } if (smin > PEN0)
    {
            I = 0;
```

```
                        goto bad_frame;
            }
        }

/* Find the min. dist. among the last two states of all
           models of the current level, including the tran. prob.
           to the next model j, and store in Dt[I][l][j] and store
           the corresponding best model in K and the state in j_high */ for (j=0; j<=KM; j++)
        {
            smin = MEG * 2;

for (k=KM, K=0; k>0; k--)
            {
                tr_dist = (j ? (-log(Tran[k-1][j-1]))/2.0 : 0);
                jk = t[k][0];

if ((D[l][k][jk] + tr_dist) < smin)
                {
                    smin = D[l][k][jk] + tr_dist;
                    K = k;
                }
            }

K_old = K;
            smin_old = smin;

for (k=KM, K=0; k>=1; k--)
            {
                tr_dist = (j ? (-log(Tran[k-1][j-1]))/2.0 : 0);
                jk = t[k][0] - 1;
                if (jk == 0) continue;

/* Add penalty for skipping a state, unless continued in
                   the previous state */ dist_k = D[l][k][jk] + tr_dist + (stay[l][k][jk] ? 0 : PEN2);
                if (dist_k < smin)
                {
                    smin = dist_k;
                    K = k;
                }
            } if (smin >= smin_old)
            {
                smin = smin_old;
                K = K_old;
                j_high = t[K][0];
            }
            else
            {
                j_high = t[K][0] - 1;
            } lev_len = B[l][K][j_high];    /* no. of frames in model K,
                                             giving min dist in final or semi-final state */

Dt[I][l][j] = smin;    /* store best distance for j */
            bpt[I][l][j].pframe = I - lev_len;
            bpt[I][l][j].pmodel = K;
            stay[l][j][0] = stay[l][K][j_high];    /* store penalty info
                                                      for NEXT level */
```

Bose-Kuo 8-3

```
                /* Print the best string so far */
#ifdef DBUG
                if (!j)
                {
                    str[1] = 0;
                    i = I, k1= 0;
                    for(j1 = 1; j1 > 0; j1--)
                    {
                            K_old = bpt[i][j1][k1].pmodel;

if (j1 <= i)
                            {
                                jk = t[K_old][1];
                                str[j1-1] = sname[jk][0];
                            }
                            else str[i-1] = ' ';

i = bpt[i][j1][k1].pframe;
                            k1 = K_old;
                    } for (spt = str; *spt != 0; spt++)
                            if (*spt == 'S') *spt = 's';

fprintf(stderr, "Fr = %d, Lev = %d, ", I,1);
                    fprintf(stderr, "D = %.2f, Model = %d/%c%d, Pfr = %d, Str = %s\n",
                            Dt[I][1][0], K, str[1-1], j_high-1, bpt[I][1][0].pframe, str);

}
endif

}
        } /* end of level */ ifdef DBUG
        fprintf(stderr, "\n");
endif

/* Reinitialize for the next frame */ for (l=LM; l>=0; l--)
            for (k=KM; k>=0; k--)
                for (j=JM; j>=0; j--)
                {
                    Ostay[l][k][j] = stay[l][k][j];
                    stay[l][k][j] = 0;
                } bad_frame: continue;

} /* end of frame ( while(fscanf) loop ) */

/* Find the min. over all levels at the final frame */ smin = MEG;

for (l=LM, L=0; l>=1; l--)
        {
            if (l > I) continue;
            if (Dt[I][l][0] < smin)
            {
                smin = Dt[I][l][0];
                L = l;
            }
        }
```

```
        } str[L] = 0;
        i = I, k = 0;
        for(j = L; j > 0; j--)
        {
                K = bpt[i][j][k].pmodel;

if (i >= 1)
                {
                    jk = t[K][1];
                    str[j-1] = sname[jk][0];
                }
                else str[i-1] = ' ';

i = bpt[i][j][k].pframe;
                k = K;
        } for (spt = str; *spt != 0; spt++)
                if (*spt == 'S') *spt = 's';
#ifdef DEMO
        fprintf(stderr,"\nRecognized string is: %s (Dist = %f)\n",
            str, Dt[I][L][0]);
#else
        printf("%s ", str);
        if( (f3 = fopen("temp.res","a")) == (FILE *) NULL )
        {
            fprintf(stderr,"%s : cannot open for writing\n","file.fv");
            exit(1);
        } fprintf(f3, "%s ", str);
        fclose(f3);
endif if (fscanf(f2, "%x", &hval) != EOF)
        {
            fprintf(stderr, "*** Vector file longer than expected\n");
            exit(1);
        } fclose(f2);
}

/*******************************************************/ double **pdimf2(row, col)       /* creates 2D array of doubles */
int row, col;
{
    int i;
    register double **prow, *pdata;

pdata = (double *) calloc(row * col, sizeof (double));
    if (pdata == (double *) NULL)
    {
        fprintf(stderr, "No memory space for data\n");
        exit(1);
    } prow = (double **) calloc(row, sizeof (double *));

if (prow == (double **) NULL)
    {
        fprintf(stderr, "No memory space for row pointers\n");
        exit(1);
```

Bose-Kuo 8-3

```
    } for (i = 0; i < row; i++)
    {
        prow[i] = pdata;
        pdata += col;
    } return prow;
}

/*******************************************************/
```

Bose-Kuo 8-3

```
/****************************************************************/
/*                                                              */
/*                         NREC.C                               */
/*                                                              */
/****************************************************************/

/*
 * rec: recognize the input word
 *
 *
 * usage: rec [-i statfile] [-l statfile] [-r statfile]
 *                     [-p statfile label] [-v file.sv]
 *
 */ include <nrec.h>
include <math.h> main(argc, argv)
int argc;
char *argv[];
{
    void ndorec();
    unsigned short **pdim2();
    void pfree2();              /* frees the memory space */
    void pr_stat();
    int     rows, cols, ind, hval, seqnum, veclen;
    char    *dum, *calloc(), *malloc();
    short   init=0, learn=0, pr=0, rec=0;
    register int i, j, k;
    FILE    *f1, *f2;
    void stat_init();
    short snum();
    unsigned short **sval;
    char    file1[40], file2[40], lab[5], getlab[5];
    extern char *sname[];

sprintf(file1,"junk1");     /* default statfile */
    sprintf(file2,"temp.sv");   /* default Vector_file */ veclen = N/8 + (N%8 ? 1 : 0);

dum = (char *) malloc(2*veclen*sizeof(char));

while(argc-- > 1)
        if(argv[argc][0] == '-')
            switch(argv[argc][1])
            {
                case 'u':
                    printf("usage: rec [-i statfile.b] [-l statfile.b] [-r\
statfile.b]\n");
                    printf("           [-p statfile.b label]\n");
                    exit(1);
                case 'i':       /* initialize mode */
                    sprintf(file1,"%s",argv[argc+1]);
                    init = 1;
                    break;
                case 'l':       /* learn mode */
                    sprintf(file1,"%s",argv[argc+1]);
                    learn =1;
```

Bose-Kuo 8-3

```
                break;
            case 'r':        /* recognition mode */
                sprintf(file1,"%s",argv[argc+1]);
                rec =1;
                break;
            case 'p':        /* print */
                sprintf(file1,"%s",argv[argc+1]);
                sprintf(lab,"%s",argv[argc+2]);
                pr =1;
                break;
            case 'v':        /* initialize mode */
                sprintf(file2,"%s",argv[argc+1]);
                break;
            default:
                break;
        } cols = N + 1;          /* bit-sums plus total */
rows = (int) snum("xx");
                       /* "xx" not included in rows, to be used during
                          manual labeling for discarding a seg vector */ if (init)
{
    if ((f1 = fopen (file1, "w")) == (FILE *) NULL)
    {
        fprintf(stderr, "*** statfile cannot be opened\n");
        exit(1);
    } fprintf(stderr, "Creating %d x %d array\n", cols, rows);

sval = pdim2(rows, cols);              /* create 2D array */ if(fwrite(sval[0], sizeof(unsigned short), cols*rows, f1)== 0)
    {
        fprintf(stderr, "Cannot write into statfile\n");
        exit(1);
    } pfree2(sval);
    fclose(f1);
} else if (learn)
{
    if ((f1 = fopen (file1, "r+")) == (FILE *) NULL)
    {
        fprintf(stderr, "*** statfile cannot be opened\n");
        exit(1);
    } fprintf(stderr, "Xfering statfile to %d x %d array\n", cols, rows);

sval = pdim2(rows, cols);              /* create 2D array */

/* read in from statfile */ if(fread(sval[0], sizeof(unsigned short), cols*rows, f1)== 0)
    {
        fprintf(stderr, "Cannot read from statfile\n");
        exit(1);
    }

/* Establish segstat structures and initialize pointers */
```

Bose-Kuo 8-3

```
/** REQD. DURING RECOG. ONLY ** segstat = (Segstat *) calloc(rows, sizeof (Segstat));

for (i=0; i<rows; i++)
        {
            segstat[i]->bcountp = sval[i];
            segstat[i]->tcount = sval[i][N];
        }
*********************************/

/* Prompt for the vector file and the label file */ while(1)
        { printf("Vector_file / q: ");
        scanf("%s", file2);
        printf("\n");

#ifdef DBUG
fprintf(stderr, "Vector file = %s\n", file2);
endif if (!(strcmp(file2, "q")))
        { printf("Store the statfile? [y/n]:");
            scanf("%s", lab);
            printf("\n");

/* Write into statfile */ if (!(strcmp(lab, "y")))
            {
                rewind(f1);
                if(fwrite(sval[0], sizeof(unsigned short), cols*rows, f1) == 0)
                {
                    fprintf(stderr, "Cannot write into statfile\n");
                    exit(1);
                }
            }
            fclose(f1);
            exit(0);
        } if ((f2 = fopen (file2, "r")) == (FILE *) NULL)
        {
            fprintf(stderr, "**** Vector_file cannot be opened\n");
            continue;
        }

/* Convert the label to index and increment corresponding
           entries in the segstat structure */

/* Vector-file format: [label hex-byte hex-byte hex-byte hex-byte] */ while (fscanf(f2, "%s", lab) != EOF)
        {
/***
#ifdef DBUG
fprintf(stderr, "label = %s\n", lab);
#endif
```

- 92 -

Bose-Kuo 8-3

```
***/
        /* If the label is xx, throw away the vector and advance to the
           next vector */ if (!(strcmp(lab, "xx")))
                {
                    for (i=veclen; i>0; i--)
                        fscanf(f2, "%x", &hval);
                    continue;
                } if((ind = snum(lab)) == -1)
                {
#ifdef DBUG
fprintf(stderr, "Unknown label = %s\n", lab);
#endif
                    exit(1);
                }

/***
#ifdef DBUG
fprintf(stderr, "ind = %d\n", ind);
#endif
***/
                i=0, j=0;
                while(i < (N/8))
                {
                    if (!(fscanf(f2, "%x", &hval)))
                    {
                        fprintf(stderr, "*** Unexpected end of Vector file");
                        exit(1);
                    } ifdef DBUG1
fprintf(stderr, "hval = %x\n", hval);
endif for (k=7; k>=0; k--)
                    {
                        if (hval & 0x01)
                            sval[ind][j+k]++;
                        hval = hval >> 1;
                    }

/* *((segstat[ind]->bcountp)+j+k)++; */ j = (++i)*8;
                } if (i = N%8)
                {
                    if (!(fscanf(f2, "%x", &hval)))
                    {
                        fprintf(stderr, "*** Unexpected end of Vector file");
                        exit(1);
                    } ifdef DBUG1
fprintf(stderr, "hval = %x\n", hval);
endif
                    for (k=i-1, j=(N/8)*8; k>=0; k--)
                    {
                        if (hval & 0x01)
                            sval[ind][j+k]++;
                        hval = hval >> 1;
                    }
```

Bose-Kuo 8-3

```
                                    /* *((segstat[ind]->bcountp)+j+k)++; */
            } sval[ind][N]++;     /* Increment total for the seg. class */
ifdef DBUG1
fprintf(stderr, "Stat(%s)-> ",lab);
for (i=0; i<=N; i++)
    fprintf(stderr, "%d ",sval[ind][i]);
fprintf(stderr, "\n\n");
#endif

} fclose(f2);

}
    } else if (rec)
    {
        ndorec(file1, file2, rows, cols);
        exit(0);
    } else if (pr)
    { if ((f1 = fopen (file1, "r")) == (FILE *) NULL)
        {
            fprintf(stderr, "*** statfile cannot be opened\n");
            exit(1);
        } sval = pdim2(rows, cols);               /* create 2D array */

/* read in from statfile */ if(fread(sval[0], sizeof(unsigned short), cols*rows, f1)== 0)
        {
            fprintf(stderr, "Cannot read from statfile\n");
            exit(1);
        } while(1)
        { printf("Vector_file Label / q q: ");
        scanf("%s %s", file2, lab);
        printf("\n");

#ifdef DBUG
fprintf(stderr, "Vector file = %s\n", file2);
endif
        if (!(strcmp(file2, "q")))
        {
            fclose(f1);
            exit(0);
        } if ((f2 = fopen (file2, "r")) == (FILE *) NULL)
        {
            fprintf(stderr, "*** Vector_file cannot be opened\n");
```

Bose-Kuo 8-3

```
            exit(1);
    }

/* Convert the label to index and increment corresponding
       entries in the segstat structure */ while (fscanf(f2, "%s", getlab) != EOF)
    {
    /* Vector-file format: [label hex-byte hex-byte hex-byte hex-byte] */
    /* If the label is xx, throw away the vector and advance to the
       next vector */ if (strcmp(lab, getlab))
            {
                for (i=veclen; i>0; i--)
                    fscanf(f2, "%x", &hval);
                continue;
            } if((ind = snum(lab)) == -1)
            {
                continue;
            } ifdef DBUG
fprintf(stderr, "\nlabel = %s, ind = %d\n", lab, ind);
endif i=0, j=0;
            while(i < (N/8))
            {
                if (!(fscanf(f2, "%x", &hval)))
                {
                    fprintf(stderr, "*** Unexpected end of Vector file");
                    exit(1);
                } ifdef DBUG1
fprintf(stderr, "hval = %x\n", hval);
endif for (k=7; k>=0; k--)
            {
                if ((hval & 0x01) || (sval[ind][j+k]))
                    {
                        fprintf(stderr,"stat[%s][%d] = %d     ", lab, (j+k),
                                                    sval[ind][j+k]);
                        fprintf(stderr,"vec[%d] = %d\n", (j+k),
                                                    (hval & 0x01));
                    }
                hval = hval >> 1;
            }

/* *((segstat[ind]->bcountp)+j+k)++; */ j = (++i)*8;
        } if (i = N%8)
        {
            if (!(fscanf(f2, "%x", &hval)))
            {
                fprintf(stderr, "*** Unexpected end of Vector file");
                exit(1);
            }
```

Bose-Kuo 8-3

```c
#ifdef DBUG1
fprintf(stderr, "hval = %x\n", hval);
endif
                for (k=i-1, j=(N/8)*8; k>=0; k--)
                {
                        if ((hval & 0x01) || (sval[ind][j+k]))
                        {
                                fprintf(stderr,"stat[%s][%d] = %d     ",
                                        lab, (j+k), sval[ind][j+k]);
                                fprintf(stderr,"vec[%d] = \n", (j+k),
                                        (hval & 0x01));
                        } hval = hval >> 1;
                }
                        /* *((segstat[ind]->bcountp)+j+k)++; */
        } fprintf(stderr,"stat[%s][N] = %d\n", lab, sval[ind][N]);

} fclose(f2);

}

}

}

/*****************************************************/ unsigned short **pdim2(row, col)          /* creates 2D array of integers */
int row, col;
{
    int i;
    register unsigned short **prow, *pdata;

pdata = (unsigned short *) calloc(row * col, sizeof (unsigned short));
    if (pdata == (unsigned short *) NULL)
    {
        fprintf(stderr, "No memory space for data\n");
        exit(1);
    } prow = (unsigned short **) calloc(row, sizeof (unsigned short *));

if (prow == (unsigned short **) NULL)
    {
        fprintf(stderr, "No memory space for row pointers\n");
        exit(1);
    } for (i = 0; i < row; i++)
    {
        prow[i] = pdata;
        pdata += col;
    } return prow;
}

/*****************************************************/ void pfree2(prow)               /* frees the memory space */
```

```
Bose-Kuo 8-3
unsigned short **prow;
{
    void free();

free(*prow);              /* free the data space */
    free(prow);               /* free the pointer space */
}

/*******************************************************/

/* snum() converts a pointer to a segname, to a value */ short snum(sp)
char *sp;
{
    short i;
    extern char *sname[];

for (i=0; sname[i] != (char *) NULL; i++)
        if (!(strcmp(sp, sname[i])))
            return i;

#ifdef DBUG
    fprintf(stderr, "****Unknown segname %s\n",sp);
#endif
    return -1;
}

/*******************************************************/
```

Bose-Kuo 8-3 nrec.h

```
include <stdio.h> define N       32      /* Dimension of bit-vector */
define JM      5       /* Col_max in t[k][j]     */
#define KM      27      /* Row_max in t[k][j]     */
#define LM      5       /* Max no of expected chars in the word */
#define EPS     1.0e-6  /* Small value            */
#define MEG     1.0e+6  /* Large value            */
#define MIN(x,y) (((x) < (y)) ? (x) : (y))
#define Z(z)    (-log(z))

typedef struct Segstat {
    char *name;                 /* segment name */
    short loc;                  /* location within char */
                                /* first=0, int=1, end=2; */
    double *probp;              /* input dependent bit probabilities, */
                                /* ln(p/1-p) */
    double nprob;               /* Sum(ln(1-p)) */
    float segprob;              /* ln(char_probability) */
                                /* store in the first seg */
/*  unsigned short *bcountp;    bit_sum of 1's during learning */
/*  unsigned short tcount;      total occurences of this seg */
} Segstat;
```

Bose-Kuo 8-3 path_analy.c

```c
/* Analysis the path node */ include <ftr.h> define width_cg 2   /* width change between two adjacent node */
define LO 0.7       /* threshold for width change */
#define LO_r 0.8     /* lo for ramp like node */
#define EPSILON 0.15
#define RATIO_v 1.5  /* threshold of the height-width-ratio for
                        vertical vector */
#define RATIO_v_s 3.0 /* threshold of the height-width-ratio for
                         vertical vector when it's a single isolated path*/
#define RATIO_v_c 1.2 /* threshold of the height-width-ratio for
                         vertical vector when collnear checking fails */
#define RATIO_h 0.65 /* threshold of the height-width-ratio for
                        horizontal vector */
define DT 1.5       /* distance threshold for merging v-h-v vectors */ void path_analy(image,rows,cols,node,clagnode,ith,vctr_list)
int **image,rows,cols;
struct node *node;
struct clagnode *clagnode;
struct vector *vctr_list;
int  ith;
{
  int flag_a, flag_b, flag_c, flag_s,flag_ii, flag_ii_a;
  int flag_sz, flag_x, flag_xx, flag_wx;
  int i,j,number,number_x,no_group=1,no_lag;
  int c_node,p_node, *merge;
  int ibeg,iend,max,gp_count,center;
  int start,end;
  int **group,no;
  float *x,*y;
  float epsilon,lo,lo1,width,ratio,ratio_a,ratio_b;
  float x1,x2,y1,y2,dst;
  float a[3], L, dq1, dq2, dp;
  float width_x,ratio_x;
  int m,clagnode_x,x_node;
  struct vector *vctr, *vctr_b;

number = (clagnode+ith)->number ;
  group = imatrix(1,number,1,4);
                /* column 1: lag-node no.                    */
                /* column 2: lag-node's width                */
                /* column 3: group's no.                     */
                /* column 4: feature category                */
                /*           (1: v-vector, 2: h-vector, 3: arc) */ x=vector(1,number);
  y=vector(1,number);
  for(j=1;j<=number;j++)
     {
       c_node = (clagnode+ith)->node[j];
       x[j]=((float)(node+c_node)->col_start +
             (float)(node+c_node)->col_end ) / 2.0;
       y[j]=(node+c_node)->rowth;
     } for(j=1;j<=number;j++)
     {
       group[j][1] = (clagnode+ith)->node[j];    /* node */
       group[j][2] = (node+group[j][1])->col_end /* node's width */
           - (node+group[j][1])->col_start + 1 ;
     }
```

```
Bose-Kuo 8-3 ibeg = 1;

/* check whether this is a single isolated path-clagnode */
/* if( (clagnode+ith)->a_clagnode[0] == 0 &&
     (clagnode+ith)->b_clagnode[0] == 0 )  flag_s=1;
   else flag_s=0;*/

/* seperate the path into similar group */
   group[1][3] = no_group;
   for(i=1;i<number;i++)
      {
      /* check width change */
      flag_a=0;
      flag_b=0;
      flag_c=0;
      if(abs(group[i][2]-group[i+1][2])>width_cg)  flag_a=1;
      if(i>1&&i<(number-1))
         {
         epsilon = fabs((float)group[i][2]/(float)group[i+1][2] -
                        (float)group[i-1][2]/(float)group[i][2]);
         epsilon += fabs((float)group[i][2]/(float)group[i+1][2] -
                        (float)group[i+1][2]/(float)group[i+2][2]);
         if(epsilon>EPSILON) flag_b=1;
         }
      lo=(float)group[i][2]/(float)group[i+1][2];
      if(lo<LO || lo>(1./LO)) flag_c=1;
      if(flag_a==1&&flag_b==1&&flag_c==1)
         {
         iend = i;
         /* check  collinearity */
         if( abs(iend-ibeg)>2 && collinear(x,y,ibeg,iend,&max,&dst)==1
            && dn_change(x,ibeg,iend) != 2 )
            {
            no_group += 1;
            for(j=max;j<=iend;j++)
               group[j][3] = no_group;
            for(j=ibeg;j<=iend;j++)
               group[j][4] = 3;
            }
         ibeg = i+1 ;
         no_group += 1;
         /* detect and skip ramp-like path node */
         if(i<(number-1))
            {
            lol=(float)group[i+1][2]/(float)group[i+2][2];
            if((lo<LO_r&&lol<LO_r) || (lo>(1./LO_r)&&lol>(1./LO_r)))
               {
               i += 1;
               ibeg = i+1 ;
               group[i][3] = no_group;
               }
            }
         }
      group[i+1][3] = no_group;
      }
   iend = number;

/* detect special cases for wx and return two vectors */
   flag_wx = 0;
   if( no_group==1 && number > 3 )
      {
      flag_wx = wx_detect(image,rows,cols,node,
                          clagnode,ith,group,x,y,vctr_list);
      if(flag_wx == 1)
         {
```

Bose-Kuo 8-3

```
            (clagnode+ith)->group = 1;
            goto output;
          }
      }

/* check  collinearity */
      if( abs(iend-ibeg)>2 && collinear(x,y,ibeg,iend,&max,&dst)==1
          && dn_change(x,ibeg,iend) != 2 )
        {
          no_group += 1;
          for(j=max;j<=iend;j++)
             group[j][3] = no_group;
          for(j=ibeg;j<=iend;j++)
             group[j][4] = 3;
        }
      (clagnode+ith)->group = no_group;

/* retrieve the vector for each group */
      merge = ivector(1,(no_group+1));
      gp_count = group[1][3];
      ibeg = 1;
      for(i=1;i<=number;i++)
        {
          if(group[i][3]==gp_count && i!=number)  continue;
          if(i==number)  iend=i;
          else     iend = i-1;

if(abs(ibeg-iend)>1)
             line_fit(group,x, y,ibeg,iend,&x1,&x2,&start,&end);
          else ( x1=x[ibeg]; x2=x[iend]; start=ibeg; end=iend;)
          width=0.0;
          for(j=start;j<=end;j++)
             width += group[j][2];
          no_lag = abs(end-start+1);
          width /= (float)no_lag;
          ratio = (float)(iend-ibeg+1)/width;

/* detect the special condition for x-arms type */
          flag_x=0;
/*        if( ((node+group[ibeg][1])->above==0 &&
              (node+group[iend][1])->below==1 &&
              (node+(node+group[iend][1])->b_node[0])->below==1) ||
              ((node+group[iend][1])->below==0 &&
              (node+group[ibeg][1])->above==1 &&
              (node+(node+group[ibeg][1])->a_node[0])->above==1) )
              flag_x = 1;*/
          flag_xx=0;
          width_x = 0.0;
          ratio_x = 0.0;
          if( ((node+group[ibeg][1])->above==0 &&
              (node+group[iend][1])->below==1 &&
              (node+(node+group[iend][1])->b_node[0])->above==2 &&
              (node+(node+group[iend][1])->b_node[0])->below==1) )
            {
              clagnode_x =
                (clagnode+(clagnode+ith)->b_clagnode[0])->b_clagnode[0];
              number_x = (clagnode+clagnode_x)->number;
              for(m=1;m<=number_x;m++)
                {
                  x_node = (clagnode+clagnode_x)->node[m];
                  width_x += (float)((node+x_node)->col_end -
                                      (node+x_node)->col_start + 1);
                }
              width_x /= (float)number_x;
              ratio_x = (float)number_x / width_x;
              if(ratio_x > 0.5 && ratio_x<2.2)
```

- 101 -

Bose-Kuo 8-3

```
            {
              flag_x=1;
              if((node+(clagnode+clagnode_x)->node[number_x])->below==2)
                flag_xx=1;
            }
          }
        else if ( ((node+group[iend][1])->below==0 &&
                   (node+group[ibeg][1])->above==1 &&
                   (node+(node+group[ibeg][1])->a_node[0])->below==2 &&
                   (node+(node+group[ibeg][1])->a_node[0])->above==1) )
          {
            clagnode_x =
              (clagnode+(clagnode+ith)->a_clagnode[0])->a_clagnode[0];
            number_x = (clagnode+clagnode_x)->number;
            for(m=1;m<=number_x;m++)
              {
                x_node = (clagnode+clagnode_x)->node[m];
                width_x += (float)((node+x_node)->col_end -
                           (node+x_node)->col_start + 1);
              }
            width_x /= (float)number_x;
            ratio_x = (float)number_x / width_x;
            if(ratio_x > 0.5 && ratio_x<2.2)
              {
                flag_x=1;
                if((node+(clagnode+clagnode_x)->node[1])->above==2)
                  flag_xx=1;
              }
          }

/* detect condition (ii) in page 119 */
        flag_ii=0;
        if((node+group[ibeg][1])->above==1 && (node+group[iend][1])->below==1)
          {
            p_node = (node+group[ibeg][1])->a_node[0];
            ratio_a = (float)abs((node+p_node)->col_end -
                                 (node+p_node)->col_start +1) / width;
            p_node = (node+group[iend][1])->b_node[0];
            ratio_b = (float)abs((node+p_node)->col_end -
                                 (node+p_node)->col_start +1) / width;
            if(ratio_a>1.7 || ratio_b>1.7) flag_ii=1;
          }
        /* detect condition (ii) in page 119, but one side instead
           ( for returning a vector in top-right corner of c ) */
        flag_ii_a=0;
        if((node+group[1][1])->above==1 && no_group==1 &&
           (node+group[number][1])->below==0 &&
           ((clagnode+(clagnode+ith)->a_clagnode[0])->a_clagnode[0]==0 ||
            ((clagnode+(clagnode+ith)->a_clagnode[0])->class=='j' &&
             (clagnode+(clagnode+ith)->a_clagnode[0])->a_clagnode[1]==0 &&
             (clagnode+(clagnode+(clagnode+ith)->a_clagnode[0])->a_clagnode[0])->a_clagnode[
          {
            p_node = (node+group[1][1])->a_node[0];
            ratio_a = (float)abs((node+p_node)->col_end -
                                 (node+p_node)->col_start +1) / width;
            if(ratio_a>1.7) flag_ii_a=1;
          }
        else if((node+group[1][1])->above==0 && no_group==1 &&
           (node+group[number][1])->below==1 &&
           ((clagnode+(clagnode+ith)->b_clagnode[0])->b_clagnode[0]==0 ||
            ((clagnode+(clagnode+ith)->b_clagnode[0])->class=='j' &&
             (clagnode+(clagnode+ith)->b_clagnode[0])->b_clagnode[1]==0 &&
             (clagnode+(clagnode+(clagnode+ith)->b_clagnode[0])->b_clagnode[0])->b_clagnode[
          {
            p_node = (node+group[iend][1])->b_node[0];
            ratio_b = (float)abs((node+p_node)->col_end -
```

Bose-Kuo 8-3

```c
                                        (node+p_node)->col_start +1) / width;
            if(ratio_b>1.7) flag_ii_a=1;
        }

/* return vectors */
    if(ratio>=RATIO_v ||
        ((flag_ii==1 || flag_ii_a==1) && ((float)no_lag*width) <= 50.) ||
        (ratio>=0.7 && flag_x==1) ||
        flag_xx==1 ||
        (group[start][4]==3 && ratio>=RATIO_v_c) )
        {
            vctr=add_vctr(vctr_list,clagnode,ith,x1,y[ibeg],x2,y[iend]);
            vctr->type = 'v';
            if( flag_ii==1 || flag_ii_a==1)
                {
                    vctr->small_v = 'c';
                    if(flag_ii==1 && no_lag==1)
                        {
                            vctr->y[0] -= 0.01;
                            vctr->y[1] += 0.01;
                        }
                }
            vctr->no_lag = no_lag;
            vctr->width = width;
            if( y_detect(image,rows,cols,node,clagnode,ith,ibeg,iend) ==1 )
                {
                    vctr->dst=200.0;
                    for(j=ibeg;j<=iend;j++)
                        group[j][4] = 4;          /* vertical vector for y */
                    merge[gp_count]=4;
                }
            else
                {
                    for(j=ibeg;j<=iend;j++)
                        group[j][4] = 1;          /* vertical vector */
                    merge[gp_count]=1;
                }
        }
    else if ( ratio<=RATIO_h && number > 1)
        {
            center=(int) ((ibeg+iend)/2.0+0.5);
            x1 = (float)((node+group[center][1])->col_start);
            x2 = (float)((node+group[center][1])->col_end);
            y1 = y2 = (float)((node+group[center][1])->rowth);
            (add_vctr(vctr_list,clagnode,ith,x1,y1,x2,y2))->type='h';
            for(j=ibeg;j<=iend;j++)
                group[j][4] = 2;                  /* horozontal vector */
            merge[gp_count]=2;
        }
    else merge[gp_count] = 0;

ibeg = i;
    gp_count += 1;
    }

/* if nothing returned for an entire path and the x-, y-spread of two
   ending points of the line-fit() returned vector are large, then
   return a vertical vector (make for fixing clsz.pic) */
flag_sz = 0;
for(i=1;i<=no_group;i++)
    if(merge[i]) flag_sz = 1;
if(flag_sz==0 && (float)number >= SYMIN)
    {
        line_fit(group,x, y,1,number,&x1,&x2,&start,&end);
        if(fabs(x1-x2)>=SXMIN)
            {
```

Bose-Kuo 8-3

```
            width=0.0;
            for(j=start;j<=end;j++)
              width += group[j][2];
            no_lag = abs(end-start+1);
            width /= (float)no_lag;
            vctr=add_vctr(vctr_list,clagnode,ith,x1,y[1],x2,y[number]);
            vctr->type = 'v';
            vctr->no_lag = no_lag;
            vctr->width = width;
          }
      }

/* merge v-h-v vectors or v-v vectors */
   merge[no_group+1]=0;
   for(i=1;i<=(no_group-1);i++)
     if(merge[i]==1&&(((merge[i+1]==2||merge[i+1]==0)&&merge[i+2]==1)||
                      merge[i+1]==1))
       {
          vctr = *((clagnode+ith)->vctr) ;
          j=1;
          while(merge[j]!=0 && j<i)
            {
               vctr = vctr->next;
               j += 1;
            }
          if(merge[i+1]==0||merge[i+1]==1) vctr_b = vctr->next;
          else vctr_b = (vctr->next)->next;

a[0] = vctr->y[0] - vctr_b->y[1];
          a[1] = vctr_b->x[1] - vctr->x[0];
          a[2] = vctr_b->y[1]*vctr->x[0] - vctr->y[0]*vctr_b->x[1];
          L = sqrt( a[0]*a[0] + a[1]*a[1] );
          dq1 = fabs((a[0]*vctr->x[1] + a[1]*vctr->y[1] + a[2])/L);
          dq2 = fabs((a[0]*vctr_b->x[0] + a[1]*vctr_b->y[0] + a[2])/L);
          dp=sqrt((vctr_b->x[0]-vctr->x[1])*(vctr_b->x[0]-vctr->x[1])+
                  (vctr_b->y[0]-vctr->y[1])*(vctr_b->y[0]-vctr->y[1]));
          if( dq1<DT && dq2<DT )
            {
               vctr->x[1] = vctr_b->x[1];
               vctr->y[1] = vctr_b->y[1];
               no_lag = vctr->no_lag + vctr_b->no_lag;
               vctr->width=((float)(vctr->no_lag) * vctr->width
                           +(float)(vctr_b->no_lag) * vctr_b->width)/
                           (float)no_lag;
               vctr->no_lag = no_lag;
               vctr = vctr_list;
               (clagnode+ith)->no_vector -= 1;
               /* remove the disgarded vector from link */
               while( (vctr->next) != vctr_b )
                  vctr = vctr->next;
               vctr->next = vctr_b->next;
               free((char*)vctr_b);
            }
       } free_ivector(merge,1,(no_group+1));

output:
   no = (clagnode+ith)->no_vector ;
   if( no > 0 )
     {
        vctr = *((clagnode+ith)->vctr);
        free( (char*)(clagnode+ith)->vctr );
        if( ((clagnode+ith)->vctr=(struct vector **)
             calloc((unsigned)no,sizeof(struct vector*))) ==
            (struct vector **)0 )
```

Bose-Kuo 8-3

```c
        printf("calloc fail in (clagnode+%d)->vctr\n",i);
       (clagnode+ith)->vctr -= 1;  /* start from ONE */
       for(j=1;j<=no;j++)
         {
            (clagnode+ith)->vctr[j] = vctr;
            vctr = vctr->next;
         }
    } free_vector(x,1,number);
   free_vector(y,1,number);
   free_imatrix(group,1,number,1,4);

}
#undef width_cg
#undef LO
#undef LO_r
#undef EPSILON
#undef RATIO_h
#undef RATIO_v
#undef RATIO_v_c
undef DT /* add new entry to end of vecor-list */
struct vector *add_vctr(vctr_list,clagnode,ith,x1,y1,x2,y2)
struct vector *vctr_list;
struct clagnode *clagnode;
int ith;
float x1,x2,y1,y2;
{ while( vctr_list->next != (struct vector *)NULL )
    vctr_list = vctr_list->next;
  /* reserve a space for the next new entry */
  if((vctr_list->next=(struct vector *)calloc(1,sizeof(struct vector)))
      == (struct vector *)0 )
    printf("calloc fail in add_vctr(): 1\n");
  /* add NULL to the new end of the list */
  (vctr_list->next)->next = (struct vector *)NULL;
  if( (clagnode+ith)->no_vector == 0 )
    {
       if( ((clagnode+ith)->vctr=(struct vector **)
           calloc(1,sizeof(struct vector*))) == (struct vector **)0 )
         printf("calloc fail in add_vctr(): (clagnode+%d)->vctr\n",ith);
       *((clagnode+ith)->vctr) = vctr_list;
    }
  (clagnode+ith)->no_vector += 1;

vctr_list->x[0]=x1+0.5;
  vctr_list->x[1]=x2+0.5;
  vctr_list->y[0]=y1+0.5;
  vctr_list->y[1]=y2+0.5;
  vctr_list->no_clag += 1;
  vctr_list->clagnode[(vctr_list->no_clag -1)] = ith;
  return(vctr_list);
}

/* check collinearity */ define T0 2.6 /* threshold for collinear */ int collinear(x,y,ibeg,iend,max,distance)
float *x,*y;
int ibeg,iend,*max;
float *distance;
```

Bose-Kuo 8-3

```
{
  float a[3],L,T,d;
  int i;

a[0] = y[ibeg] - y[iend];
  a[1] = x[iend] - x[ibeg];
  a[2] = y[iend]*x[ibeg] - y[ibeg]*x[iend];
  L = sqrt( a[0]*a[0] + a[1]*a[1] );
  *max = ibeg;
  T=0.0;
  for(i=(ibeg+1);i<=(iend-1);i++)
     {
       d = a[0]*x[i] + a[1]*y[i] + a[2];
       if(fabs(d)>T)
          {
            T = fabs(d);
            *max = i;
          }
     }
  T = T/L;
  *distance = T;
  if(T>=T0) return(1);
  else return(0);
}
undef T0 dn_change(xarray, start, end)
float *xarray;
int start, end;
{ float *xp;
        int *cp, last, val, change, count, i;
        int left, right;

count = end - start +1;
        xp = xarray + start + 1;
        last = change = val = 0;

for (i = 1; i < (count-1); i++, xp++)
        {
                if (*xp > *(xp-1))
                        left = 1;
                else if (*xp < *(xp-1))
                        left = -1;
                else left = 0;

if (*xp < *(xp+1))
                        right = 1;
                else if (*xp > *(xp+1))
                        right = -1;
                else right = 0;

if ((right + left) > 0)
                        val = 1;
                else if ((right + left) < 0)
                        val = -1;
                else val = last;

if ((last * val) < 0)
                        change ++;
                last = val;
        } return (change);

}
```

Bose-Kuo 8-3

```c
/* Analysis the path node during the feature extraction stage         path_s.c include <ftr.h> define width_cg 3      /* width change between two adjacent node */
define LO 0.6          /* threshold for width change */
#define LO_r 0.8        /* lo for ramp like node */
#define EPSILON 0.15
#define RATIO_v 1.2     /* threshold of the height-width-ratio for
                           vertical vector */
#define RATIO_h 0.85    /* threshold of the height-width-ratio for
                           horizontal vector */
#define RATIO_v_one 0.9 /* threshold of the height-width-ratio for
                           vertical vector if clag has ONLY one path */
#define RATIO_v_i 0.7   /* threshold of the height-width-ratio for
                           vertical vector if clag has ONLY one path and is
                           most likely the top of i */
define DT 1.5          /* distance threshold for merging v-h-v vectors */ void path_s(image,rows,node,clagnode,no_clagnode,ith,type,vctr_list)
int **image,rows, no_clagnode;
struct node *node;
struct clagnode *clagnode;
struct vector *vctr_list;
char type;
int ith;
{
  int flag_a, flag_b, flag_c, flag_s,flag_i,flag_ii_a, flag_sz;
  int i,j,number,no_group=1,no_lag;
  int c_node,p_node, *merge;
  int ibeg,iend,max,gp_count,center,count;
  int start,end;
  int **group,no;
  float *x,*y;
  float epsilon,lo,lo1,width,ratio,ratio_a,ratio_b;
  float x1,x2,y1,y2,dst,dst_lnth;
  float a[3], L, dq1, dq2, dp;
  float **gp_width, loend;
  struct vector *vctr, *vctr_b;

number = (clagnode+ith)->number ;
  group = imatrix(1,number,1,4);
              /* column 1: lag-node no.                      */
              /* column 2: lag-node's width                  */
              /* column 3: group's no.                       */
              /* column 4: feature category                  */
              /*           (1: v-vector, 2: h-vector, 3: arc) */ x=vector(1,number);
  y=vector(1,number);
  for(j=1;j<=number;j++)
    {
      c_node = (clagnode+ith)->node[j];
      x[j]=((float)(node+c_node)->col_start +
            (float)(node+c_node)->col_end ) / 2.0;
      y[j]=(node+c_node)->rowth;
    } for(j=1;j<=number;j++)
    {
      group[j][1] = (clagnode+ith)->node[j];           /* node */
      group[j][2] = (node+group[j][1])->col_end        /* node's width */
                  - (node+group[j][1])->col_start + 1 ;
    }
```

- 107 -

Bose-Kuo 8-3

```c
ibeg = 1;

/* check whether this is a single path-clagnode */
if( (clagnode+ith)->a_clagnode[0] == 0 &&
    (clagnode+ith)->b_clagnode[0] == 0 )   flag_s=1;
else flag_s=0;
/* check whether the single path is the top of i */
width=0.0;
if(flag_s==1 && ith<no_clagnode && no_clagnode ==2)
  {
    for(i=1;i<=((clagnode+2)->number);i++)
      width += (float)(node+(clagnode+2)->node[i])->col_end
             - (float)(node+(clagnode+2)->node[i])->col_start + 1. ;
    if((float)((clagnode+2)->number) / width > 4.5) flag_i=1;
  }
/* return if it is a noise-like single path-clagnode */
if(flag_s ==1)
  {
    width=0.0;
    for(j=1;j<=number;j++)
      width += group[j][2];
    if (width<=4.0) return;
  }

/* check width change and seperate them into groups with similar width */
group[1][3] = no_group;
for(i=1;i<number;i++)
  {
    flag_a=0;
    flag_b=0;
    flag_c=0;
    if(abs(group[i][2]-group[i+1][2])>width_cg)  flag_a=1;
    if(i>1&&i<(number-1))
        {
           epsilon = fabs((float)group[i][2]/(float)group[i+1][2] -
                          (float)group[i-1][2]/(float)group[i][2]);
           epsilon += fabs((float)group[i][2]/(float)group[i+1][2] -
                          (float)group[i+1][2]/(float)group[i+2][2]);
           if(epsilon>EPSILON) flag_b=1;
        }
    lo=(float)group[i][2]/(float)group[i+1][2];
    if(lo<=LO || lo>=(1./LO)) flag_c=1;
    if(flag_a==1 && ( (i==1 && group[1][2]>8) || flag_b==1 ||
                     (i==(number-1) && group[number][2]>8)  )
        && flag_c==1 )
      {
        ibeg = i+1 ;
        no_group += 1;
        /* detect and skip ramp-like path node */
        if(i<(number-1))
           {
              lo1=(float)group[i+1][2]/(float)group[i+2][2];
              if((lo<LO_r&&lo1<LO_r) || (lo>(1./LO_r)&&lo1>(1./LO_r)))
                 {
                    i += 1;
                    group[i][3] = no_group;
                 }
           }
      }
    group[i+1][3] = no_group;
  }
/* recombine groups if their AVERAGE widths don't have big change */
if(no_group>=2)
  {
    gp_width = matrix(1,no_group,1,3);
    gp_count = group[1][3];
```

Bose-Kuo 8-3

```
    ibeg = 1;
    lol = (float)group[1][2] / (float)group[2][2];
    loend = (float)group[number][2] / (float)group[number-1][2] ;
    /* find average width for each group */
    for(i=1;i<=number;i++)
       {
          if(group[i][3]==gp_count && i!=number)  continue;
          if(i==number)   iend=i;
          else    iend = i-1;
          count = iend-ibeg+1;
          gp_width[gp_count][1] = (float)ibeg;
          gp_width[gp_count][2] = (float)iend;
          for(j=ibeg;j<=iend;j++)
            gp_width[gp_count][3] += (float)group[j][2];
          /* don't count the first or last run length if it is an outlier */
          if(ibeg==1 && count>1 && abs(group[1][2]-group[2][2])>width_cg &&
              (lol<=LO || lol>=(1./LO)) )
             gp_width[gp_count][3] = (gp_width[gp_count][3] -
                                     (float)group[1][2]) / (float)(count-1);
          else if(iend==number && count>1 &&
                   abs(group[number][2]-group[number-1][2])>width_cg &&
                  (loend<=LO || loend>=(1./LO)) )
             gp_width[gp_count][3] = (gp_width[gp_count][3] -
                                     (float)group[number][2]) /
                                     (float)(count-1);
          else    gp_width[gp_count][3] /= (float)count;

gp_count += 1;
          ibeg = i;
       }
    /* checking and recombining */
    gp_count = no_group;
    for(i=1;i<gp_count;i++)
       {
          lo = gp_width[i][3]/gp_width[i+1][3];
          if(!(fabs(gp_width[i][3]-gp_width[i+1][3])>=(float)width_cg &&
              (lo<=LO || lo>=(1./LO))) )
             {
                for(j=((int)gp_width[i+1][1]);j<=number;j++)
                   group[j][3] -= 1;
                no_group -= 1;
             }
       } free_matrix(gp_width,1,no_group,1,3);
  }

(clagnode+ith)->group = no_group;

/* retrieve the vector for each group */
  merge = ivector(1,(no_group+1));
  gp_count = group[1][3];
  ibeg = 1;
  for(i=1;i<=number;i++)
     {
        if(group[i][3]==gp_count && i!=number)  continue;
        if(i==number)   iend=i;
        else    iend = i-1;

width=0.0;
        for(j=ibeg;j<=iend;j++)
           width += group[j][2];
        no_lag = iend-ibeg+1;
        width /= (float)no_lag;
        ratio = (float)(iend-ibeg+1)/width;
```

Bose-Kuo 8-3

```
/* skip noise-like group */
if( (width*(float)no_lag)<=4.&&width<=2. )
  {
    merge[gp_count] = 0;
    ibeg = i;
    gp_count += 1;
    continue;
  }

/* detect condition (ii) in page 119, but one side instead
   ( for returning a vector in top-right corner of c ) */
flag_ii_a=0;
if((node+group[1][1])->above==1 && no_group==1 &&
   (node+group[number][1])->below==0 &&
   ((clagnode+(clagnode+ith)->a_clagnode[0])->a_clagnode[0]==0 ||
    ((clagnode+(clagnode+ith)->a_clagnode[0])->class=='j' &&
     (clagnode+(clagnode+ith)->a_clagnode[0])->a_clagnode[1]==0 &&
     (clagnode+(clagnode+(clagnode+ith)->a_clagnode[0])->a_clagnode[0])->a_clagnode
  {
    p_node = (node+group[1][1])->a_node[0];
    ratio_a = (float)abs((node+p_node)->col_end -
                         (node+p_node)->col_start +1) / width;
    if(ratio_a>1.7) flag_ii_a=1;
  }
else if((node+group[1][1])->above==0 && no_group==1 &&
   (node+group[number][1])->below==1 &&
   ((clagnode+(clagnode+ith)->b_clagnode[0])->b_clagnode[0]==0 ||
    ((clagnode+(clagnode+ith)->b_clagnode[0])->class=='j' &&
     (clagnode+(clagnode+ith)->b_clagnode[0])->b_clagnode[1]==0 &&
     (clagnode+(clagnode+(clagnode+ith)->b_clagnode[0])->b_clagnode[0])->b_clagnode
  {
    p_node = (node+group[iend][1])->b_node[0];
    ratio_b = (float)abs((node+p_node)->col_end -
                         (node+p_node)->col_start +1) / width;
    if(ratio_b>1.7) flag_ii_a=1;
  }

/* return vectors */
/* return a vertical if it is satisfied the sz criterian */
flag_sz = 0;
if( ((float)abs(iend-ibeg)) >= SYMIN )
  {
    line_fit(group,x, y, ibeg, iend, &x1, &x2,&start,&end);
    if( ratio>2.5 && fabs(x1-x2) >= SXMIN)  flag_sz = 1;
  } if( flag_sz )
  {
    vctr=add_vctr(vctr_list,clagnode,ith,x1,y[ibeg],x2,y[iend]);
    vctr->width = width;
    vctr->no_lag = no_lag;
    vctr->type = 's';
  }
/* check arc tendency */
else if( abs(iend-ibeg)>2 &&
         arc_check(node,group,x,y,ibeg,iend,&max,&dst)==1 )
  {
    line_fit(group,x, y, ibeg, iend, &x1, &x2,&start,&end);
    vctr=add_vctr(vctr_list,clagnode,ith,x1,y[ibeg],x2,y[iend]);
    vctr->width = width;
    vctr->no_lag = no_lag;
    dst_lnth = dst/sqrt((x[iend]-x[ibeg])*(x[iend]-x[ibeg])+
                        (y[iend]-y[ibeg])*(y[iend]-y[ibeg])) ;
    if( dst_lnth <= 1./8. )
      merge[gp_count]=1;    /* still check for merging possibility */
    else merge[gp_count]=3; /* definitly arc */
```

- 110 -

Bose-Kuo 8-3

```
      vctr->ax[0]=x[ibeg]+0.5;
      vctr->ax[1]=x[iend]+0.5;
      vctr->ax[2]=x[max]+0.5;
      vctr->ay[0]=y[ibeg]+0.5;
      vctr->ay[1]=y[iend]+0.5;
      vctr->ay[2]=y[max]+0.5;
      vctr->dst = dst;
      vctr->type = 'a';
   }
/* check  collinearity */
else if( abs(iend-ibeg)>2 &&
         collinear_s(x,y,ibeg,iend,&max,&dst)==1 )
   {
      line_fit(group,x, y, ibeg, iend, &x1, &x2, &start,&end);
      vctr=add_vctr(vctr_list,clagnode,ith,x1,y[ibeg],x2,y[iend]);
      vctr->width = width;
      vctr->no_lag = no_lag;
      dst_lnth = dst/sqrt((x[iend]-x[ibeg])*(x[iend]-x[ibeg])+
                          (y[iend]-y[ibeg])*(y[iend]-y[ibeg])) ;
      if( dst_lnth <= 1./8. )
         merge[gp_count]=1;    /* still check for merging possibility */
      else merge[gp_count]=3; /* definitly arc */
      vctr->ax[0]=x[ibeg]+0.5;
      vctr->ax[1]=x[iend]+0.5;
      vctr->ax[2]=x[max]+0.5;
      vctr->ay[0]=y[ibeg]+0.5;
      vctr->ay[1]=y[iend]+0.5;
      vctr->ay[2]=y[max]+0.5;
      vctr->dst = dst;
      vctr->type = 'a';
   }
/* return vertical vectors */
else if(ratio>=RATIO_v || flag_ii_a==1 ||
        (flag_i && ratio>=RATIO_v_i) ||
        (flag_s==1 && ratio>=RATIO_v_one))
   {
      if(abs(ibeg-iend)>1)
         line_fit(group,x, y, ibeg, iend, &x1, &x2,&start,&end);
      else { x1=x[ibeg]; x2=x[iend]; }
      vctr=add_vctr(vctr_list,clagnode,ith,x1,y[ibeg],x2,y[iend]);
      vctr->type = 'v';
      vctr->width = width;
      vctr->no_lag = no_lag;
      merge[gp_count]=1;
   }
/* return hrorizontal vectors */
else if ( ratio<=RATIO_h || flag_s==1 )
   {
      center=(int) ((ibeg+iend)/2.0+0.5);
      x1 = (float)((node+group[center][1])->col_start);
      x2 = (float)((node+group[center][1])->col_end);
      y1 = y2 = (float)((node+group[center][1])->rowth);
      (add_vctr(vctr_list,clagnode,ith,x1,y1,x2,y2))->type='h';
      merge[gp_count]=2;
   }
/* return a v-vector for an undetermined group if
   the segment is marked as 'v'*/
else if ( type=='v' )
   {
      if(abs(ibeg-iend)>1)
         line_fit(group,x, y, ibeg, iend, &x1, &x2,&start,&end);
      else { x1=x[ibeg]; x2=x[iend]; }
      vctr=add_vctr(vctr_list,clagnode,ith,x1,y[ibeg],x2,y[iend]);
      vctr->type = 'v';
      vctr->width = width;
      vctr->no_lag = no_lag;
```

Bose-Kuo 8-3

```
            merge[gp_count]=1;
        }
        else merge[gp_count] = 0;

ibeg = i;
        gp_count += 1;
    }

/* merge v-h-v vectors or v-v vectors */
    merge[no_group+1]=0;
    for(i=1;i<=(no_group-1);i++)
        if(merge[i]==1&&(((merge[i+1]==2||merge[i+1]==0)&&merge[i+2]==1)||
                        merge[i+1]==1))
        {
            vctr = *((clagnode+ith)->vctr) ;
            j=1;
            while(merge[j]!=0 && j<i)
            {
                vctr = vctr->next;
                j += 1;
            }
            if(merge[i+1]==0||merge[i+1]==1) vctr_b = vctr->next;
            else vctr_b = (vctr->next)->next;

a[0] = vctr->y[0] - vctr_b->y[1];
            a[1] = vctr_b->x[1] - vctr->x[0];
            a[2] = vctr_b->y[1]*vctr->x[0] - vctr->y[0]*vctr_b->x[1];
            L = sqrt( a[0]*a[0] + a[1]*a[1] );
            dq1 = fabs((a[0]*vctr->x[1] + a[1]*vctr->y[1] + a[2])/L);
            dq2 = fabs((a[0]*vctr_b->x[0] + a[1]*vctr_b->y[0] + a[2])/L);
            dp=sqrt((vctr_b->x[0]-vctr->x[1])*(vctr_b->x[0]-vctr->x[1])+
                    (vctr_b->y[0]-vctr->y[1])*(vctr_b->y[0]-vctr->y[1]));
            if( dq1<DT && dq2<DT )
            {
                vctr->x[1] = vctr_b->x[1];
                vctr->y[1] = vctr_b->y[1];
                no_lag = vctr->no_lag + vctr_b->no_lag;
                vctr->width=((float)(vctr->no_lag) * vctr->width
                            +(float)(vctr_b->no_lag) * vctr_b->width)/
                            (float)no_lag;
                vctr->no_lag = no_lag;
                vctr->type='v';
                vctr->dst=0.0;
                vctr = vctr_list;
                (clagnode+ith)->no_vector -= 1;
                /* remove the disgarded vector from link */
                while( (vctr->next) != vctr_b )
                    vctr = vctr->next;
                vctr->next = vctr_b->next;
                free((char*)vctr_b);
            }
        } free_ivector(merge,1,(no_group+1));

no = (clagnode+ith)->no_vector ;
    if( no > 0 )
    {
        vctr = *((clagnode+ith)->vctr);
        free( (char*)(clagnode+ith)->vctr );
        if( ((clagnode+ith)->vctr=(struct vector **)
            calloc((unsigned)no,sizeof(struct vector*))) ==
            (struct vector **)0 )
            printf("calloc fail in (clagnode+%d)->vctr\n",i);
        (clagnode+ith)->vctr -= 1;  /* start from ONE */
        for(j=1;j<=no;j++)
```

Bose-Kuo 8-3

```
            {
              (clagnode+ith)->vctr[j] = vctr;
              vctr = vctr->next;
            }
       } free_vector(x,1,number);
  free_vector(y,1,number);
  free_imatrix(group,1,number,1,4);

}
#undef width_cg
#undef LO
#undef LO_r
#undef EPSILON
#undef RATIO_h
#undef RATIO_v
#undef RATIO_v_one
undef DT /* check arc tendency */ int arc_check(node,group,x,y,ibeg,iend,max,distance)
struct node *node;
int **group;
float *x,*y;
int ibeg,iend,*max;
float *distance;
{
   float a[3],L,T,d;
   float dl,dr;
   int i;
   int flag=0,sign,sign_p,fst_sign=10,sign_cl=0,sign_cr=0,flag_sc=0;
   int beg, end;

for(i=ibeg;i<iend;i++)
      {
        dl = (float)((node+group[i][1])->col_start) -
             (float)((node+group[i+1][1])->col_start);
        dr = (float)((node+group[i][1])->col_end) -
             (float)((node+group[i+1][1])->col_end);
        if( (dl*dr) < 0.0 )  return(0);
        else if(dl>0.)  sign=1;
        else if(dl==0.0) sign=0;
        else sign=-1;
        if(dl!=0.0) sign_cl += 1;
        if(dr!=0.0) sign_cr += 1;
        if(i!=ibeg && sign==sign_p)          continue;
        else sign_p=sign;
        if(flag==0 && sign!=0)
           {
             flag=1;
             fst_sign=sign;
             continue;
           }
        else if(flag==1 && fst_sign == (-1*sign) )  flag_sc=1;
        if(flag_sc==1 && fst_sign==sign) return(0);
     }
   if( sign_cl <= 2 && sign_cr <= 2 && (sign_cl+sign_cr)<4 ) return(0);

a[0] = y[ibeg] - y[iend];
   a[1] = x[iend] - x[ibeg];
   a[2] = y[iend]*x[ibeg] - y[ibeg]*x[iend];
   L = sqrt( a[0]*a[0] + a[1]*a[1] );
```

Bose-Kuo 8-3

```
  *max = ibeg;
  T=0.0;
  for(i=(ibeg+1);i<=(iend-1);i++)
     {
       d = a[0]*x[i] + a[1]*y[i] + a[2];
       if(fabs(d)>T)
          {
            T = fabs(d);
            *max = i;
          }
     }
  T = T/L;
  *distance = T;
  if( T/L > 1./10. )   return(1);
  else   return(0);
}

/* check collinearity */ int collinear_s(x,y,ibeg,iend,max,distance)
float *x,*y;
int ibeg,iend,*max;
float *distance;
{
  float a[3],L,T,d;
  int i;

a[0] = y[ibeg] - y[iend];
  a[1] = x[iend] - x[ibeg];
  a[2] = y[iend]*x[ibeg] - y[ibeg]*x[iend];
  L = sqrt( a[0]*a[0] + a[1]*a[1] );
  *max = ibeg;
  T=0.0;
  for(i=(ibeg+1);i<=(iend-1);i++)
     {
       d = a[0]*x[i] + a[1]*y[i] + a[2];
       if(fabs(d)>T)
          {
            T = fabs(d);
            *max = i;
          }
     }
  T = T/L;
  *distance = T;
  if(T/L > 1./8.) return(1);
  else return(0);
}
```

Bose-Kuo 8-3

/* noise reduction based on median filter idea and a mask */     prep.c include <ftr.h> define TV 14

```c
void prep(o_image,rows,cols)
int **o_image,rows,cols;
{
  int **f_image, **image, **mask, count, npix=4;
  int vedge_up, vedge_dw, hsum;
  int i,j,m,n;
  int flag_up, flag_dw;
  int n_node, c_node,width_n,width_c,no_node,no_clagnode,s_node;
  struct clagnode *clagnode;
  struct node *node;

f_image = imatrix(-2,rows+3,-2,cols+3);
  image  = imatrix(-2,rows+3,-2,cols+3);
  mask = imatrix(-1,1,-3,3);

for(i=-1;i<=1;i++)
     for(j=-3;j<=3;j++)
       mask[i][j] = 1;
  mask[-1][-1] = mask[-1][0] = mask[-1][1] = mask[0][0] = 0;

for (i=1; i<=rows; i++)
     {
       for (j=1; j<=cols; j++)
         if( o_image[i-1][j-1] == 0 )
           {
              f_image[i][j] = 1;
              image[i][j] = 1;
           }
     } for(i=1;i<=rows;i++)
     for(j=1;j<=cols;j++)
       {
         count=0;
         for(m=(i-1);m<=(i+1);m++)
            for(n=(j-1);n<=(j+1);n++)
              count += image[m][n];
         if(count<=npix)
           {
              /* remove the pixel if it does not belong to a long scan line */
              hsum=0;
              for(n=(j-1);n<=(j+1);n++)
                hsum += image[i][n];
              if( !(hsum==3 && ((image[i][j-2]==1 && image[i][j-3]==1)||
                                (image[i][j+2]==1 && image[i][j+3]==1)||
                                (image[i][j-2]==1 && image[i][j+2]==1))) )
                 f_image[i][j]=0;
           }
         else if( count<=7 && image[i][j]==0 )
           {
              /* add the pixel if it is not in a V-edge */
              flag_up = 0;
              flag_dw = 0;
              vedge_up = vedge_dw = 0;
              for(m=-1;m<=1;m++)
                for(n=-3;n<=3;n++)
                  vedge_up += image[i+m][j+n]*mask[m][n];
              if(image[i-1][j]==0 && image[i-2][j]==0)
```

Bose-Kuo 8-3

```
              flag_up = 1;
            for(m=-1;m<=1;m++)
              for(n=-3;n<=3;n++)
                vedge_dw += image[i+m][j+n]*mask[-m][n];
            if(image[i+1][j]==0 && image[i+2][j]==0)
              flag_dw = 1;
            if( !((vedge_up>TV && flag_up) || (vedge_dw>TV && flag_dw)) )
              f_image[i][j]=1;
          }
        else  f_image[i][j]=1;
      } for (i=1; i<=rows; i++)
  for (j=1; j<=cols; j++)
    {
       if(f_image[i][j]==0) o_image[i-1][j-1] = 255;
       else o_image[i-1][j-1] = 0;
    } free_imatrix(f_image,-2,rows+3,-2,cols+3);
free_imatrix(image,-2,rows+3,-2,cols+3);
free_imatrix(mask,-1,1,-3,3);

/* remove some noise-like node from the top or bottom of each blob */
node = (struct node *) calloc((unsigned)(cols*rows),sizeof(struct node));
if(node == (struct node *) NULL)
   {
      fprintf(stderr, "calloc failed for node\n");
      exit (1);
   }
node -= 1;   /* let node number start from ONE */ lag(o_image, rows, cols, node, &no_node);
clagnode = (struct clagnode *)calloc((unsigned) (no_node),
                                     sizeof(struct clagnode));
clagnode -= 1;   /* let clagnode number start from ONE */ no_clagnode = 0;
s_node = 1;
do{
  clag(rows, node, s_node, clagnode, &no_clagnode);
  /* look for the starting node for next blob */
  for(i=1;i<=no_node;i++)
     {
        if((node+i)->mark != 1)
          {
             s_node = i;
             break;
          }
        else s_node=0;
     }
} while (s_node > 0);
/* remove the clag-path-node which has only one run length and connects
   to some other clagnode from the image */
for(i=1;i<=no_clagnode;i++)
   if((clagnode+i)->class == 'p' && (clagnode+i)->number == 1)
      {
         c_node = (clagnode+i)->node[1];
         if(((node+c_node)->above+(node+c_node)->below)==1)
            for(j=((node+c_node)->col_start);j<=((node+c_node)->col_end);j++)
               o_image[(node+c_node)->rowth][j]=255;
      }
/* remove path-node with degree (0,1) or (1,0) if it is noise-like */
for(i=1;i<=no_node;i++)
   {
```

Bose-Kuo 8-3

```c
        if((node+i)->above==0 && (node+i)->below==1)
        {
            n_node = (node+i)->b_node[0];
            width_n = (node+n_node)->col_end - (node+n_node)->col_start + 1 ;
            width_c = (node+i)->col_end - (node+i)->col_start + 1 ;
            if( (width_n-width_c)>=3 && ((float)width_n/(float)width_c)>=3.0)
                for(j=((node+i)->col_start);j<=((node+i)->col_end);j++)
                    o_image[(node+i)->rowth][j]=255;
        }
        else if((node+i)->above==1 && (node+i)->below==0)
        {
            n_node = (node+i)->a_node[0];
            width_n = (node+n_node)->col_end - (node+n_node)->col_start + 1 ;
            width_c = (node+i)->col_end - (node+i)->col_start + 1 ;
            if( (width_n-width_c)>=3 && ((float)width_n/(float)width_c)>=3.0)
                for(j=((node+i)->col_start);j<=((node+i)->col_end);j++)
                    o_image[(node+i)->rowth][j]=255;
        }
    }
    for(i=1;i<=no_clagnode;i++)
        free((char*)((clagnode+i)->node+1));
    free((char*)(clagnode+1));
    free((char*)(node+1));

}

/* median filtering */
void mdn(o_image,rows,cols)
int **o_image,rows,cols;
{
    int **f_image, **image, count, npix=4;
    int vedge_up, vedge_dw, hsum;
    int i,j,m,n;

f_image = imatrix(-2,rows+3,-2,cols+3);
    image  = imatrix(-2,rows+3,-2,cols+3);

for (i=1; i<=rows; i++)
    {
        for (j=1; j<=cols; j++)
            if( o_image[i-1][j-1] == 0 )  image[i][j] = f_image[i][j] = 1;
    } for(i=1;i<=rows;i++)
        for(j=1;j<=cols;j++)
        {
            count=0;
            for(m=(i-1);m<=(i+1);m++)
                for(n=(j-1);n<=(j+1);n++)
                    count += image[m][n];
            if(count<=npix)
                f_image[i][j]=0;
            else
                f_image[i][j]=1;
        } for (i=1; i<=rows; i++)
        for (j=1; j<=cols; j++)
        {
            if(f_image[i][j]==0) o_image[i-1][j-1] = 255;
            else o_image[i-1][j-1] = 0;
        } free_imatrix(f_image,-2,rows+3,-2,cols+3);
    free_imatrix(image,-2,rows+3,-2,cols+3);

}
```

Bose-Kuo 8-3

```
            count_feat = 0;
            count_seg++;        /* cumulative no. of segments */
        } if (r_count == EOF) return;

if (!count_seg) strcpy(oldlab, fpt->lab);

/* Assign features to clusters */ mid=0;

for (j=0, cpt=clust, mval=MEG; j < nclust; j++, cpt++)
        {
            dum = fdist(fpt, cpt);
            if (dum < mval) {mval = dum, mid = j;}
        }

*(qpt+mid) = 1;
        count_feat++;           /* cumulative no. of features in the current
                                   segment */
    }
}
```

Bose-Kuo 8-3

```
/****************************************************************/
/*                                                              */
/*                         QUANT.C                              */
/*                                                              */
/****************************************************************/

/*
 * quant: convert a continuous vector to a bit vector for representing
 * a segment.
 *
 *
 */ include "cluster.h"

void quant(f1, f2, f3)
FILE *f1, *f2, *f3;
{
    int    nclust, nfeat, veclen, r_count, count_feat, count_seg;
    CLUST  *clust, *cpt;
    FEAT   feat, *fpt;
    short  i, j, k;
    char   oldlab[3];
    int    *qpt, *hpt, hval, mid;
    float  mval, dum, fdist();

fpt = &feat;

fscanf(f2, "%d", &nclust);

veclen = nclust/8 + (nclust%8 ? 1 : 0);  /* length of bit-vector in bytes */ if ((clust = (CLUST *) calloc(nclust, sizeof (CLUST))) == (CLUST *) NULL)
    {
        fprintf(stderr, "No memory space for data\n");
        exit(1);
    }

/* Read the clust.cent file */ for (i = 0, cpt = clust; i < nclust; i++, cpt++)
        if (fscanf(f2, "%f %f %f %f %f", &cpt->x, &cpt->y, &cpt->px,
            &cpt->py, &cpt->d) == EOF)
        {
            fprintf(stderr, "*** clust.cent file unexpected termination\n");
            exit(1);
        }

/* Create an array for temp. storage of binary vector in bits */ if ((qpt = (int *) calloc(nclust, sizeof (int))) == (int *) NULL)
    {
        fprintf(stderr, "No memory space for data\n");
        exit(1);
    }

/* Create an array for temp. storage of binary vector in bytes */ if ((hpt = (int *) calloc(veclen, sizeof (int))) == (int *) NULL
```

Bose-Kuo 8-3

```
    {
        fprintf(stderr, "No memory space for data\n");
        exit(1);
    }

/* Read the clust.v file, one entry at a time, and determine the bit
   vector for a segment (look for the label ending with a 0, marking
   the start of a segment) */
/*
    fscanf(f1, "%d", &nfeat);
*/
    count_feat = 0;
    count_seg = 0;

while (1)
    {
        r_count = fscanf(f1,"%d %s %f %f %f %f %f", &fpt->num, fpt->lab,
            &fpt->x, &fpt->y, &fpt->px, &fpt->py, &fpt->d);

if (*(fpt->lab+2) == '*') continue;

/* At the end of a segment, store the binary vector
           and write in xxx.sv file */ if (((*(fpt->lab+2)=='0') || (r_count==EOF)) && count_feat)
        {
            i=0, j=0;
            while(i < (nclust/8))
            {
                for (k=7, hval = 0; k>=0; k--)
                {
                    hval = hval | *(qpt+j);
                    j++;
                    hval = hval << 1;
                }

*(hpt+i) = (hval >> 1) &0xFF;
                i++;
            } if (i = nclust%8)
            {
                for (k=i-1, j=(nclust/8)*8, hval=0; k>=0; k--)
                {
                    hval = hval | *(qpt+j);
                    j++;
                    hval = hval << 1;
                }
                *(hpt+nclust/8) = (hval >> 1) &0xFF;
            } oldlab[2] = 0;
            fprintf(f3, "%s ", oldlab);

for (i=0; i<veclen; i++)
            {
                fprintf(f3, " %x", *(hpt + i));
                *(hpt + i) = 0;
            } fprintf(f3, "\n");

for (i=0; i<nclust; i++)
                *(qpt+i) = 0;

strcpy(oldlab, fpt->lab);
```

Bose-Kuo 8-3 include <nrec.h>     # recinit.c ( total no. of states for each character
                                    transition probabilities between char

```
char *sname[] = {"a0","a1","a2",
                 "b0","b1","b2",
                 "c0","c1","c2",
                 "d0","d1","d2",
                 "e0","e1","e2",
                 "f0","f1",
                 "g0","g1","g2",
                 "h0","h1","h2",
                 "i0",
                 "j0","j1",
                 "k0","k1","k2",
                 "l0",
                 "m0","m1","m2","m3","m4",
                 "n0","n1","n2",
                 "o0","o1","o2",
                 "p0","p1","p2",
                 "q0","q1","q2",
                 "r0","r1",
                 "s0",
                 "t0","t1",
                 "u0","u1","u2",
                 "v0","v1",
                 "w0","w1","w2","w3",
                 "x0","x1",
                 "y0","y1",
                 "z0",
                 "S0","S1",
                 "xx",(char *) NULL};

/* Initialize transition prob. table */ double Tran[27][27] = {
/*A*/ {(.0011),(.0193),(.0388),(.0469),(.0020),(.0100),
       (.0233),(.0020),(.0480),(.0020),(.0103),(.1052),
       (.0281),(.1878),(.0008),(.0222),(EPS),  (.1180),
       (.1001),(.1574),(.0137),(.0212),(.0057),(.0026),
       (.0312),(.0023),(.1001)},
/*B*/ {(.0931),(.0057),(.0016),(.0008),(.3219),(EPS),
       (EPS),  (EPS),  (.0605),(.0057),(EPS),  (.1242),
       (.0049),(EPS),  (.0964),(EPS),  (EPS),  (.0662),
       (.0229),(.0049),(.0727),(.0016),(EPS),  (EPS),
       (.1168),(EPS),(.0229)},
/*C*/ {(.1202),(EPS),  (.0196),(.0004),(.1707),(EPS),
       (EPS),  (.1277),(.0761),(EPS),  (.0324),(.0369),
       (.0015),(.0011),(.2283),(EPS),  (.0004),(.0426),
       (.0087),(.0893),(.0347),(EPS),  (EPS),  (EPS),
       (.0094),(EPS),(.0087)},
/*D*/ {(.1044),(.0020),(.0026),(.0218),(.3778),(.0007),
       (.0132),(.0007),(.1803),(.0033),(EPS),  (.0125),
       (.0178),(.0053),(.0733),(EPS),  (.0007),(.0324),
       (.0495),(.0013),(.0601),(.0099),(.0040),(EPS),
       (.0264),(EPS),(.0495)},
/*E*/ {(.0660),(.0036),(.0433),(.1194),(.0438),(.0142),
       (.0125),(.0021),(.0158),(.0005),(.0036),(.0456),
       (.0340),(.1381),(.0040),(.0192),(.0034),(.1927),
       (.1231),(.0404),(.0048),(.0215),(.0205),(.0152),
       (.0121),(.0004),(.1231)},
/*F*/ {(.0838),(EPS),  (EPS),  (EPS),  (.1283),(.0924),
       (EPS),  (EPS),  (.1608),(EPS),  (EPS),  (.0299),
```

```
Bose-Kuo 8-3

(.0009),(.0009),(.2789),(EPS),   (EPS),   (.1215),
             (.0026),(.0496),(.0462),(EPS),   (EPS),   (EPS),
             (.0043),(EPS),(.0026)},
    /*G*/  {(.1078),(EPS),  (EPS),  (.0018),(.2394),(EPS),
             (.0177),(.1281),(.0839),(EPS),   (EPS),  (.0203),
             (.0027),(.0451),(.1140),(EPS),   (EPS),  (.1325),
             (.0256),(.0247),(.0512),(EPS),   (EPS),   (EPS),
             (.0053),(EPS),(.0256)},
    /*H*/  {(.1769),(.0005),(.0014),(.0008),(.5623),(EPS),
             (EPS),  (.0005),(.1167),(EPS),   (EPS),  (.0016),
             (.0016),(.0038),(.0786),(EPS),   (EPS),  (.0153),
             (.0027),(.0233),(.0085),(EPS),  (.0011),(EPS),
             (.0041),(EPS),(.0027)},
    /*I*/  {(.0380),(.0082),(.0767),(.0459),(.0437),(.0129),
             (.0280),(.0002),(.0016),(EPS),  (.0050),(.0567),
             (.0297),(.2498),(.0893),(.0100),(.0008),(.0342),
             (.1194),(.1135),(.0011),(.0250),(EPS),  (.0023),
             (.0002),(.0079),(.1194)},
    /*J*/  {(.1259),(EPS),   (EPS),  (EPS),  (.1818),(EPS),
             (EPS),  (EPS),  (.0350),(EPS),   (EPS),  (EPS),
             (EPS),  (EPS),  (.3147),(EPS),   (EPS),  (.0070),
             (EPS),  (EPS),  (.3357),(EPS),   (EPS),  (EPS),
             (EPS),  (EPS),(EPS)},
    /*K*/  {(.0395),(.0028),(EPS),  (.0028),(.5282),(.0028),
             (EPS),  (.0198),(.1582),(EPS),  (.0113),(.0198),
             (.0028),(.0565),(.0198),(EPS),   (EPS),  (.0082),
             (.1102),(.0028),(.0028),(EPS),   (EPS),  (EPS),
             (.0113),(EPS),(.1102)},
    /*L*/  {(.1342),(.0019),(.0022),(.0736),(.1918),(.0105),
             (.0108),(EPS),  (.1521),(EPS),  (.0079),(.1413),
             (.0082),(.0004),(.0778),(.0041),(EPS),  (.0034),
             (.0389),(.0254),(.0269),(.0056),(.0011),(EPS),
             (.0819),(EPS),(.0389)},
    /*M*/  {(.1822),(.0337),(.0026),(EPS),  (.2975),(.0010),
             (EPS),  (EPS),  (.1345),(EPS),   (EPS),  (.0010),
             (.0654),(.0042),(.1246),(.0722),(EPS),  (.0026),
             (.0244),(.0005),(.0337),(.0005),(EPS),  (EPS),
             (.0192),(EPS),(.0244)},
    /*N*/  {(.0550),(.0004),(.0621),(.1681),(.1212),(.0102),
             (.1391),(.0013),(.0665),(.0009),(.0066),(.0073),
             (.0104),(.0194),(.0528),(.0004),(.0007),(.0011),
             (.0751),(.1641),(.0124),(.0068),(.0018),(.0002),
             (.0157),(.0004),(.0751)},
    /*O*/  {(.0082),(.0101),(.0162),(.0231),(.0037),(.1299),
             (.0082),(.0025),(.0092),(.0014),(.0078),(.0416),
             (.0706),(.2190),(.0222),(.0292),(EPS),  (.1530),
             (.0357),(.0396),(.0947),(.0334),(.0345),(.0012),
             (.0041),(.0004),(.0357)},
    /*P*/  {(.1359),(EPS),  (.0006),(EPS),  (.1747),(EPS),
             (EPS),  (.0237),(.0423),(EPS),   (EPS),  (.0812),
             (.0073),(.0006),(.1511),(.0581),(EPS),  (.2306),
             (.0180),(.0287),(.0457),(EPS),   (EPS),  (EPS),
             (.0017),(EPS),(.0180)},
    /*Q*/  {(EPS),  (EPS),  (EPS),  (EPS),   (EPS),   (EPS),
             (EPS),  (EPS),  (EPS),  (EPS),   (EPS),   (EPS),
             (EPS),  (EPS),  (EPS),  (EPS),   (EPS),   (EPS),
             (EPS),  (EPS),  (1.000),(EPS),   (EPS),   (EPS),
             (EPS),  (EPS),(EPS)},
    /*R*/  {(.1026),(.0033),(.0172),(.0282),(.2795),(.0031),
             (.0175),(.0017),(.1181),(EPS),  (.0205),(.0164),
             (.0303),(.0325),(.1114),(.0055),(EPS),  (.0212),
             (.0655),(.0596),(.0192),(.0142),(.0017),(.0002),
             (.0306),(EPS),(.0655)},
    /*S*/  {(.0604),(.0012),(.0284),(.0027),(.1795),(.0024),
             (EPS),  (.0561),(.1177),(EPS),  (.0091),(.0145),
             (.0112),(.0021),(.0706),(.0386),(.0009),(.0027),
```

- 122 -

Bose-Kuo 8-3

```
              (.0836),(.2483),(.0579),(EPS),   (.0039),(EPS),
              (.0081),(EPS),(.0836)},
/*T*/  {(.0619),(.0003),(.0036),(.0002),(.1417),(.0007),
        (.0002),(.3512),(.1406),(EPS),   (EPS),  (.0101),
        (.0044),(.0015),(.1229),(.0003),(EPS),   (.0479),
        (.0418),(.0213),(.0195),(.0005),(.0088),(EPS),
        (.0203),(.0005),(.0418)},
/*U*/  {(.0344),(.0415),(.0491),(.0243),(.0434),(.0052),
        (.0382),(.0010),(.0258),(EPS),   (.0014),(.0197),
        (.0329),(.1517),(.0019),(.0386),(EPS),   (.1460),
        (.1221),(.1255),(.0029),(.0012),(EPS),   (.0010),
        (.0014),(.0005),(.1221)},
/*V*/  {(.0749),(EPS),   (EPS),   (.0023),(.6014),(EPS),
        (EPS),   (EPS),   (.2569),(EPS),   (EPS),   (EPS),
        (.0012),(EPS),   (.0530),(EPS),   (EPS),   (EPS),
        (.0023),(EPS),   (.0012),(.0012),(EPS),   (EPS),
        (.0058),(EPS),(.0023)},
/*W*/  {(.2291),(.0008),(EPS),   (.0032),(.1942),(EPS),
        (EPS),   (.1422),(.2104),(EPS),   (EPS),   (.0041),
        (EPS),   (.0357),(.1292),(EPS),   (EPS),   (.0106),
        (.0366),(.0016),(EPS),   (EPS),   (EPS),   (EPS),
        (.0024),(EPS),(.0366)},
/*X*/  {(.0672),(EPS),   (.1119),(EPS),   (.1269),(EPS),
        (EPS),   (.0075),(.1119),(EPS),   (EPS),   (EPS),
        (.0075),(EPS),   (.0075),(.3507),(EPS),   (EPS),
        (EPS),   (.1716),(EPS),   (EPS),   (EPS),   (.0373),
        (EPS),   (EPS),(EPS)},
/*Y*/  {(.0586),(.0034),(.0103),(.0069),(.2897),(EPS),
        (EPS),   (EPS),   (.0690),(EPS),   (.0034),(.0172),
        (.0379),(.0172),(.2207),(.0310),(EPS),   (.0310),
        (.1517),(.0172),(.0138),(EPS),   (.0103),(EPS),
        (.0069),(.0034),(.1517)},
/*Z*/  {(.2278),(EPS),   (EPS),   (EPS),   (.4557),(EPS),
        (EPS),   (EPS),   (.2152),(EPS),   (EPS),   (.0127),
        (EPS),   (EPS),   (.0506),(EPS),   (EPS),   (EPS),
        (EPS),   (EPS),   (.0127),(EPS),   (EPS),   (EPS),
        (EPS),   (.0253),(EPS)},
/*S*/  {(.0604),(.0012),(.0284),(.0027),(.1795),(.0024),
        (EPS),   (.0561),(.1177),(EPS),   (.0091),(.0145),
        (.0112),(.0021),(.0706),(.0386),(.0009),(.0027),
        (.0836),(.2483),(.0579),(EPS),   (.0039),(EPS),
        (.0081),(EPS),(.0836)}};
```

Bose-Kuo 8-3

/* vectorize each segment */                                              seg2vec.c

```c
#include <ftr.h>
#define SMIN 8.  /* minimum spred in x and y direction for determining
                    dominant diagonal vector for s */
define SPIX 9   /* minimum no. of columns for testing existing of s */ void seg2vec(bimage,rows,bcol,seg,s_v_list,col_start,lagimg,dspl,clagimg)
int bimage,rows,bcol,col_start,lagimg,dspl,clagimg;
struct vector **s_v_list;
BSEG *seg;
{
  extern int Cols;
  int s_mdf();
  int **image,cols,no_clagnode=0,**group,*prof;
  int s_node, no_node=0;
  int i,j,m,n,c_node,no;
  int start,end,path,pixel,path_g,path_1;
  int flag, flag_b,flag_m,flag_h,ibeg,iend,jbeg,jend;
  int path_beg, path_end;
  float x1,x2,y1,y2;
  float *x,*y, ratio, width;
  struct clagnode *clagnode;
  struct node *node;
  struct vector *vctr_list, *vctr, *add_h();
  void dv_check();

if((vctr_list=(struct vector *)calloc(1,sizeof(struct vector)))==
      (struct vector *)NULL)
    printf("calloc fail in vctr_list\n");
  vctr_list->next = (struct vector *)NULL;

start=(int)(seg->start + 0.4);
  if(start<0) start=0;
  end=(int)(seg->end + 0.6)-1;
  if(end>Cols) end=Cols;

cols = end - start + 1 ;
  image = imatrix(0,(rows-1),0,(cols-1));
  /* form the segment image */
  for(i=0;i<rows;i++)
    for(j=0;j<cols;j++)
       image[i][j] = bimage[i][j+start];
  /* remove wrong cutting pixels */
  for(i=0;i<rows;i++)
    for(j=0;j<cols;j++)
      if(image[i][j]==0)
      {
        jbeg = j;
        pixel = 1;
        if(j==(cols-1))
          jend = j;
        else
        {
           while(image[i][j+1]==0)
           {
              j += 1;
              pixel += 1;
              if(j==(cols-1)) break;
           }
           jend = j;
        } if(pixel<=2 && !(cols<=3 && seg->type=='h') )
        {
```

Bose-Kuo 8-3

```c
                path_g=0;
                path_beg=-1;
                path_end=Cols+1;
                path=lagimg[i][jbeg+start+col_start];
                for(n=col_start;n<=(col_start+bcol);n++)
                  if(lagimg[i][n]==path)
                    {
                      path_g += 1;
                      if(path_beg==-1) path_beg = n;
                      if(n<(col_start+bcol))
                        {
                          if(lagimg[i][n+1]!=path)
                            path_end = n;
                        }
                      else  path_end = n;
                    }
                ratio = (float)pixel / (float)path_g;
                if(ratio<1./5. && (path_beg==(jbeg+start+col_start) ||
                                   path_end==(jend+start+col_start)) )
                  for(n=jbeg;n<=jend;n++)
                    image[i][n] = 255;
                else
                  {
                    path_g=0;
                    path_l=0;
                    path_beg=Cols+1;
                    path_end=-1;
                    path=clagimg[i][jbeg+start+col_start];
                    for(m=0;m<rows;m++)
                      {
                        flag_b = 0;
                        for(n=col_start;n<=(col_start+bcol);n++)
                          if(clagimg[m][n]==path)
                            {
                              path_g += 1;
                              if(flag_b==0)
                                {
                                  if(path_beg>n) path_beg = n;
                                  flag_b = 1;
                                }
                              if(n<(col_start+bcol))
                                {
                                  if(clagimg[m][n+1]!=path && path_end<n)
                                    path_end = n;
                                }
                              else  path_end = n;
                            }
                        for(n=(start+col_start);n<=(end+col_start);n++)
                          if(clagimg[m][n]==path) path_l += 1;
                      }
                    ratio = (float)path_l / (float)path_g;
                    if(ratio<0.2 && (path_beg>=(start+col_start) ||
                                     path_end<=(end+col_start)) )
                      for(n=jbeg;n<=jend;n++)
                        image[i][n] = 255;
                  }
            }
        }

/* find the clag */
node = (struct node *) calloc((unsigned)(cols*rows),sizeof(struct node));
if(node == (struct node *) NULL)
   {
     fprintf(stderr, "calloc failed for node\n");
     exit (1);
```

Bose-Kuo 8-3

```
       }
    node -= 1;   /* let node number start from ONE */ lag(image, rows, cols, node, &no_node);
    clagnode = (struct clagnode *)calloc((unsigned) (no_node),
                                         sizeof(struct clagnode));
    clagnode -= 1;   /* let clagnode number start from ONE */ no_clagnode = 0;
    s_node = 1;
    do{
       clag(rows, node, s_node, clagnode, &no_clagnode);
       /* look for the starting node for next blob */
       for(i=1;i<=no_node;i++)
         {
            if((node+i)->mark != 1)
            {
               s_node = i;
               break;
            }
            else   s_node=0;
         }
    } while (s_node > 0);
    /* remove the clag-path-node which has only one run length and connects
       to some other clagnode from the image (for fixing top of z or s) */
    for(i=1;i<=no_clagnode;i++)
       if((clagnode+i)->class == 'p' && (clagnode+i)->number == 1)
       {
          c_node = (clagnode+i)->node[1];
          if(((node+c_node)->above+(node+c_node)->below)==1)
            for(j=((node+c_node)->col_start);j<=((node+c_node)->col_end);j++)
               image[(node+c_node)->rowth][j]=255;
       }
    for(i=1;i<=no_clagnode;i++)
       free((char*)((clagnode+i)->node+1));
    free((char*)(clagnode+1));
    free((char*)(node+1));

#ifdef DEMO
    /* write the segment image into the displaying-purpose array */
    for(i=0;i<(10*rows);i++)
       for(j=0;j<(10*cols);j++)
          dspl[i][j+10*(start+col_start)] = image[i/10][j/10];
endif node = (struct node *) calloc((unsigned)(cols*rows),sizeof(struct node));
    if(node == (struct node *) NULL)
       {
          fprintf(stderr, "calloc failed for node\n");
          exit (1);
       }
    node -= 1;   /* let node number start from ONE */ lag(image, rows, cols, node, &no_node);

clagnode = (struct clagnode *)calloc((unsigned) no_node,
                                         sizeof(struct clagnode));
    clagnode -= 1;   /* let clagnode number start from ONE */ s_node=1;
    no_clagnode=0;

do {
       clag(rows, node, s_node, clagnode, &no_clagnode);
       /* look for the starting node for next blob */
       for(i=1;i<=no_node;i++)
```

Bose-Kuo 8-3

```
      {
         if((node+i)->mark != 1)
         {
            s_node = i;
            break;
         }
         else  s_node=0;
      }
   } while (s_node > 0);

/* return horizontal vectors if it is indicated by seg->type and its
    height to width ratio is high */
   flag_h = 0;
   for(i=1;i<=no_clagnode;i++)
      if((clagnode+i)->class=='p' && (clagnode+i)->number>9)
      {
         width = 0.0;
         for(j=1;j<=((clagnode+i)->number);j++)
            width += ((node+(clagnode+i)->node[j])->col_end -
                      (node+(clagnode+i)->node[j])->col_start);
         width /= (float)((clagnode+i)->number);
         if( (float)((clagnode+i)->number)/width > 2.5 ) flag_h=1;
      }
   if(seg->type == 'h' && flag_h==0)
   {
      prof = ivector(0,cols-1);
      for(flag_b=0,i=0;i<rows;i++)
      {
         flag = 0;
         for(j=0;j<cols;j++)
            if(image[i][j]==0) flag += 1;
         if(flag>1) flag=1;   /* discard only one pixel wide element */
         else flag=0;
         if(flag_b==0&&flag==1) ibeg=i;
         if((flag_b==1&&flag==0) || (flag_b==1&&flag==1&&i==(rows-1)))
         {
            iend=i-1;
            y1 = y2 = ((float)(ibeg+iend))/2.0+0.5;
            for(n=0;n<cols;n++)
            {
               prof[n] = 0;
               for(m=ibeg;m<=iend;m++)
                  if(image[m][n]==0) prof[n] += 1;
            }
            x1=(float)0;
            x2=(float)cols;
            for(n=0;n<(cols-1);n++)
            {
               if(prof[n]==0 && prof[n+1]>0) x1=(float)(n+1);
               if(prof[n]>0 && prof[n+1]==0) x2=(float)(n+1);
            }
            x1 = x1+(float)start ;
            x2 = x2+(float)start;
            if(x1<0.0) x1=0.0;
            if(x2>(float)bcol) x2 = (float)bcol - 0.000001;
            (add_h(vctr_list,x1,y1,x2,y2))->type='h';
         }
         flag_b = flag;
      }
      *s_v_list = vctr_list;
      free_imatrix(image,0,(rows-1),0,(cols-1));
      free_ivector(prof,0,cols-1);
      return;
   }

/* Analysis each clag-path-node or a junction node if it is in the top
```

```
     or bottom of the whole clag */
  for(i=1;i<=no_clagnode;i++)
    if((clagnode+i)->class=='p' ||
       ((clagnode+i)->class=='j'&& ((clagnode+i)->a_clagnode[0]==0 ||
                                    (clagnode+i)->b_clagnode[0]==0)) )
      path_s(image,rows,node,clagnode,no_clagnode,i,seg->type,vctr_list);

/* merging vectors in adjacent clag-path-nodes */
  do
    {
      merge(vctr_list,clagnode,no_clagnode,&flag_m);
    } while(flag_m==1) ;

/* if the dominant diagonal vector of s exists, delete all the other
     vertical vectors from the list */
  if(cols>=SPIX) s_mdf(&vctr_list);

/* if there is a dominant straight vertical vector, delete all the other
     vectors from the list */
/*  dv_check(&vctr_list);*/   /* NOT complete yet (doesn't check overlap) */

/* free reserved memory spaces */
  for(i=1;i<=no_clagnode;i++)
     free((char*)((clagnode+i)->node+1));
  for(i=1;i<=no_clagnode;i++)
     if((clagnode+i)->no_vector!=0) free((char*)((clagnode+i)->vctr+1));
  free((char*)(clagnode+1));
  free((char*)(node+1));

/* prepare output data */
  *s_v_list = vctr_list;
  while(vctr_list->next != (struct vector *)NULL)
    {
      for(i=0;i<2;i++)
        {
          vctr_list->x[i] += start;
          if(vctr_list->x[i] < seg->start ) vctr_list->x[i] = seg->start;
          else if (vctr_list->x[i] > seg->end ) vctr_list->x[i] = seg->end;
        }
      if(vctr_list->type=='a')
        for(i=0;i<3;i++)
          {
            vctr_list->ax[i] += start;
            if(vctr_list->ax[i] < seg->start )
              vctr_list->ax[i] = seg->start;
            else if (vctr_list->ax[i] > seg->end )
              vctr_list->ax[i] = seg->end;
          }
      vctr_list = vctr_list->next;
    }
  free_imatrix(image,0,(rows-1),0,(cols-1));
}

/* delete all the other vectors if a dominant staight vertical exist */
void  dv_check(vctr_list)
struct vector **vctr_list;
{
  float width(),length,Mlength;
  struct vector *vctr, *vctr_d;
  int flag;

vctr = *vctr_list;
  flag = 0;
  Mlength = 0.0;
  length = 0.0;
```

Bose-Kuo 8-?

```
while(vctr->next != (struct vector *)NULL)
   {
     if(vctr->type=='v')
        {
          width(vctr);
          if(vctr->type=='I')
             {
               length = sqrt((vctr->x[0]-vctr->x[1])*
                             (vctr->x[0]-vctr->x[1]) +
                             (vctr->y[0]-vctr->y[1])*
                             (vctr->y[0]-vctr->y[1]) );
               flag += 1;
               vctr->type = 'v';
               if(Mlength < length)
                  {
                    Mlength = length;
                    vctr_d = vctr;
                  }
             }
        }
     vctr = vctr->next;
   } if(flag>0 && Mlength>5.0 )
   {
     vctr = *vctr_list;
     while(vctr->next != (struct vector *)NULL)
        {
          if(vctr != vctr_d)
             vctr = dlt_vctr(&vctr_list,vctr);
          else vctr = vctr->next;
        }
   }
}

/* modify the vector list if the dominant diagonal vector of s exists */
int s_mdf(vctr_list)
struct vector **vctr_list;
{
  struct vector *vctr_s, *vctr, *vctr_b;
  float ymax=0. ,xmax=0.;

vctr = *vctr_list;
  while(vctr->next != (struct vector *)NULL)
    {
      if(vctr->type=='s')
         {
           vctr_s = vctr;
           xmax = fabs(vctr->x[0]-vctr->x[1]);
           ymax = fabs(vctr->y[0]-vctr->y[1]);
         }
      vctr = vctr->next;
    } if(xmax >= SMIN && ymax >= SMIN)
    {
      vctr = *vctr_list;
      while(vctr->next != (struct vector *)NULL)
        {
          if((vctr->type=='a' || vctr->type=='v') && vctr != vctr_s)
             vctr = dlt_vctr(&vctr_list,vctr);
          else vctr = vctr->next;
        }
      return(1);
```

Bose-Kuo 8-3

```c
    }
  else return(0);
}

/* delete an entry from the vecor-list */
struct vector *dlt_vctr(vctr_list,vctr)
struct vector **vctr_list,*vctr;
{
  struct vector *vctr_b;

if( (*vctr_list) == vctr)
     {
       *vctr_list = vctr->next;
       free(vctr);
       return(*vctr_list);
     }
  else
     {
       vctr_b = *vctr_list;
       while(vctr_b->next != vctr)
         vctr_b = vctr_b->next;
       vctr_b->next = vctr->next;
       free(vctr);
       return(vctr_b->next);
     }
}

/* add new entry to end of vecor-list */
struct vector *add_h(vctr_list,x1,y1,x2,y2)
struct vector *vctr_list;
float x1,x2,y1,y2;
{ while( vctr_list->next != (struct vector *)NULL )
     vctr_list = vctr_list->next;
  /* reserve a space for the next new entry */
  if((vctr_list->next=(struct vector *)calloc(1,sizeof(struct vector)))
       == (struct vector *)0 )
     printf("calloc fail in add_vctr(): 1\n");
  /* add NULL to the new end of the list */
  (vctr_list->next)->next = (struct vector *)NULL;

vctr_list->x[0]=x1;
  vctr_list->x[1]=x2;
  vctr_list->y[0]=y1;
  vctr_list->y[1]=y2;
  return(vctr_list);
} undef SMIN
undef SPIX
```

Bose-Kuo 8-3 wx_detect.c
/* detect two special cases, eg w & x, in Table 2 of Pavlidis CVGIP paper */ include <ftr.h> define RATIO_up 2.2    /* upper bound for the ratio of height and width */
define RATIO_low 0.6   /* lower bound for the ratio of height and width */
define CNTR 1.2        /* threshold for identifing center point outliers */
define VARM 5          /* minimum height of an arm of V */
define XARM 3          /* minimum height of an arm of X */

```c
int wx_detect(image,rows,cols,node,clagnode,ith,group,x,y,vctr_list)
int **image,rows,cols;
struct node *node;
struct clagnode *clagnode;
struct vector *vctr_list;
int ith;           /* ith clagnode */
int **group;
float *x,*y;       /* center points of the ith clag-path node */
{
  int jna,jnb,c_node,number,rowth_a,rowth_b,rowth;
  int i,j,jbeg,jend,flag,count_n;
  int count_nar,count_nal,count_nbr,count_nbl;
  int start,end;
  float xa[4],xb[4],width,ratio,width_2,width_3;
  float px[4],py[4];
  float center=0.0;
  float x1,x2;
  struct vector *vctr;

number=(clagnode+ith)->number;

width=0.0;
  for(j=1;j<=number;j++)
    {
      c_node = (clagnode+ith)->node[j];
      width += (float)((node+c_node)->col_end - (node+c_node)->col_start+1);
    }
  width /= (float)number;
  ratio = (float)number / width;
  if(ratio>RATIO_up || ratio < RATIO_low) return (0);

c_node=(clagnode+ith)->node[1];
  if( (node+c_node)->above>1 && (node+c_node)->below==1 )
    rowth_a=(node+c_node)->rowth-1;
  else if( (node+c_node)->above==1 && (node+c_node)->below==1 )
    rowth_a=(node+(node+c_node)->a_node[0])->rowth - 1 ;
  else if( ((node+c_node)->above+(node+c_node)->below) == 1 )
    rowth_a = -1 ;
  else return(0);

jna= find_degree(image,rows,rowth_a,node,c_node,xa);

if(jna==2)
     {
       rowth = rowth_a;
       jbeg=xa[0];
       jend=xa[1];
       flag=1;
       count_n = 1;
       while(flag==1)
         {
           if(jbeg>0)
             while(image[rowth][jbeg-1]==0)
               {
                 jbeg -= 1;
```

Bose-Kuo 8-3

```
                    if(jbeg==0) break;
               }
            if(jend<(cols-1))
               while(image[rowth][jend+1]==0)
                 {
                    jend += 1;
                    if(jend==(cols-1)) break;
                 }
            rowth -=1 ;
            if(rowth<0) break;
            flag=0;
            for(j=(jbeg-1 > 0 ? jbeg-1 : 0);j<=jend;j++)
               if(image[rowth][j]==0) flag=1;
            if(flag==1) count_n += 1;
         }
      count_nal = count_n;

rowth=rowth_a;
      jbeg=xa[2];
      jend=xa[3];
      flag=1;
      count_n = 1;
      while(flag==1)
         {
            if(jbeg>0)
               while(image[rowth][jbeg-1]==0)
                 {
                    jbeg -= 1;
                    if(jbeg==0) break;
                 }
            if(jend<(cols-1))
               while(image[rowth][jend+1]==0)
                 {
                    jend += 1;
                    if(jend==(cols-1)) break;
                 }
            rowth -=1 ;
            if(rowth<0) break;
            flag=0;
            for(j=jbeg;j<=(jend+1 < cols-1 ? jend+1 : cols-1);j++)
               if(image[rowth][j]==0) flag=1;
            if(flag==1) count_n += 1;
         }
      count_nar = count_n;
   } c_node=(clagnode+ith)->node[number];
if( (node+c_node)->above==1 && (node+c_node)->below>1 )
   rowth_b=(node+c_node)->rowth+1;
else if( (node+c_node)->above==1 && (node+c_node)->below==1 )
   rowth_b=(node+(node+c_node)->b_node[0])->rowth + 1 ;
else if( ((node+c_node)->above+(node+c_node)->below) == 1 )
   rowth_b = rows ;
else return(0);

jnb= find_degree(image,rows,rowth_b,node,c_node,xb);

if(jnb==2)
   {
      rowth=rowth_b;
      jbeg=xb[0];
      jend=xb[1];
      flag=1;
      count_n = 1;
      while(flag==1)
         {
```

- 132 -

Bose-Kuo 8-3

```
      if(jbeg>0)
        while(image[rowth][jbeg-1]==0)
          {
             jbeg -= 1;
             if(jbeg==0) break;
          }
      if(jend<(cols-1))
        while(image[rowth][jend+1]==0)
          {
             jend += 1;
             if(jend==(cols-1)) break;
          }
      rowth +=1 ;
      if(rowth>(rows-1)) break;
      flag=0;
      for(j=(jbeg-1 > 0 ? jbeg-1 : 0);j<=jend;j++)
         if(image[rowth][j]==0) flag=1;
      if(flag==1)     count_n += 1;
    }
   count_nbl = count_n;

rowth=rowth_b;
   jbeg=xb[2];
   jend=xb[3];
   flag=1;
   count_n = 1;
   while(flag==1)
      {
        if(jbeg>0)
          while(image[rowth][jbeg-1]==0)
            {
               jbeg -= 1;
               if(jbeg==0) break;
            }
        if(jend<(cols-1))
          while(image[rowth][jend+1]==0)
            {
               jend += 1;
               if(jend==(cols-1)) break;
            }
        rowth +=1 ;
        if(rowth>(rows-1)) break;
        flag=0;
        for(j=jbeg;j<=(jend+1 < cols-1 ? jend+1 : cols-1);j++)
           if(image[rowth][j]==0) flag=1;
        if(flag==1)     count_n += 1;
      }
     count_nbr = count_n;
   } if(jna==0 && (clagnode+ith)->a_clagnode[0]!=0) return(0);
if(jnb==0 && (clagnode+ith)->b_clagnode[0]!=0) return(0);

/* retrun 0 if outliers of center points exist in the 'v' situation */
if( jna==0 && jnb==2 && number >= 5 && count_nbr>=VARM && count_nbl>=VARM)
  {
    line_fit(group,x, y, 1, number, &x1, &x2, &start, &end);
    for(i=(number-2);i<=number;i++)
       if( p2line(x1,y[1],x2,y[number],x[i],y[i]) > CNTR ) return(0);
  }
else if( jna==2 && jnb==0 && number >= 5 &&
         count_nar>=VARM && count_nal>=VARM)
  {
    line_fit(group,x, y, 1, number, &x1, &x2, &start, &end);
    for(i=1;i<=3;i++)
       if( p2line(x1,y[1],x2,y[number],x[i],y[i]) > CNTR ) return(0);
```

- 133 -

Bose-Kuo 8-3

```c
    }

/* retrun 2 if x-arm is not long enough in the 'x' situation */
    if( jna==2 && jnb==2 && (count_nar<XARM || count_nal<XARM ||
                             count_nbr<XARM || count_nbl<XARM ) )
       return(2);

/* return 1 if normal 'v' or 'x' situationn exist */
    if( jna==0&&jnb==2 && count_nbr>=VARM && count_nbl>=VARM )
    {
       px[0]=px[1]= x[1];
       py[0]=py[1]= y[1];
       px[2]= (xb[0]+xb[1])/2.;
       px[3]= (xb[2]+xb[3])/2.;
       py[2]=py[3]= y[number];
       (clagnode+ith)->type = 'v';
       width_2 = fabs(xb[1]-xb[0]);
       width_3 = fabs(xb[3]-xb[2]);
    }
    else if( jna==2&&jnb==0 && count_nar>=VARM && count_nal>=VARM)
    {
       px[0]= (xa[0]+xa[1])/2.;
       px[1]= (xa[2]+xa[3])/2.;
       py[0]=py[1]= y[1];
       px[2]=px[3]= x[number];
       py[2]=py[3]= y[number];
       (clagnode+ith)->type = 'v';
       width_3 = fabs(xa[1]-xa[0]);
       width_2 = fabs(xa[3]-xa[2]);
    }
    else if( jna==2&&jnb==2 )
    {
       px[0]= (xa[0]+xa[1])/2.;
       px[1]= (xa[2]+xa[3])/2.;
       py[0]=py[1]= y[1];
       px[2]= (xb[0]+xb[1])/2.;
       px[3]= (xb[2]+xb[3])/2.;
       py[2]=py[3]= y[number];
       (clagnode+ith)->type = 'x';
       width_2 = fabs(xa[3]-xa[2]) < fabs(xb[1]-xb[0]) ?
         fabs(xa[3]-xa[2]) : fabs(xb[1]-xb[0]);
       width_3 = fabs(xa[1]-xa[0]) < fabs(xb[3]-xb[2]) ?
         fabs(xa[1]-xa[0]) : fabs(xb[3]-xb[2]) ;
    }
    else return(0);

/* since vctr->no_lag=0, we don't use width_2 & width_3 during merging */
    vctr = add_vctr(vctr_list,clagnode,ith,px[0],py[0],px[3],py[3]);
    vctr->type='v';
    vctr->width = width_3;
    vctr = add_vctr(vctr_list,clagnode,ith,px[1],py[1],px[2],py[2]);
    vctr->type='v';
    vctr->width = width_2;
    (clagnode+ith)->group = 1;
    return (1);
}
#undef RATIO_ub
#undef RATIO_lb
undef CNTR /* find jna & jnb for wx_detect() */ int find_degree(image,rows,rowth,node,c_node,xa)
     int **image;
     struct node *node;
```

Bose-Kuo 8-3

```
    int c_node,rows,rowth;
    float xa[4];
{
  int j, count=-1, jna=0, find;

if(rowth>=0 && rowth<rows)
     {
       find=0;
       for(j=((node+c_node)->col_start);j<=((node+c_node)->col_end);j++)
          {
             if(image[rowth][j]==0 && find == 0)
                {
                  count += 1;
                  if(count<4) xa[count]=(float)j;
                  find = 1 ;
                }
             if( image[rowth][j]==255 && find == 1)
                {
                  count += 1;
                  if(count<4) xa[count] = (float)(j-1) ;
                  find = 0 ;
                  jna += 1;
                }
             if( j==((node+c_node)->col_end) && find == 1)
                {
                  count += 1;
                  if(count<4) xa[count] = (float)j;
                  jna += 1;
                }
          }
     }
  return jna;
}

/* find the distance from a point to a line indicated by two end points */
float  p2line(x1,y1,x2,y2,xin,yin)
float x1,y1,x2,y2;
float xin,yin;
{
  float a[3],L,T,d;
  int i;

a[0] = y1 - y2;
  a[1] = x2 - x1;
  a[2] = y2*x1 - y1*x2;
  L = sqrt( a[0]*a[0] + a[1]*a[1] );
  d = a[0]*xin + a[1]*yin + a[2];
  return( fabs(d)/L );
}
```

Bose-Kuo 8-3

```c
/* detect the 'v' situation in the middle part of y */                y_detect.c include <ftr.h> int y_detect(image,rows,cols,node,clagnode,ith,beg,end)
int **image,rows,cols,beg,end;
struct node *node;
struct clagnode *clagnode;
int  ith;           /* ith clagnode */
{
  int jna,c_node,rowth_a,rowth;
  int i,j,jbeg,jend,flag,count_n;
  float xa[4];

c_node=(clagnode+ith)->node[end];
  if( !( (node+c_node)->above==1 && (node+c_node)->below==1 ) )
    return(0);

c_node=(clagnode+ith)->node[beg];
  if( (node+c_node)->above>1 && (node+c_node)->below==1 )
    rowth_a=(node+c_node)->rowth-1;
  else if( (node+c_node)->above==1 && (node+c_node)->below==1 )
    rowth_a=(node+(node+c_node)->a_node[0])->rowth - 1 ;
  else return(0);

jna= find_degree(image,rows,rowth_a,node,c_node,xa);

if(jna != 2) return(0);
  else
    {
      rowth = rowth_a;
      jbeg=xa[0];
      jend=xa[1];
      flag=1;
      count_n = 1;
      while(flag==1)
        {
          if(jbeg>0)
            while(image[rowth][jbeg-1]==0)
              {
                jbeg -= 1;
                if(jbeg==0) break;
              }
          if(jend<(cols-1))
            while(image[rowth][jend+1]==0)
              {
                jend += 1;
                if(jend==(cols-1)) break;
              }
          rowth -=1 ;
          if(rowth<0) break;
          flag=0;
          for(j=jbeg;j<=jend;j++)
            if(image[rowth][j]==0) flag=1;
          if(flag==1) count_n += 1;
        }
      if(count_n <= 3) return(0);

rowth=rowth_a;
      jbeg=xa[2];
      jend=xa[3];
      flag=1;
      count_n = 1;
      while(flag==1)
        {
```

Bose-Kuo 8-3

```
            if(jbeg>0)
              while(image[rowth][jbeg-1]==0)
                {
                   jbeg -= 1;
                   if(jbeg==0) break;
                }
            if(jend<(cols-1))
              while(image[rowth][jend+1]==0)
                {
                   jend += 1;
                   if(jend==(cols-1)) break;
                }
            rowth -=1 ;
            if(rowth<0) break;
            flag=0;
            for(j=jbeg;j<=jend;j++)
              if(image[rowth][j]==0) flag=1;
            if(flag==1) count_n += 1;
         }
      if(count_n <= 3) return(0);
   } return(1);

}
```

The invention claimed is:

1. A method for recognizing characters in a scanned text image, the method comprising the steps of:

segmenting the scanned image into one or more sub-character segments, each sub-character segment comprising a substantially vertical portion of said scanned text image;

identifying one or more features characterizing a sub-character segment; and recognizing characters based on identified sub-character features, wherein said step of segmenting the scanned image comprises the steps of:

determining one or more groups of nodes, wherein a node comprises a set of consecutive scanned pixels of a first binary value;

determining one or more strokes in the scanned text image based on characteristics of said determined groups of nodes, wherein each stroke comprises a line segment characterizing a group of nodes; and segmenting the scanned text image into one or more of said substantially vertical sub-character segments based on one or more of said determined strokes.

2. The method of claim 1 wherein the step of recognizing characters based on identified sub-character features comprises the step of comparing sub-character features to known features of known characters.

3. The method of claim 1 wherein the step of determining strokes comprises:

representing a scanned image with one or more compressed line adjacency graphs, a compressed line adjacency graph comprising one or more compressed paths;

dividing a compressed path of a compressed line adjacency graph into two or more groups of nodes based on node width and center location information; and determining one or more strokes for a group based upon a set of one or more stroke identification rules.

4. The method of claim 3 wherein the step of determining one or more strokes comprises the step of merging adjacent strokes based on a set of one or more stroke merging rules.

5. The method of claim 1 wherein a feature characterizing a sub-character segment comprises a stroke.

6. The method of claim 1 wherein a feature characterizing a sub-character segment comprises an arc.

7. The method of claim 1 wherein a feature characterizing a sub-character segment is represented by a 5-tuple.

8. The method of claim 1 wherein the step of identifying features comprises the steps of:

representing a sub-character segment with a compressed line adjacency graph, the compressed line adjacency graph comprising one or more compressed paths; and analyzing a compressed line adjacency graph to determine one or more features.

9. The method of claim 8 wherein the step of identifying features further comprises the step of excluding from a segment one or more pixels associated with a compressed path from a neighboring segment.

10. The method of claim 8, wherein the step of analyzing a compressed line adjacency graph comprises the step of identifying a horizontal stroke for a compressed path of a horizontal segment.

11. The method of claim 8 wherein the step of analyzing a compressed line adjacency graph comprises the step of defining for a compressed path of a nonhorizontal segment one or more groups of nodes based on node width information.

12. The method of claim 11 wherein the step of analyzing a compressed line adjacency graph further comprises the step of merging two adjacent groups into a single group based on average group width information.

13. The method of claim 11 wherein the step of analyzing a compressed line adjacency graph further comprises the step of identifying an arc feature within a group.

14. The method of claim 13 wherein the step of identifying an arc feature within a group comprises the steps of:

defining a line segment connecting the centers of the first and last nodes in a group;

determining a node center within the group which is the greatest distance from the line; and identifying an arc feature defined by the centers of the first and last nodes and the determined node center when the greatest distance divided by the length of the line segment exceeds a threshold.

15. The method of claim 11 wherein the step of analyzing a compressed line adjacency graph further comprises the step of identifying a stroke feature within a group.

16. The method of claim 1 wherein the step of recognizing comprises the steps of:

comparing identified sub-character features to one or more stochastic models of known characters and determining one or more scores based on each comparison; and determining a sequence of known characters based on the determined scores.

17. The method of claim 16 further comprising training a stochastic model based on identified sub-character features of known characters.

18. The method of claim 17 wherein training comprises performing a K-means clustering of feature vectors to adaptively partition a feature space.

19. The method of claim 18 wherein training further comprises representing a segment vector in a binary N-dimensional space, where N is a number of feature clusters.

20. The method of claim 16 wherein the stochastic model of a character comprises a Hidden Markov Model.

21. The method of claim 20 further comprising the step of training the Hidden Markov Model by determining probabilities for states of the model.

22. The method of claim 20 wherein the Hidden Markov Model comprises penalty functions for skipping a model state.

23. The method of claim 20 wherein a Hidden Markov Model comprises penalty functions for remaining in a model state.

24. The method of claim 16 wherein the step of determining a distance score comprises determining a Bayesian distance score.

25. The method of claim 16 wherein the step of determining an optimum sequence of known characters is further based on a model of context.

26. The method of claim 25 wherein the model of context comprises a stochastic model for a sequence of characters.

27. The method of claim 26 wherein the stochastic model for a sequence of characters comprises n-gram probabilities.

28. The method of claim 25 wherein the model of context comprises a lexicon of sequences of text characters.

29. The method of claim 16 wherein the step of determining an optimum sequence of known characters comprises the step of performing Viterbi scoring.

30. The method of claim 29 wherein the step of performing Viterbi scoring comprises performing a level building process.

31. A text recognition system, the system comprising:

means for performing image enhancement on a scanned text image;

means, coupled to the means for performing image enhancement, for performing sub-character segmentation, each resulting sub-character segment comprising a substantially vertical portion of said scanned text image;

means, coupled to the means for performing sub-character segmentation, for performing feature extraction based on sub-character segments;

means, coupled to the means for performing feature extraction, for performing recognition of text based on a comparison of extracted sub-character features and stochastic models of known characters; and memory means, coupled to the means for performing recognition of text, for storing the results of text recognition, wherein said means for performing sub-character segmentation comprises:

means for determining one or more groups of nodes, wherein a node comprises a set of consecutive scanned pixels of a first binary value;

means for determining one or more strokes in the scanned text image based on characteristics of said determined groups of nodes, wherein each stroke comprises a line segment characterizing a group of nodes; and means for segmenting the scanned text image into one or more of said substantially vertical sub-character segments based on one or more of said determined strokes.

32. The system of claim 31 further comprising a scanner for scanning a paper copy of a document and producing a pixel image thereof.

33. The system of claim 32 further comprising a page preprocessor, coupled to the scanner, for determining pixel images of words based on a scanned pixel image of a document.

34. The system of claim 31 further comprising a means for training a stochastic model of a known character.

35. A method of training an optical text character recognition system with use of a plurality of sets of pixel signals representing text characters, the system including a memory for storing training information signals, the method comprising the steps of:

segmenting each set of pixel signals into one or more sub-character segments, each sub-character segment comprising a substantially vertical portion of said set of pixel signals;

generating one or more feature signals characterizing a sub-character segment of a given set of pixel signals;

generating signals reflecting a stochastic representation of a particular sub-character segment, which signals reflect occurrences of feature signals corresponding to said sub-character segment in said sets of pixel signals; and storing said signals reflecting said stochastic representation of said particular sub-character segment in said memory, wherein said step of segmenting each set of pixel signals comprises the steps of:

determining one or more groups of nodes, wherein a node comprises a set of consecutive scanned pixels of a first binary value;

determining one or more strokes in the set of pixel signals based on characteristics of said determined groups of nodes, wherein each stroke comprises a line segment characterizing a group of nodes; and segmenting the set of pixel signals into one or more of said substantially vertical sub-character segments based on one or more of said determined strokes.

36. The method of claim 35 wherein the step of determining strokes comprises:

representing a set of pixel signals with one or more compressed line adjacency graphs, a compressed line adjacency graph comprising one or more compressed paths;

dividing a compressed path of a compressed line adjacency graph into two or more groups of nodes based on node width and center location information; and determining one or more strokes for a group based upon a set of one or more stroke identification rules.

37. The method of claim 36 wherein the step of determining one or more strokes comprises the step of merging adjacent strokes based on a set of one or more stroke merging rules.

38. The method of claim 35 wherein a feature signal characterizing a sub-character segment comprises a stroke.

39. The method of claim 35 wherein a feature signal characterizing a sub-character segment comprises an arc.

40. The method of claim 35 wherein a feature signal characterizing a sub-character segment is represented by a 5-tuple.

41. The method of claim 35 wherein the step of generating one or more feature signals comprises the steps of:

representing a sub-character segment with a compressed line adjacency graph, the compressed line adjacency graph comprising one or more compressed paths; and analyzing a compressed line adjacency graph to determine one or more features.

42. The method of claim 41 wherein the step of generating one or more feature signals further comprises the step of excluding from a segment one or more pixels associated with a compressed path from a neighboring segment.

43. The method of claim 41 wherein the step of analyzing a compressed line adjacency graph comprises the step of identifying a horizontal stroke for a compressed path of a horizontal segment.

44. The method of claim 41 wherein the step of analyzing a compressed line adjacency graph comprises the step of defining for a compressed path of a non-horizontal segment one or more groups of nodes based on node width information.

45. The method of claim 44 wherein the step of analyzing a compressed line adjacency graph further comprises the step of merging two adjacent groups into a single group based on average group width information.

46. The method of claim 44 wherein the step of analyzing a compressed line adjacency graph further comprises the step of identifying an arc feature within a group.

47. The method of claim 46 wherein the step of identifying an arc feature within a group comprises the steps of:

defining a line segment connecting the centers of the first and last nodes in a group;

determining a node center within the group which is the greatest distance from the line; and identifying an arc feature defined by the centers of the first and last nodes and the determined node center when the greatest distance divided by the length of the line segment exceeds a threshold.

48. The method of claim 44 wherein the step of analyzing a compressed line adjacency graph further comprises the step of identifying a stroke feature within a group.

49. The method of claim 35 wherein the step of generating is performed with use of a set of vector quantized feature space signals.

50. The method of claim 35 further comprising the steps of:

analyzing sub-character segments to generate representations of portions of characters corresponding to the segments; and clustering said representations to adaptively partition a feature space.

* * * * *